(12) United States Patent
Oh et al.

(10) Patent No.: US 12,307,729 B2
(45) Date of Patent: May 20, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD THAT GENERATE LODS BASED ON AN OCTREE

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 69 days.

(21) Appl. No.: 17/926,029

(22) PCT Filed: May 31, 2021

(86) PCT No.: PCT/KR2021/006726
§ 371 (c)(1),
(2) Date: Nov. 17, 2022

(87) PCT Pub. No.: WO2021/242064
PCT Pub. Date: Dec. 2, 2021

(65) Prior Publication Data
US 2023/0186527 A1    Jun. 15, 2023

(30) Foreign Application Priority Data
May 29, 2020  (KR) .......................... 10-2020-0065154

(51) Int. Cl.
*H04N 19/119*   (2014.01)
*G06T 9/40*    (2006.01)
(Continued)

(52) U.S. Cl.
CPC ................ *G06T 9/40* (2013.01); *G06T 15/00* (2013.01); *H04N 19/30* (2014.11); *H04N 19/96* (2014.11);
(Continued)

(58) Field of Classification Search
None
See application file for complete search history.

(56) References Cited

U.S. PATENT DOCUMENTS

2019/0080483 A1*  3/2019  Mammou ................ G06T 7/50
2020/0021856 A1   1/2020  Tourapis et al.
(Continued)

FOREIGN PATENT DOCUMENTS

WO   2020072665 A1   4/2020

OTHER PUBLICATIONS

D. Flynn et al., "G-PCC: Combined octree-predictive geometry coding", International Organisation for Standardisation Organisation Internationale de Normalisation ISO/IEC JTC1/SC29/WG11 Coding of Moving Pictures and Audio, MPEG/m52519, Jan. 2020.
(Continued)

*Primary Examiner* — Edemio Navas, Jr.
(74) *Attorney, Agent, or Firm* — Bryan Cave Leighton Paisner LLP

(57) ABSTRACT

A point cloud data transmission method according to embodiments may comprise the steps of: acquiring point cloud data; encoding, by application of a geometry tree, geometry information including positions of points of the point cloud data; encoding attribute information including attribute values of the points of the point cloud data on the basis of the geometry tree; and transmitting the encoded geometry information, the encoded attribute information, and signaling information, wherein the step of encoding the attribute information comprises: a step of generating level of
(Continued)

details (LoDs) on the basis of the geometry tree and a step of compressing the attribute information on the basis of the LoDs.

8 Claims, 51 Drawing Sheets

(51) Int. Cl.
    *G06T 15/00*     (2011.01)
    *H04N 19/132*     (2014.01)
    *H04N 19/30*     (2014.01)
    *H04N 19/597*     (2014.01)
    *H04N 19/70*     (2014.01)
    *H04N 19/96*     (2014.01)

(52) U.S. Cl.
    CPC ...... *G06T 2210/36* (2013.01); *G06T 2210/56* (2013.01)

(56) References Cited

U.S. PATENT DOCUMENTS

| | | | |
|---|---|---|---|
| 2020/0105025 A1* | 4/2020 | Yea | G06T 15/08 |
| 2021/0105504 A1* | 4/2021 | Hur | H04N 19/167 |
| 2021/0312667 A1* | 10/2021 | Yea | H04N 19/46 |
| 2022/0329833 A1* | 10/2022 | Yang | G06T 9/004 |

OTHER PUBLICATIONS

K. Mammou et al., "G-PCC codec description v2", International Organisation for Standardisation Organisation Internationale de Normalisation ISO/IEC JTC1/SC29/WG11 Coding of Moving Pictures and Audio, N18189, Jan. 2019.

3DG, "G-PCC codec description v1", XP030197734, International Organisation for Standardisation ISO/IEC JTC1/SC29/WG11 N18015, Macau, China, Oct. 2018.

\* cited by examiner

FIG. 6
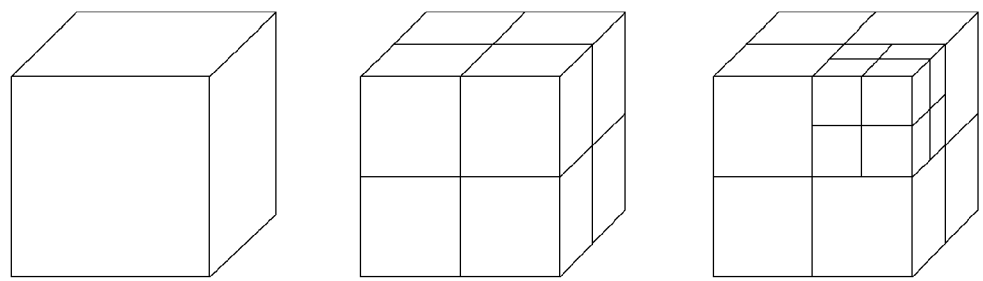
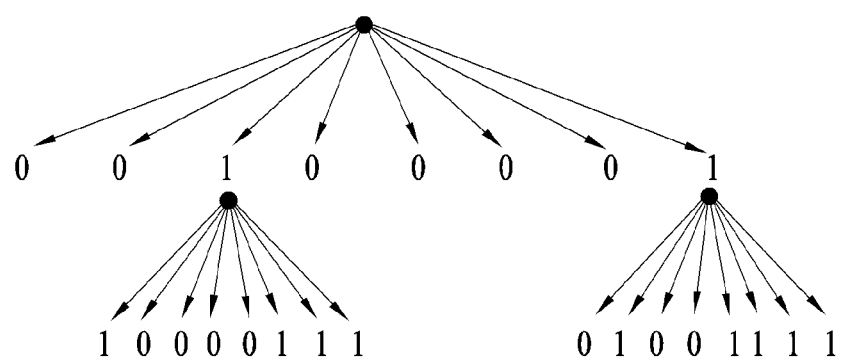

FIG. 7
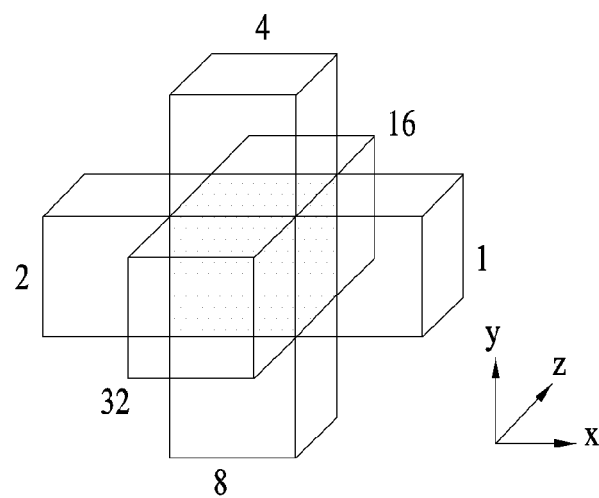
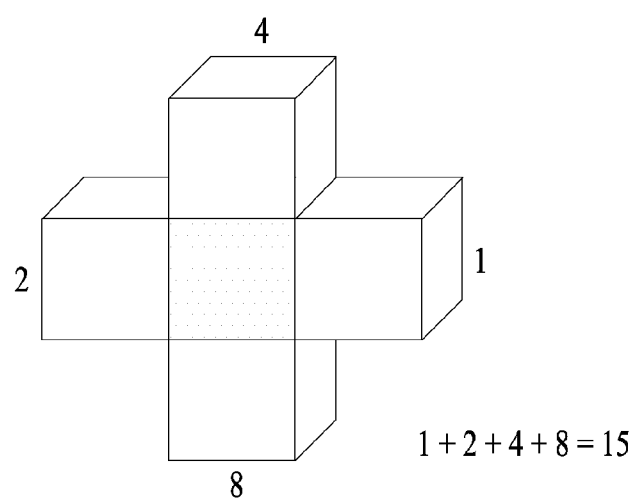
1 + 2 + 4 + 8 = 15

Quad-tree partition of a 3D cube, along x-y, x-z, y-z axes, respectively.

Binary-tree partition of a 3D cube, along x, y, z axis, respectively.

Morton order

FIG. 24
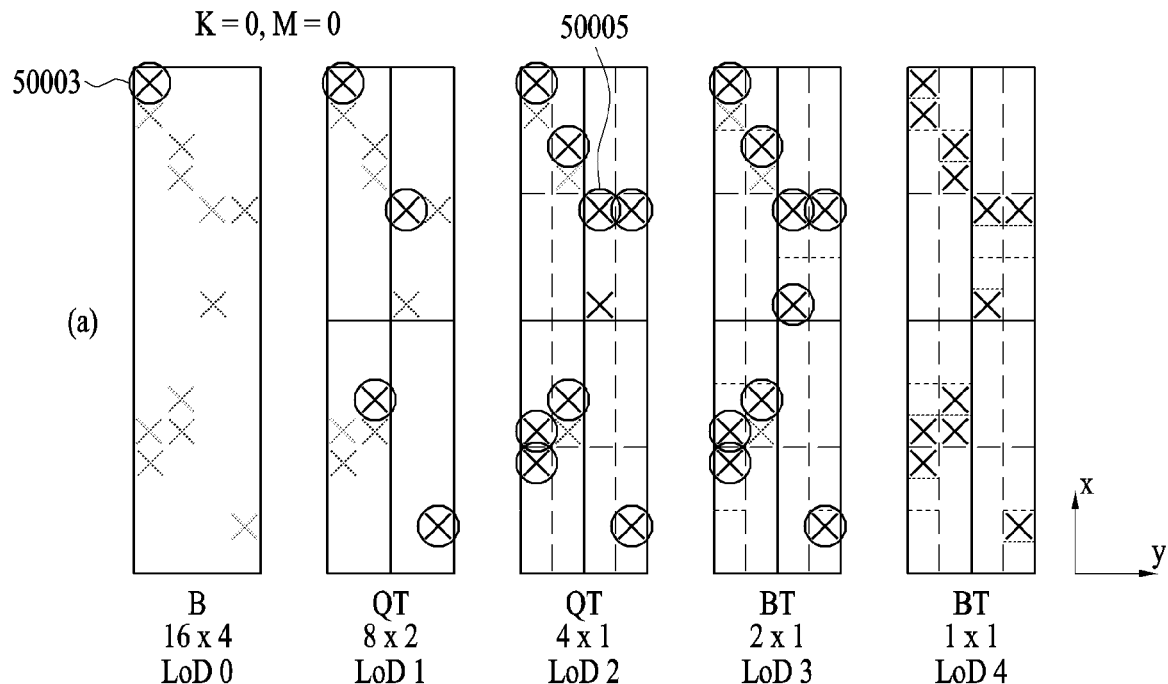
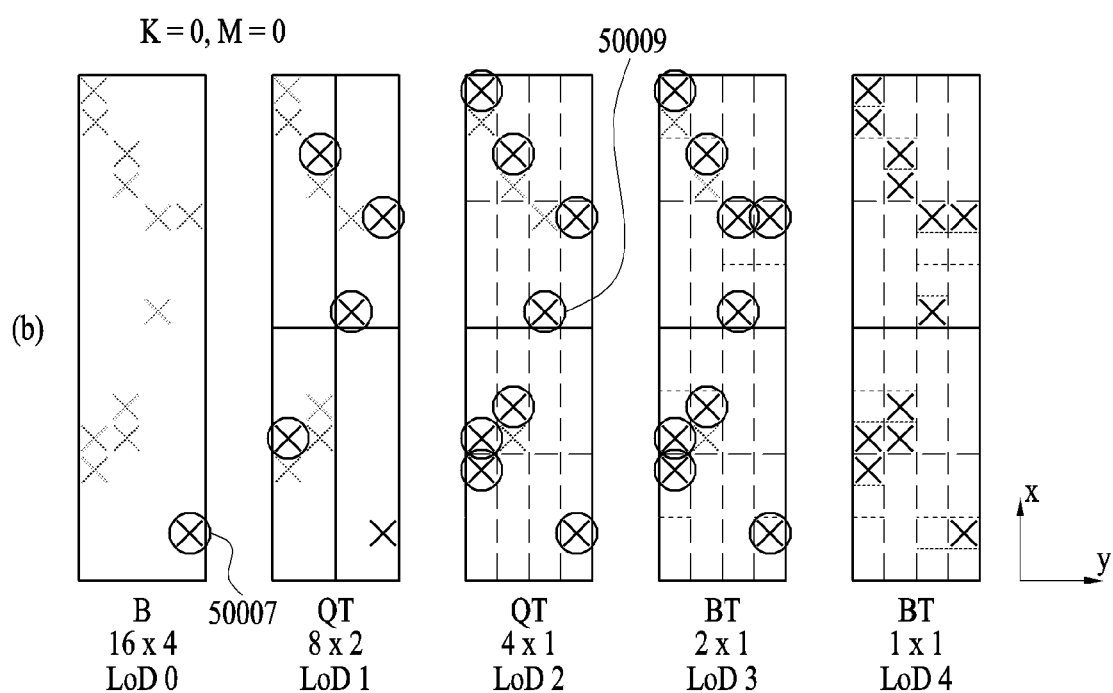

FIG. 25
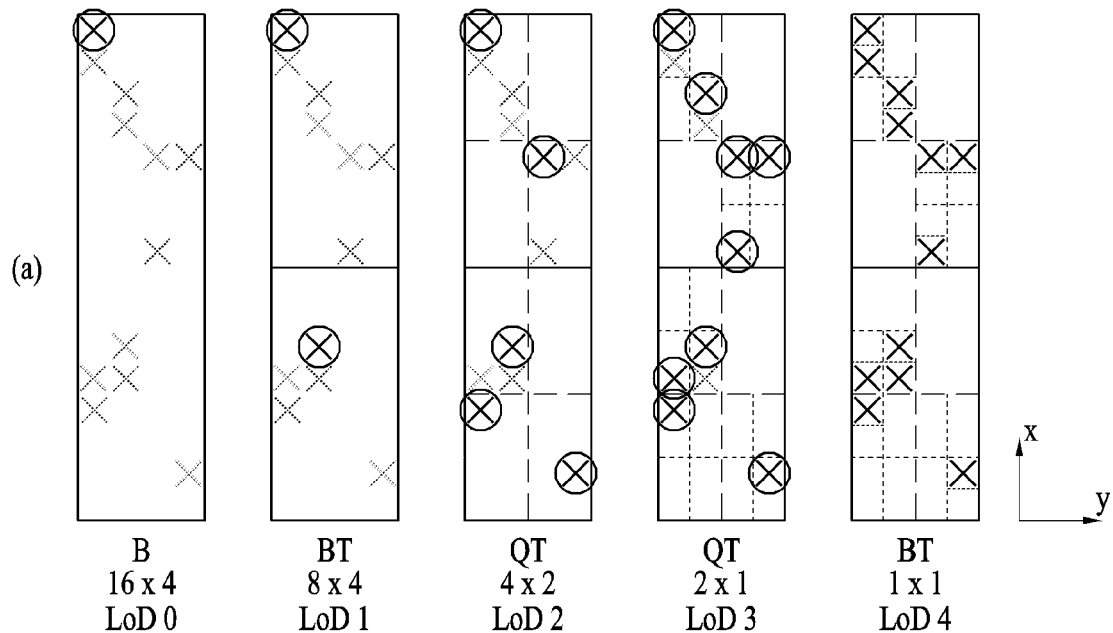
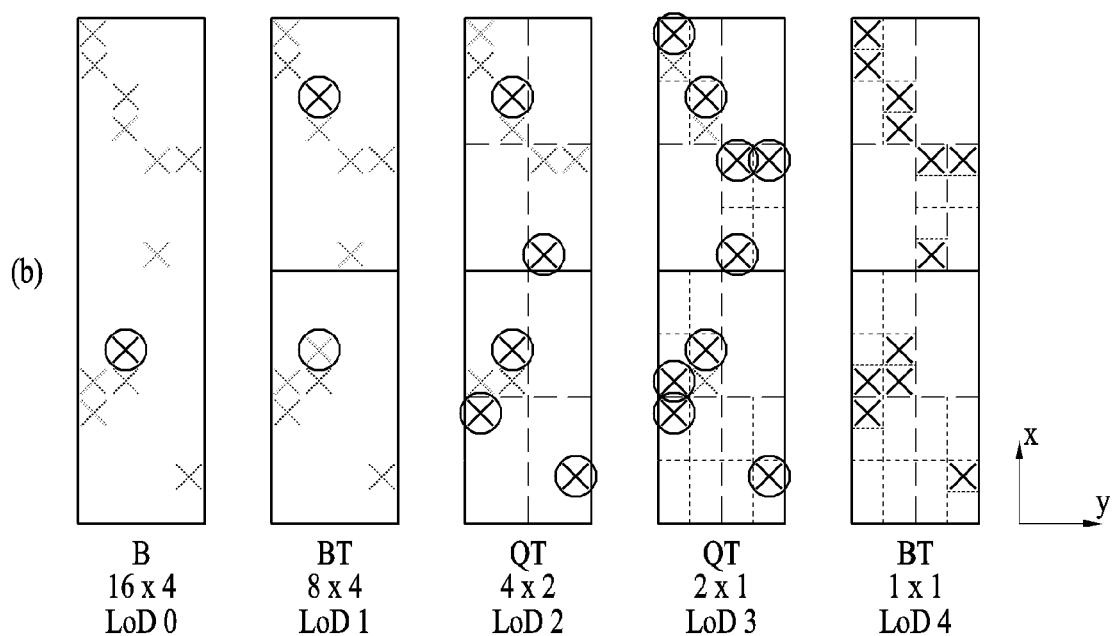

FIG. 28
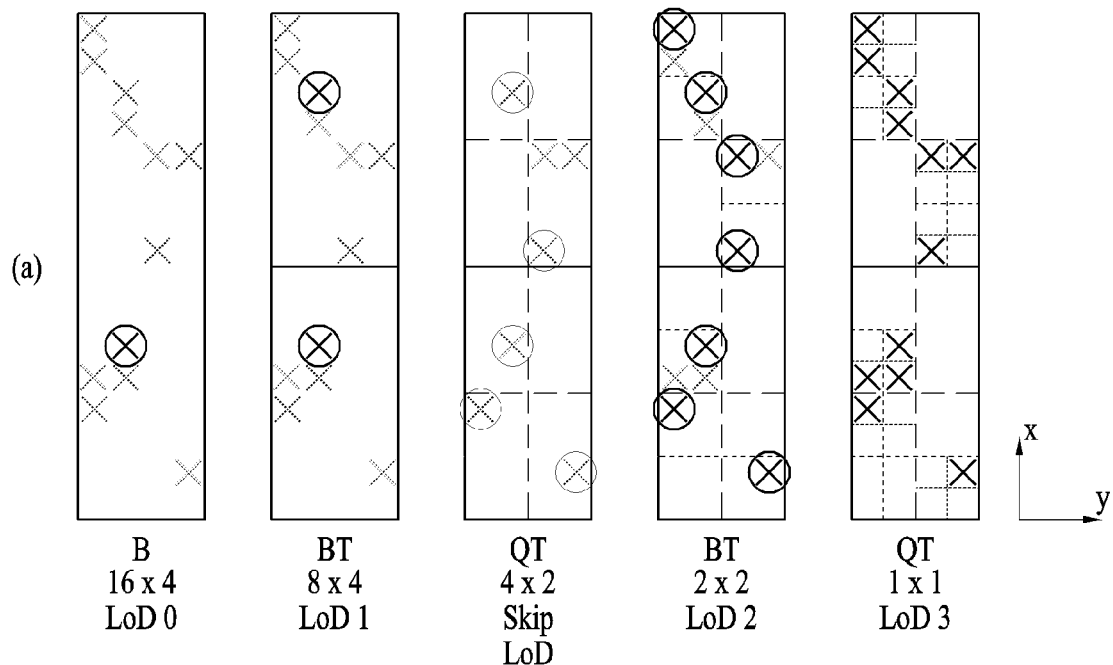
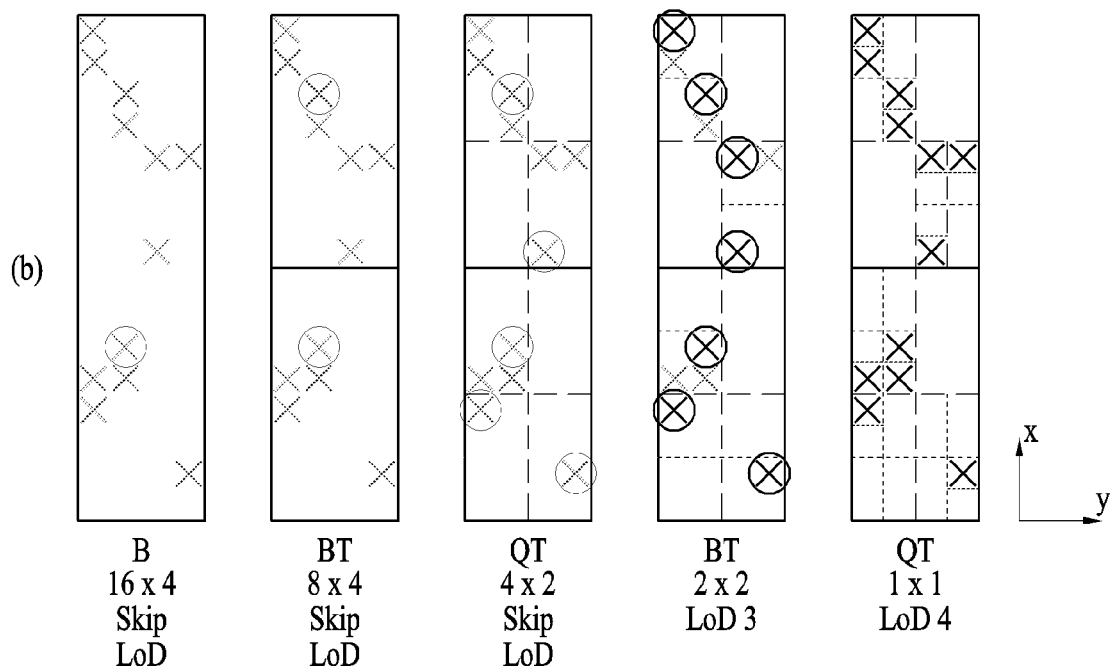

FIG. 34

| seq_parameter_set( ) { | Descriptor |
|---|---|
|   main_profile_compatibility_flag | u(1) |
|   unique_point_positions_constraint_flag | u(1) |
|   level_idc | u(8) |
|   sps_seq_parameter_set_id | ue(v) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_offset_log2_scale | ue(v) |
|     sps_bounding_box_size_width | ue(v) |
|     sps_bounding_box_size_height | ue(v) |
|     sps_bounding_box_size_depth | ue(v) |
|   } | |
|   sps_source_scale_factor_numerator_minus1 | ue(v) |
|   sps_source_scale_factor_denominator_minus1 | ue(v) |
|   sps_num_attribute_sets | ue(v) |
|   for( i = 0; i< sps_num_attribute_sets; i++ ) { | |
|     attribute_dimension_minus1[ i ] | ue(v) |
|     attribute_instance_id[ i ] | ue(v) |
|     if(attribute_dimension_minus1[ i ] > 0 ) | |
|       attribute_secondary_bitdepth_minus1[ i ] | ue(v) |
|       attribute_cicp_colour_primaries[ i ] | ue(v) |
|       attribute_cicp_transfer_characteristics[ i ] | ue(v) |
|       attribute_cicp_matrix_coeffs[ i ] | ue(v) |
|       attribute_cicp_video_full_range_flag[ i ] | u(1) |
|     known_attribute_label_flag[ i ] | u(1) |
|     if( known_attribute_label_flag[ i ] ) | |
|       known_attribute_label[ i ] | ue(v) |
|     else | |
|       attribute_label_four_bytes[ i ] | u(32) |
|   } | |
|   log2_max_frame_idx | u(5) |
|   axis_coding_order | u(3) |
|   sps_bypass_stream_enabled_flag | u(1) |
|   sps_extension_flag | u(1) |
|   if( sps_extension_flag ) | |
|     while( more_data_in_byte_stream( ) ) | |
|       sps_extension_data_flag | u(1) |
|   byte_alignment( ) | |
| } | |

FIG. 35

| geometry_parameter_set( ) { | Descriptor |
|---|---|
|   gps_geom_parameter_set_id | ue(v) |
|   gps_seq_parameter_set_id | ue(v) |
|   gps_box_present_flag | u(1) |
|   if( gps_box_present_flag ){ | |
|     gps_gsh_box_log2_scale_present_flag | u(1) |
|     if( gps_gsh_box_log2_scale_present_flag == 0 ) | |
|       gps_gsh_box_log2_scale | ue(v) |
|   } | |
|   unique_geometry_points_flag | u(1) |
|   geometry_planar_mode_flag | u(1) |
|   if( geometry_planar_mode_flag ){ | |
|     geom_planar_mode_th_idcm | ue(v) |
|     geom_planar_mode_th[ 1 ] | ue(v) |
|     geom_planar_mode_th[ 2 ] | ue(v) |
|   } | |
|   geometry_angular_mode_flag | u(1) |
|   if( geometry_angular_mode_flag ){ | |
|     lidar_head_position[0] | se(v) |
|     lidar_head_position[1] | se(v) |
|     lidar_head_position[2] | se(v) |
|     number_lasers | ue(v) |
|     for( i = 0; i < number_lasers; i++ ) { | |
|       laser_angle[ i ] | se(v) |
|       laser_correction[ i ] | se(v) |
|     } | |
|     planar_buffer_disabled | u(1) |
|     implicit_qtbt_angular_max_node_min_dim_log2_to_split_z | se(v) |
|     implicit_qtbt_angular_max_diff_to_split_z | se(v) |
|   } | |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   geom_scaling_enabled_flag | u(1) |
|   if( geom_scaling_enabled_flag ) | |
|     geom_base_qp | ue(v) |
|   gps_implicit_geom_partition_flag | u(1) |
|   if( gps_implicit_geom_partition_flag ) { | |
|     gps_max_num_implicit_qtbt_before_ot | ue(v) |
|     gps_min_size_implicit_qtbt | ue(v) |
|   } | |
|   gps_extension_flag | u(1) |
|   if( gps_extension_flag ) | |
|     while( more_data_in_byte_stream( ) ) | |
|       gps_extension_data_flag | u(1) |
|   byte_alignment( ) | |
| } | |

FIG. 36

| attribute_parameter_set ( ) { | Descriptor |
|---|---|
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   LodParametersPresent = ( attr_coding_type == 0 \|\| attr_coding_type == 2 ) ? 1 : 0 | |
|   if ( LodParametersPresent ) { | |
|     lifting_num_pred_nearest_neighbours_minus1 | ue(v) |
|     lifting_search_range_minus1 | ue(v) |
|     for ( k = 0; k < 3; k++ ) | |
|       lifting_neighbour_bias[ k ] | ue(v) |
|     if ( attr_coding_type == 2 ) | |
|       lifting_scalability_enabled_flag | u(1) |
|     if ( ! lifting_scalability_enabled_flag ) { | |
|       lifting_num_detail_levels_minus1<br>[Ed. The V7.0 code use the variable without minus1. It should be aligned] | ue(v) |
|       if ( lifting_num_detail_levels_minus1 > 0 ) { | |
|         lifting_lod_regular_sampling_enabled_flag | u(1) |
|         for ( idx = 0; idx < num_detail_levels_minus1; idx++ ) { | |
|           if ( lifting_lod_regular_sampling_enabled_flag ) | |
|             lifting_sampling_period_minus2[ idx ] | ue(v) |
|           else | |
|             lifting_sampling_distance_squared_scale_minus1[ idx ] | ue(v) |
|           if ( idx != 0 ) | |
|             lifting_sampling_distance_squared_offset[ idx ] | ue(v) |
|         } | |
|       } | |
|     } | |
|     if ( attr_coding_type == 0 ) { | |
|       lifting_adaptive_prediction_threshold | ue(v) |
|       lifting_intra_lod_prediction_num_layers | ue(v) |
|       lifting_max_num_direct_predictors | ue(v) |
|       inter_component_prediction_enabled_flag | u(1) |
|     } | |
|   } | |
|   if ( attribute_coding_type == 1 ) { //RAHT | |
|     raht_prediction_enabled_flag | u(1) |
|     if (raht_prediction_enabled_flag) { | |
|       raht_prediction_threshold0 | ue(v) |
|       raht_prediction_threshold1 | ue(v) |
|     } | |
|   } | |
|   aps_extension_flag | u(1) |
|   if( aps_extension_flag ) | |
|     while( more_data_in_byte_stream( ) ) | |
|       aps_extension_data_flag | u(1) |
|   byte_alignment( ) | |
| } | |

FIG. 37

| attribute_parameter_set( ) { | Descriptor |
|---|---|
| .... | |
|    constrained_QTBT_flag | u(1) |
|    if( constrained_QTBT_flag ) | |
|       max_LoD_depth_for_octree_based_LoD_generation | u(8) |
|    num_LoD_minus1 | u(8) |
|    for( i=0; i< num_LoD_minus1+1; i++) { | |
|       cubic_node_flag | u(1) |
|       if( !cubic_node_flag ) | |
|          node_direction         // z, y, x, yz, xz, xy | u(3) |
|       if( constrained_QTBT_flag ) | |
|          no_representation_flag | u(1) |
|       node_size_x | |
|       node_size_y | |
|       node_size_z | |
|    } | |
|    LoD_sampling_method | u(4) |
| .... | |

FIG. 38

| geometry_slice_bitstream( ) { | Descriptor |
|---|---|
| geometry_slice_header( ) | |
| geometry_slice_data( ) | |
| } | |

FIG. 39

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
|     if( gps_gsh_box_log2_scale_present_flag ) | |
|         gsh_box_log2_scale | ue(v) |
|     gsh_box_origin_x | ue(v) |
|     gsh_box_origin_y | ue(v) |
|     gsh_box_origin_z | ue(v) |
| } | |
| if ( gps_implicit_geom_partition_flag ) { | |
|     gsh_log2_max_nodesize_x | ue(v) |
|     gsh_log2_max_nodesize_y_minus_x | se(v) |
|     gsh_log2_max_nodesize_z_minus_y | se(v) |
| } else { | |
|     gsh_log2_max_nodesize | ue(v) |
| } | |
| if( geom_scaling_enabled_flag ) { | |
|     geom_slice_qp_offset | se(v) |
|     geom_octree_qp_offsets_enabled_flag | u(1) |
|     if( geom_octree_qp_offsets_enabled_flag ) | |
|         geom_octree_qp_offsets_depth | ue(v) |
| } | |
| byte_alignment( ) | |
| } | |

FIG. 40

| geometry_slice_data( ) { | Descriptor |
|---|---|
|     for( depth = 0; depth < MaxGeometryOctreeDepth; depth++ ) { | |
|         for( nodeIdx = 0; nodeIdx < NumNodesAtDepth[ depth ]; nodeIdx++ ) { | |
|             xN = NodeX[ depth ][ nodeIdx ] | |
|             yN = NodeY[ depth ][ nodeIdx ] | |
|             zN = NodeZ[ depth ][ nodeIdx ] | |
|             geometry_node( depth, nodeIdx, xN, yN, zN ) | |
|         } | |
|     } | |
|     if ( log2_trisoup_node_size > 0 ) | |
|         geometry_trisoup_data( ) | |
| } | |

FIG. 41

| attribute_slice_bitstream( ) { | Descriptor |
|---|---|
| attribute_slice_header( ) | |
| attribute_slice_data( ) | |
| } | |

FIG. 42

| attribute_slice_header( ) { | Descriptor |
|---|---|
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { | |
|     ash_attr_qp_delta_luma | se(v) |
|     if( attribute_dimension_minus1[ ash_attr_sps_attr_idx ] > 0 ) | |
|       ash_attr_qp_delta_chroma | se(v) |
|   } | |
|   ash_attr_layer_qp_delta_present_flag | u(1) |
|   if ( ash_attr_layer_qp_delta_present_flag ) { | |
|     ash_attr_num_layer_qp_minus1 | ue(v) |
|     for( i = 0; i < NumLayerQp; i++ ){ | |
|       ash_attr_layer_qp_delta_luma[i] | se(v) |
|       if( attribute_dimension_minus1[ ash_attr_sps_attr_idx ] > 0 ) | |
|         ash_attr_layer_qp_delta_chroma[i] | se(v) |
|     } | |
|   } | |
|   ash_attr_region_qp_delta_present_flag | u(1) |
|   if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
|   } | |
|   byte_alignment( ) | |
| } | |

FIG. 43

| attribute_slice_header( ) { | Descriptor |
|---|---|
| .... | |
|   constrained_QTBT_flag | u(1) |
|   if( constrained_QTBT_flag ) | |
|     max_LoD_depth_for_octree_based_LoD_generation | u(8) |
|   num_LoD_minus1 | u(8) |
|   for( i=0; i< num_LoD_minus1+1; i++) { | |
|     cubic_node_flag | u(1) |
|     if( !cubic_node_flag ) | |
|       node_direction      // z, y, x, yz, xz, xy | u(3) |
|     if( constrained_QTBT_flag ) | |
|       no_representation_flag | u(1) |
|     node_size_x | |
|     node_size_y | |
|     node_size_z | |
|   } | |
|   LoD_sampling_method | u(4) |
| .... | |

FIG. 44

| attribute_slice_data( ) { | Descriptor |
|---|---|
| dimension = attribute_dimension[ ash_attr_sps_attr_idx ] | |
| zerorun | ae(v) |
| for( i = 0; i < pointCount; i++ ) { | |
| if( attr_coding_type = = 0 && | |
| maxPredDiff[ i ] > lifting_adaptive_prediction_threshold && | |
| MaxNumPredictors > 1 ) { | |
| predIndex[ i ] | ae(v) |
| } | |
| if( zerorun > 0 ) { | |
| for( k = 0; k < dimension ; k++ ) | |
| values[ k ][ i ] = 0 | |
| zerorun -= 1 | |
| } | |
| else { | |
| attribute_coding( dimension, i ) | ae(v) |
| zerorun | ae(v) |
| } | |
| } | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD THAT GENERATE LODS BASED ON AN OCTREE

CROSS-REFERENCE TO RELATED APPLICATION

This application is the National Stage filing under 35 U.S.C. 371 of International Application No. PCT/KR2021/006726, filed May 31, 2021, which claims priority to and the benefit of Korean Patent Application No. 10-2020-0065154, filed on May 29, 2020, the disclosure of which is incorporated herein by reference in its entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), extended reality (XR), and self-driving services. However, tens of thousands to hundreds of thousands of point data are required to represent point cloud content. Therefore, there is a need for a method for efficiently processing a large amount of point data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a point cloud data transmission method, a point cloud data reception device, and a point cloud data reception method for matching a geometry coding layer with and an attribute coding layer scalable coding by performing attribute compression in consideration of an asymmetric point distribution.

Another object of the present disclosure is to provide a point cloud data transmission device, a point cloud data transmission method, a point cloud data reception device, and a point cloud data reception method for increasing an attribute compression efficiency of content having an asymmetric point distribution by configuring a scalable layer based on an asymmetric neighbor node in using an LoD-based scalable layer in scalable point cloud coding.

Objects of the present disclosure are not limited to the aforementioned objects, and other objects of the present disclosure which are not mentioned above will become apparent to those having ordinary skill in the art upon examination of the following description.

Technical Solution

The above objects and other objects of the present disclosure can be achieved by providing a method of transmitting point cloud data. The method may include acquiring point cloud data, encoding geometry information including positions of points of the point cloud data by applying a geometry tree, encoding attribute information including attribute values of the points of the point cloud data based on the geometry tree, and transmitting the encoded geometry information, the encoded attribute information, and signaling information.

In one embodiment, the encoding of the attribute information may include generating Levels of Detail (LoDs) based on the geometry tree, and compressing the attribute information based on the LoDs.

In one embodiment, the geometry tree may be generated by a combination of two or more of an octree, a quadtree, or a binary tree.

In one embodiment, the generation of the LODs may include configuring one or more sub-nodes partitioned from occupied nodes of a current depth in the geometry tree as neighbors, and selecting one point from among points belonging to the one or more sub-nodes configured as the neighbors, wherein the configuring of the neighbors and the selecting may be performed on each of the occupied nodes of the current depth to generate a LoD corresponding to the current depth.

In one embodiment, a number of sub-nodes configured as the neighbors may vary depending on whether a tree type of the current depth is an octree, a quadtree, or a binary tree.

In one embodiment, the selecting of the point may be performed based on a Morton code order of the points belonging to the one or more sub-nodes configured as the neighbors.

A device for transmitting point cloud data according to embodiments may include an acquirer configured to acquire point cloud data, a geometry encoder configured to encode geometry information including positions of points of the point cloud data by applying a geometry tree, an attribute encoder configured to encode attribute information including attribute values of the points of the point cloud data based on the geometry tree, and a transmitter configured to transmit the encoded geometry information, the encoded attribute information, and signaling information.

In one embodiment, the attribute encoder may include a LoD generator configured to generate Levels of Detail (LoDs) based on the geometry tree, and a compressor configured to compress the attribute information based on the LoDs.

In one embodiment, the geometry tree may be generated by a combination of two or more of an octree, a quadtree, or a binary tree.

In one embodiment, the LOD generator may be configured to configure one or more sub-nodes partitioned from occupied nodes of a current depth in the geometry tree as neighbors, and select one point from among points belonging to the one or more sub-nodes configured as the neighbors, wherein the configuration and the selection may be performed on each of the occupied nodes of the current depth to generate a LoD corresponding to the current depth.

In one embodiment, a number of sub-nodes configured as the neighbors may vary depending on whether a tree type of the current depth is an octree, a quadtree, or a binary tree.

In one embodiment, the LOD generator may select the point based on a Morton code order of the points belonging to the one or more sub-nodes configured as the neighbors.

A method of receiving point cloud data according to embodiments may include receiving geometry information, attribute information, and signaling information, decoding the geometry information based on the signaling information and a geometry tree, decoding the attribute information based on the signaling information and the geometry tree, and rendering the point cloud data reconstructed based on the decoded geometry information and the decoded attribute information.

In one embodiment, the decoded geometry information may include positions of points of the reconstructed point cloud data, and the decoded attribute information may include attribute values of the points of the reconstructed point cloud data.

In one embodiment, the decoding of the attribute information may include generating Levels of Detail (LoDs) based on the geometry tree, and reconstructing the attribute information based on the LoDs.

In one embodiment, the geometry tree may be generated by a combination of two or more of an octree, a quadtree, or a binary tree.

In one embodiment, the generation of the LODs may include configuring one or more sub-nodes partitioned from occupied nodes of a current depth in the geometry tree as neighbors, and selecting one point from among points belonging to the one or more sub-nodes configured as the neighbors, wherein the configuring of the neighbors and the selecting may be performed on each of the occupied nodes of the current depth to generate a LoD corresponding to the current depth.

In one embodiment, a number of sub-nodes configured as the neighbors may vary depending on whether a tree type of the current depth is an octree, a quadtree, or a binary tree.

In one embodiment, the selecting of the point may be performed based on a Morton code order of the points belonging to the one or more sub-nodes configured as the neighbors.

A device for receiving point cloud data according to embodiments may include a receiver configured to receive geometry information, attribute information, and signaling information, a geometry decoder configured to decode the geometry information based on the signaling information and a geometry tree, an attribute decoder configured to decode the attribute information based on the signaling information and the geometry tree, and a renderer configured to render the point cloud data reconstructed based on the decoded geometry information and the decoded attribute information.

In one embodiment, the decoded geometry information may include positions of points of the reconstructed point cloud data, and the decoded attribute information may include attribute values of the points of the reconstructed point cloud data.

In one embodiment, the attribute decoder may include a LOD generator configured to generate Levels of Detail (LoDs) based on the geometry tree, and a reconstructor configured to reconstruct the attribute information based on the LoDs.

In one embodiment, the geometry tree may be generated by a combination of two or more of an octree, a quadtree, or a binary tree.

In one embodiment, the LOD generator may be configured to configure one or more sub-nodes partitioned from occupied nodes of a current depth in the geometry tree as neighbors, and select one point from among points belonging to the one or more sub-nodes configured as the neighbors, wherein the configuration and the selection may be performed on each of the occupied nodes of the current depth to generate a LoD corresponding to the current depth.

In one embodiment, a number of sub-nodes configured as the neighbors may vary depending on whether a tree type of the current depth is an octree, a quadtree, or a binary tree.

In one embodiment, the LoD generator may select the point based on a Morton code order of the points belonging to the one or more sub-nodes configured as the neighbors.

Advantageous Effects

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefore, thereby improving encoding and decoding performance of the point cloud.

A point cloud data transmission device, a point cloud data transmission method, a point cloud data reception device, and a point cloud data reception method according to embodiments may increase the attribute compression efficiency of content having an asymmetric point distribution by configuring a scalable layer using asymmetric neighbor nodes in using an LoD-based scalable layer in scalable point cloud coding.

A point cloud data transmission device, a point cloud data transmission method, a point cloud data reception device, and a point cloud data reception method according to embodiments may generate LoDs for attribute compression using an OT/QT/BT-based geometry tree structure used for geometry compression, thereby matching the number of points of the geometry with the number of points of the attribute for LoD configuration at the corresponding depth in scalable representation. According to embodiments, an intermediate layer may be output based on a hierarchical structure of point cloud data. This case may be defined as a scalable representation.

A point cloud data transmission device, a point cloud data transmission method, a point cloud data reception device, and a point cloud data reception method according to embodiments may be restricted to generate LoD(s) only for the depth(s) matching the QT (OT in three-dimensional space)-based LoD generation method in the geometry tree structure used for geometry compression. Thereby, point mismatch between geometry and attributes may be prevented in scalable representation.

A point cloud data transmission device, a point cloud data transmission method, a point cloud data reception device, and a point cloud data reception method according to embodiments may match points/nodes with attribute information in a one-to-one correspondence manner according to a depth in the geometry tree when QTBT-based geometry coding is performed for a scalable coding application field. Thereby, scalable representation may be enabled for all depths or for some matching depths.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 6 illustrates an example of octree and occupancy code according to embodiments.

FIG. 7 illustrates an example of a neighbor node pattern according to embodiments.

FIGS. 24-(a) and 24-(b) are diagrams illustrating examples of LoD generation for each depth based on a geometry tree structure used to partition point cloud data distributed in a 2D plane.

FIGS. 25-(a) and 25-(b) are diagrams illustrating other examples of LoD generation for each depth based on a geometry tree structure used to partition point cloud data distributed on a 2D plane.

FIGS. 28-(a) and 28(b) are diagrams illustrating examples of configuration of LoD skip according to the conditions described above at some depths in a geometry tree structure used to partition point cloud data distributed in a 2D plane.

FIG. 34 shows an embodiment of a syntax structure of a sequence parameter set according to the present disclosure.

FIG. 35 shows an example of a syntax structure of a geometry parameter set according to embodiments.

FIG. 36 shows an example of a syntax structure of an attribute parameter set according to embodiments.

FIG. 37 shows an example of a syntax structure of an attribute parameter set including information related to LoD-based attribute compression according to embodiments.

FIG. 38 shows an exemplary syntax structure of geometry_slice_bitstream( ) according to embodiments.

FIG. 39 shows an exemplary syntax structure of a geometry slice header according to embodiments.

FIG. 40 shows an exemplary syntax structure of geometry slice data according to embodiments.

FIG. 41 shows an exemplary syntax structure of attribute_slice_bitstream( ) according to embodiments.

FIG. 42 shows an exemplary syntax structure of an attribute slice header according to embodiments.

FIG. 42 shows an exemplary syntax structure of an attribute parameter set including information related to LoD-based attribute compression according to embodiments.

FIG. 44 shows an exemplary syntax structure of attribute slice data according to embodiments.

BEST MODE

Figure 1:
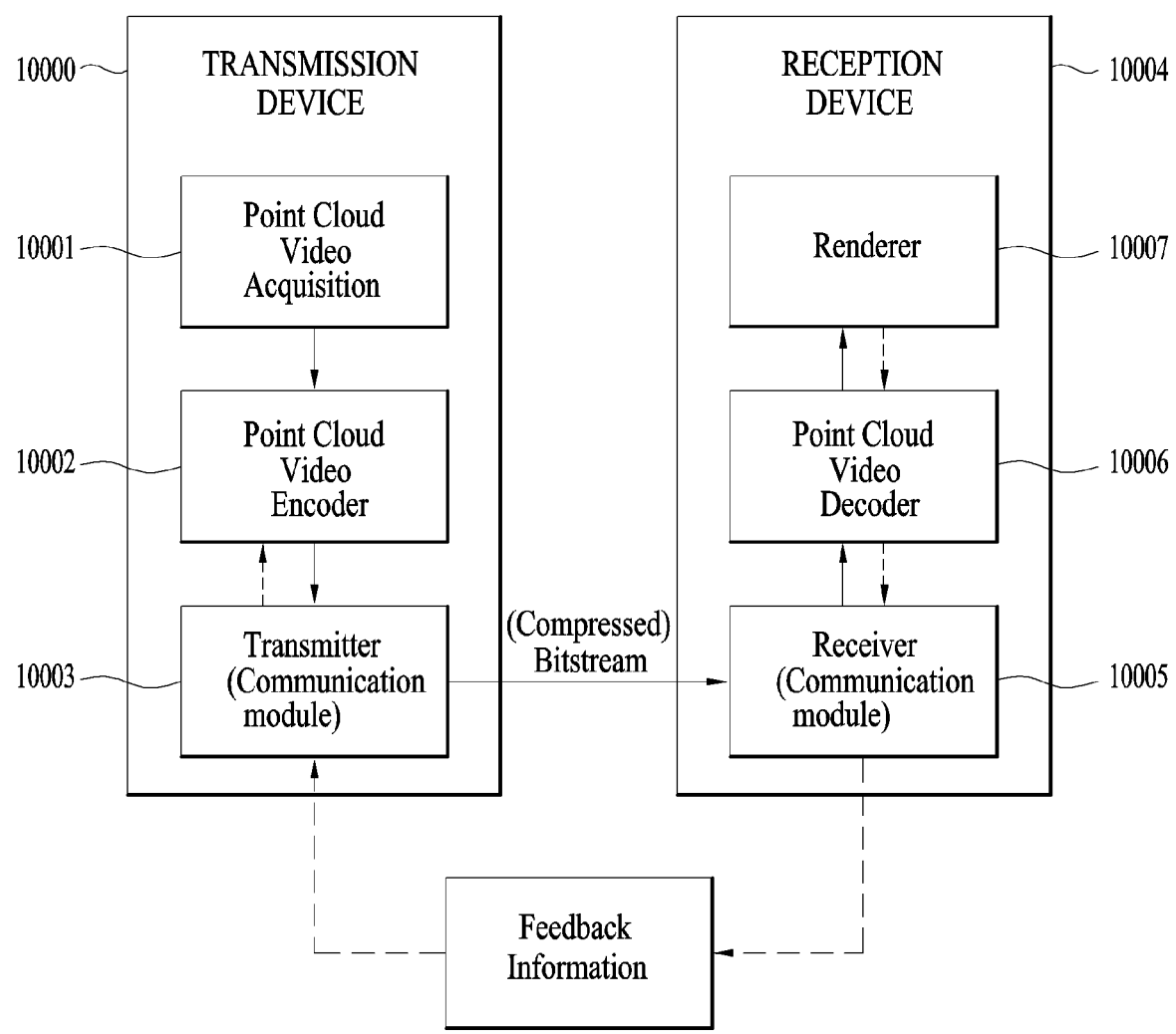
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation.

According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. According to an embodiment, the renderer 10007 may render the decoded point cloud data according to a viewport. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to the embodiments may represent information about a position, orientation, angle, and motion of a user's head. The reception device 10004 according to the embodiments may calculate viewport information based on the head orientation information. The viewport information is information about a region of a point cloud video that the user is viewing (that is, a region that the user is currently viewing). That is, the viewport information is information about a region that the user is currently viewing in the point cloud video. In other words, the viewport or viewport region may represent a region that the user is viewing in the point cloud video. A viewpoint is a point that the user is viewing in the point cloud video, and may represent a center point of the viewport region. That is, the viewport is a region centered on a viewpoint, and the size and shape of the region may be determined by a field of view (FOV). Accordingly, the reception device 10004 may extract the viewport information based on a vertical or horizontal FOV supported by the device as well as the head orientation information. In addition, the reception device 10004 may perform gaze analysis or the like based on the head orientation information and/or the viewport information to determine the way the user consumes a point cloud video, a region that the user gazes at in the point cloud video, and the gaze time. According to embodiments, the reception device 10004 may transmit feedback information including the result of the gaze analysis to the transmission device 10000. According to embodiments, a device such as a VR/XR/AR/MR display may extract a viewport region based on the position/orientation of a user's head and a vertical or horizontal FOV supported by the device. According to embodiments, the head orientation information and the viewport information may be referred to as feedback information, signaling information, or metadata.

The feedback information according to the embodiments may be acquired in the rendering and/or display process. The feedback information may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The feedback information may not only be transmitted to the transmitting side, but also be consumed by the receiving side. That is, the point cloud content providing system may process (encode/decode/render) point cloud data based on the feedback information. For example, the point cloud video decoder 10006 and the renderer 10007 may preferentially decode and render only the point cloud video for a region currently viewed by the user, based on the feedback information, that is, the head orientation information and/or the viewport information.

The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
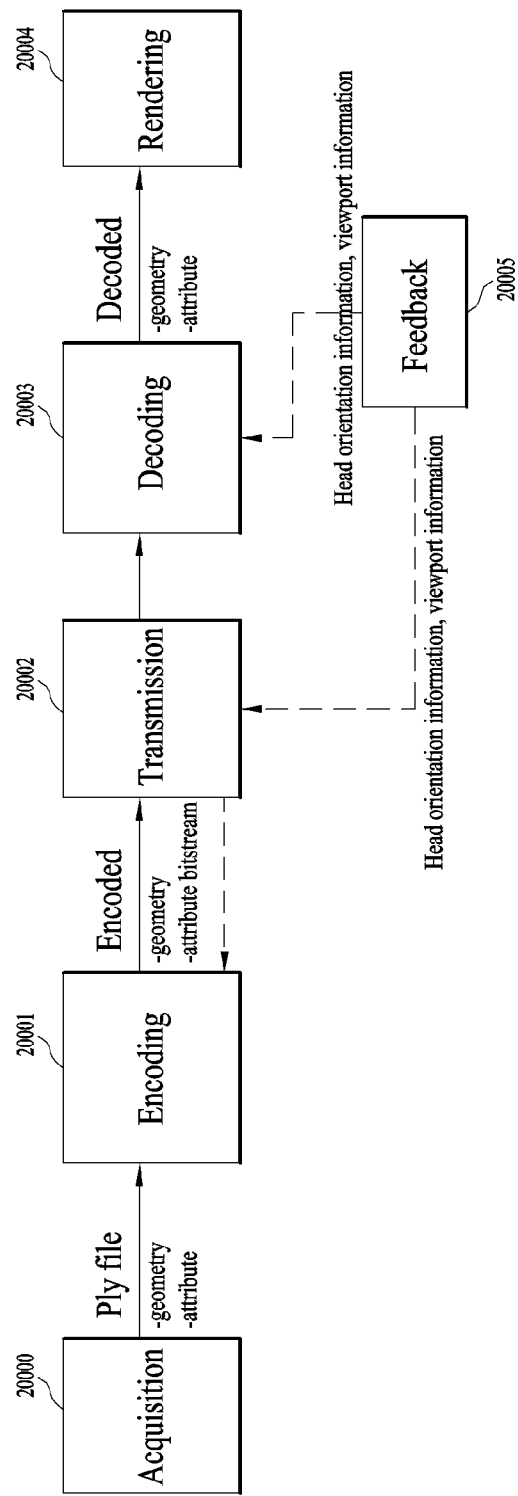
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC). The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like.

The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
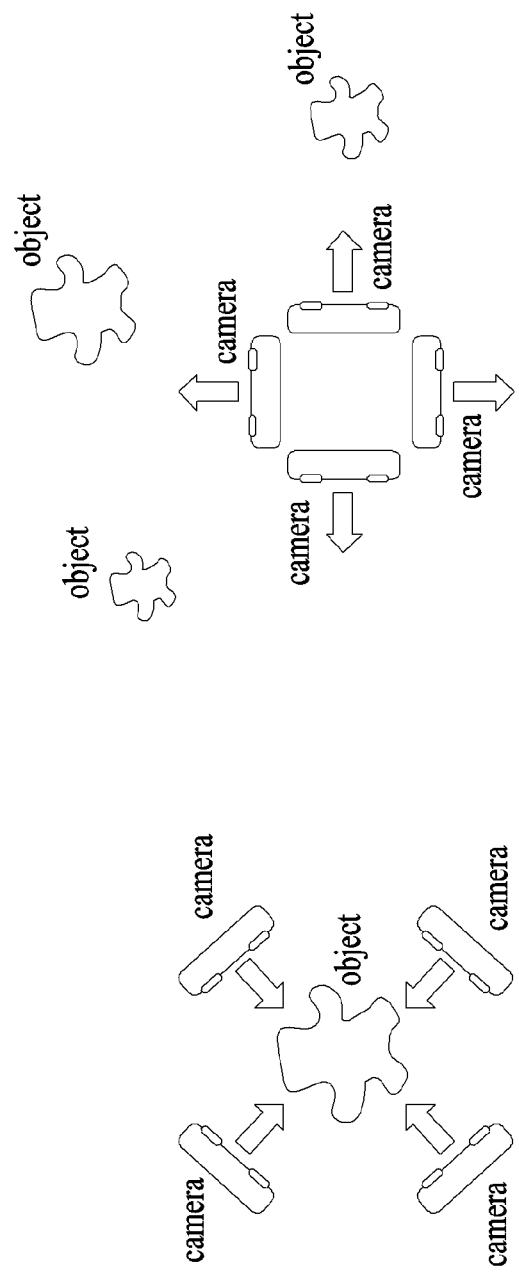
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
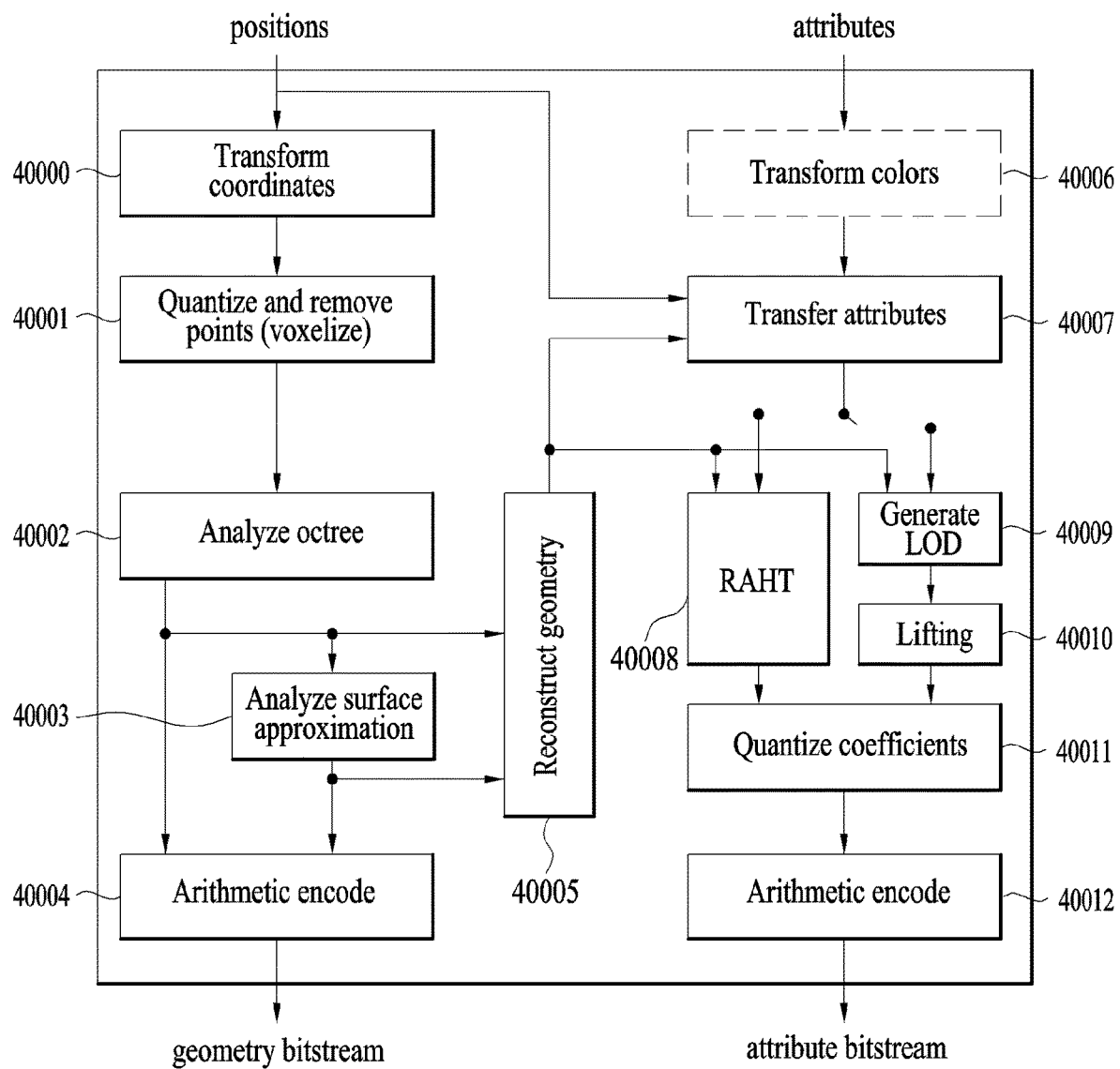
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
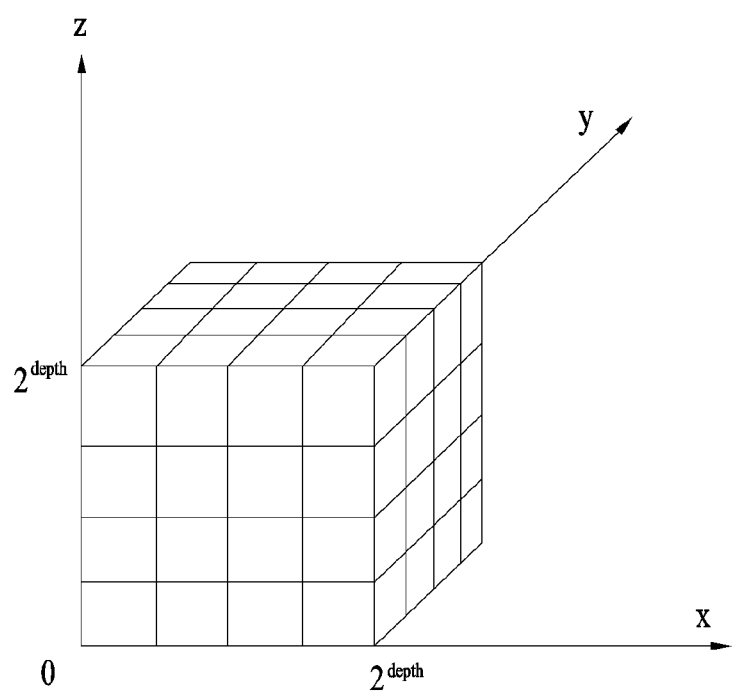
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x_n^{int}$, $y_n^{int}$, $z_n^{int}$) denotes the positions (or position values) of quantized points.

$$d = \text{Ceil}(\text{Log } 2(\text{Max}(x_n^{int}, y_n^{int}, z_n^{int}, n=1, \ldots, N)+1)) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model.

The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

Equation 2

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} \qquad \text{①}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \qquad \text{②}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \qquad \text{③}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through atan 2(bi, ai), and the vertices are ordered based on the value of $\theta$. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

Triangles formed from vertices ordered 1, . . . , n

| n | Triangles |
|---|---|
|   | (1, 2, 3) |
|   | (1, 2, 3), (3, 4, 1) |
|   | (1, 2, 3), (3, 4, 5), (5, 1, 3) |
|   | (1, 2, 3), (3, 4, 5), (5, 6, 1), (1, 3, 5) |
|   | (1, 2, 3), (3, 4, 5), (5, 6, 7), (7, 1, 3), (3, 5, 7) |
|   | (1, 2, 3), (3, 4, 5), (5, 6, 7), (7, 8, 1), (1, 3, 5), (5, 7, 1) |
|   | (1, 2, 3), (3, 4, 5), (5, 6, 7), (7, 8, 9), (9, 1, 3), (3, 5, 7), (7, 9, 3) |
| 0 | (1, 2, 3), (3, 4, 5), (5, 6, 7), (7, 8, 9), (9, 10, 1), (1, 3, 5), (5, 7, 9), (9, 1, 5) |
| 1 | (1, 2, 3), (3, 4, 5), (5, 6, 7), (7, 8, 9), (9, 10, 11), (11, 1, 3), (3, 5, 7), (7, 9, 11), (11, 3, 7) |
| 2 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments. In order to increase the compression efficiency of the point cloud video, the point cloud video encoder according to the embodiments may perform entropy coding based on context adaptive arithmetic coding.

The point cloud video encoder may entropy encode based on a context adaptive arithmetic coding to enhance compression efficiency of the point cloud video.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
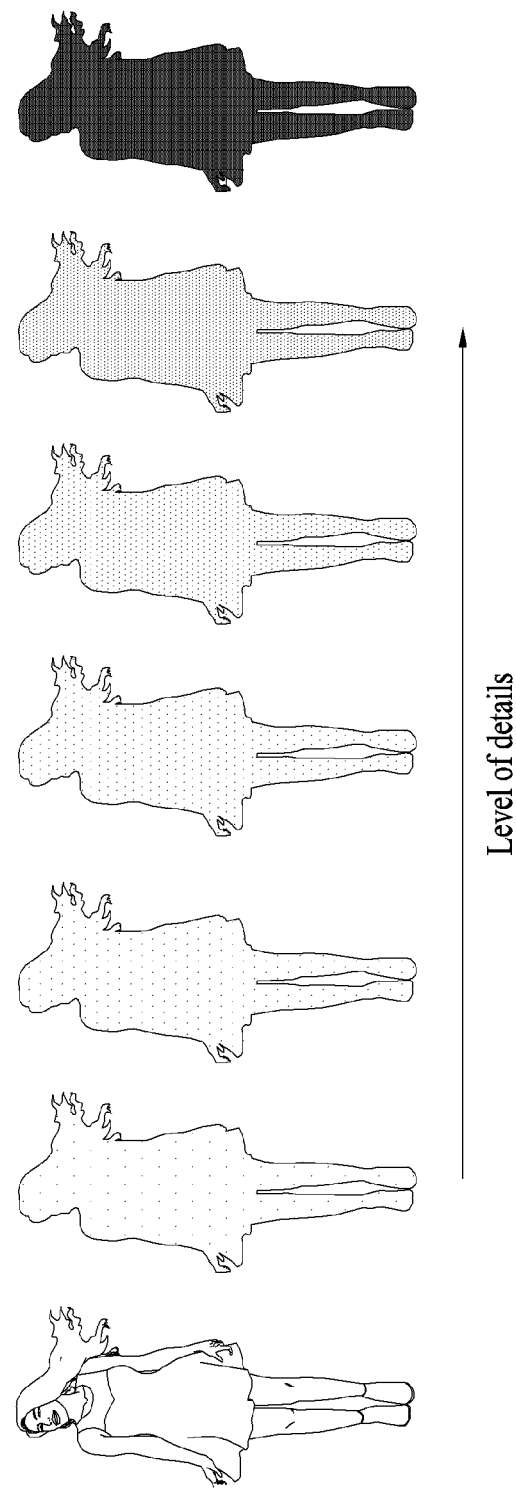
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (or reorganize) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
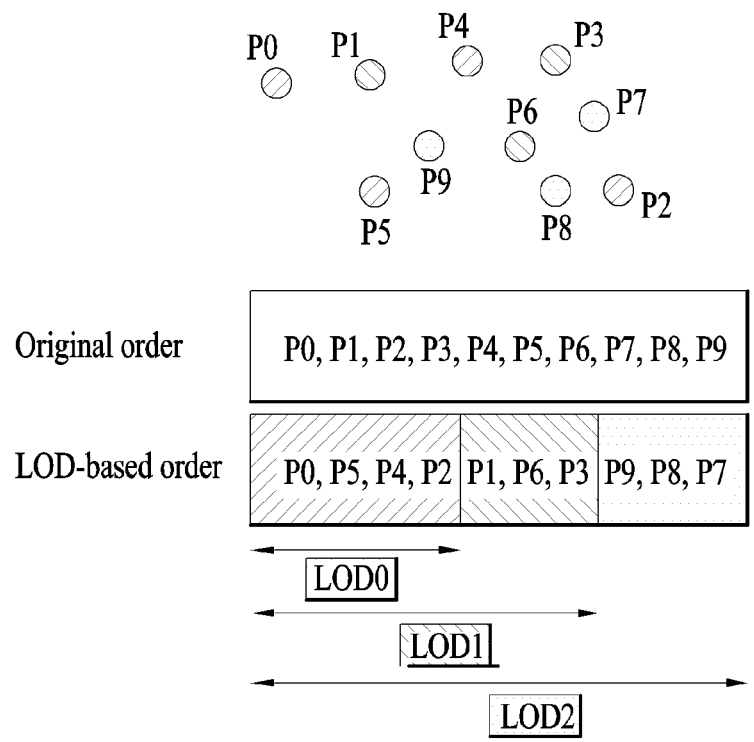
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = \quad \text{Equation 3}$$

$$T_{w1w2}\begin{bmatrix} g_{l_{2x,y,z}} \\ g_{l_{2x+1,y,z}} \end{bmatrix} \quad T_{w1w2} = \frac{1}{\sqrt{w1+w2}}\begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as Equation 4.

$$\begin{bmatrix} gDC \\ h0_{0,0,0} \end{bmatrix} = T_{w1000\,w1001}\begin{bmatrix} g1_{0,0,0z} \\ g1_{0,0,1} \end{bmatrix} \quad \text{Equation 4}$$

The value of gDC is also quantized and subjected to entropy coding like the high-pass coefficients.

Figure 10:
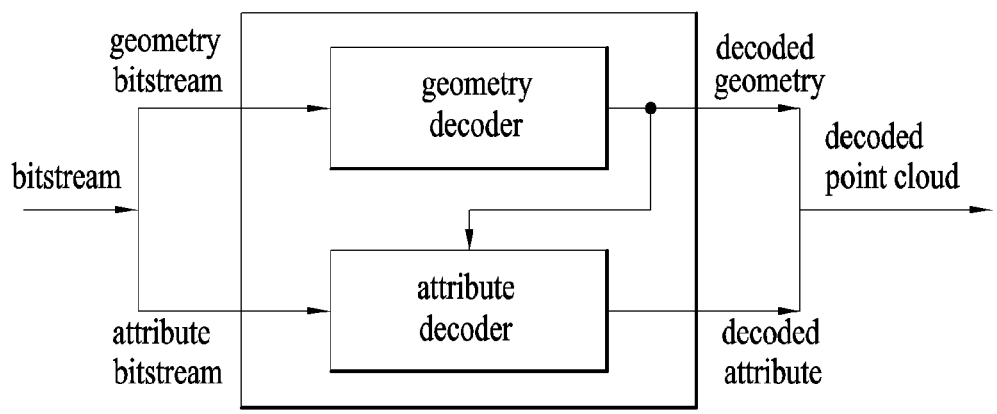
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
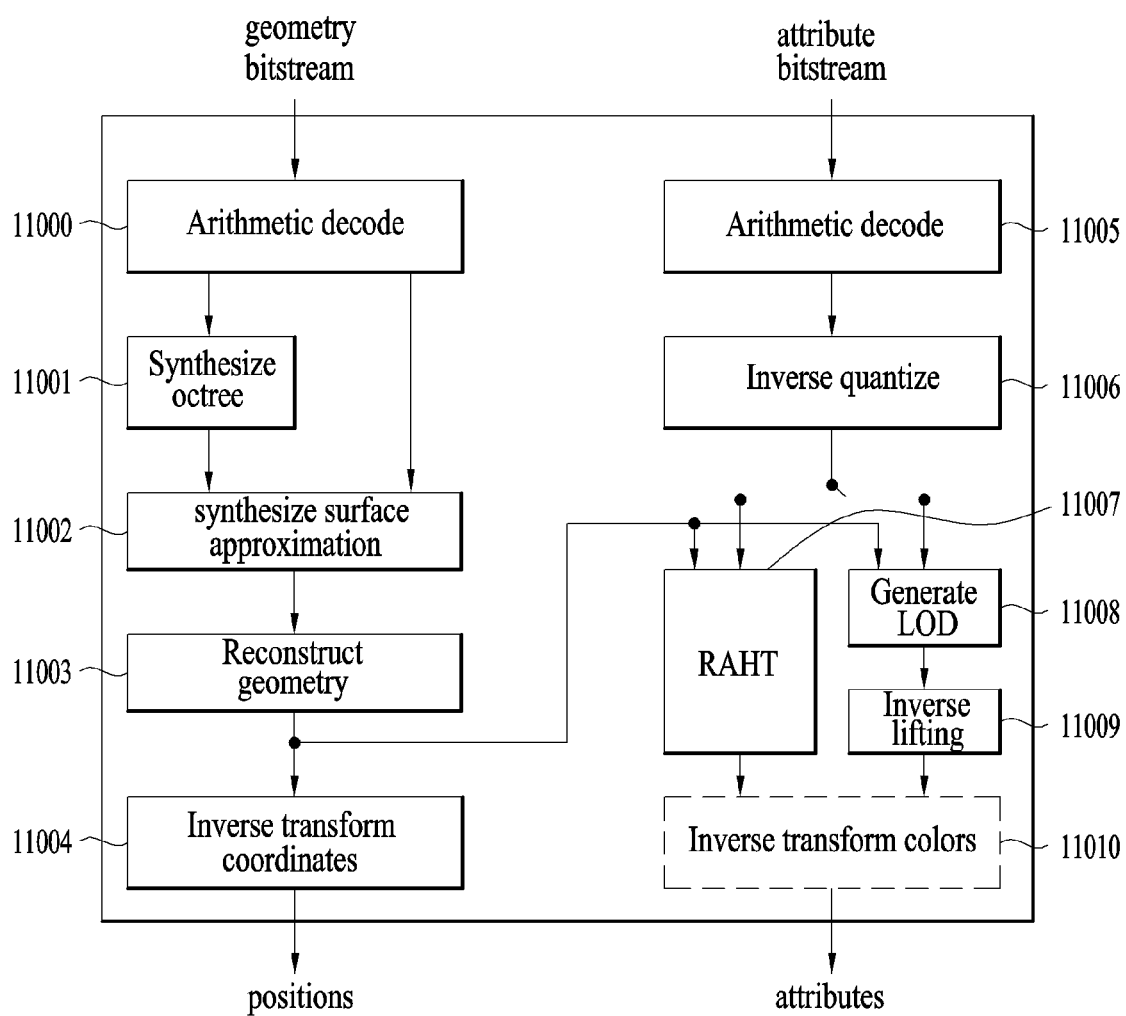
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is a reverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
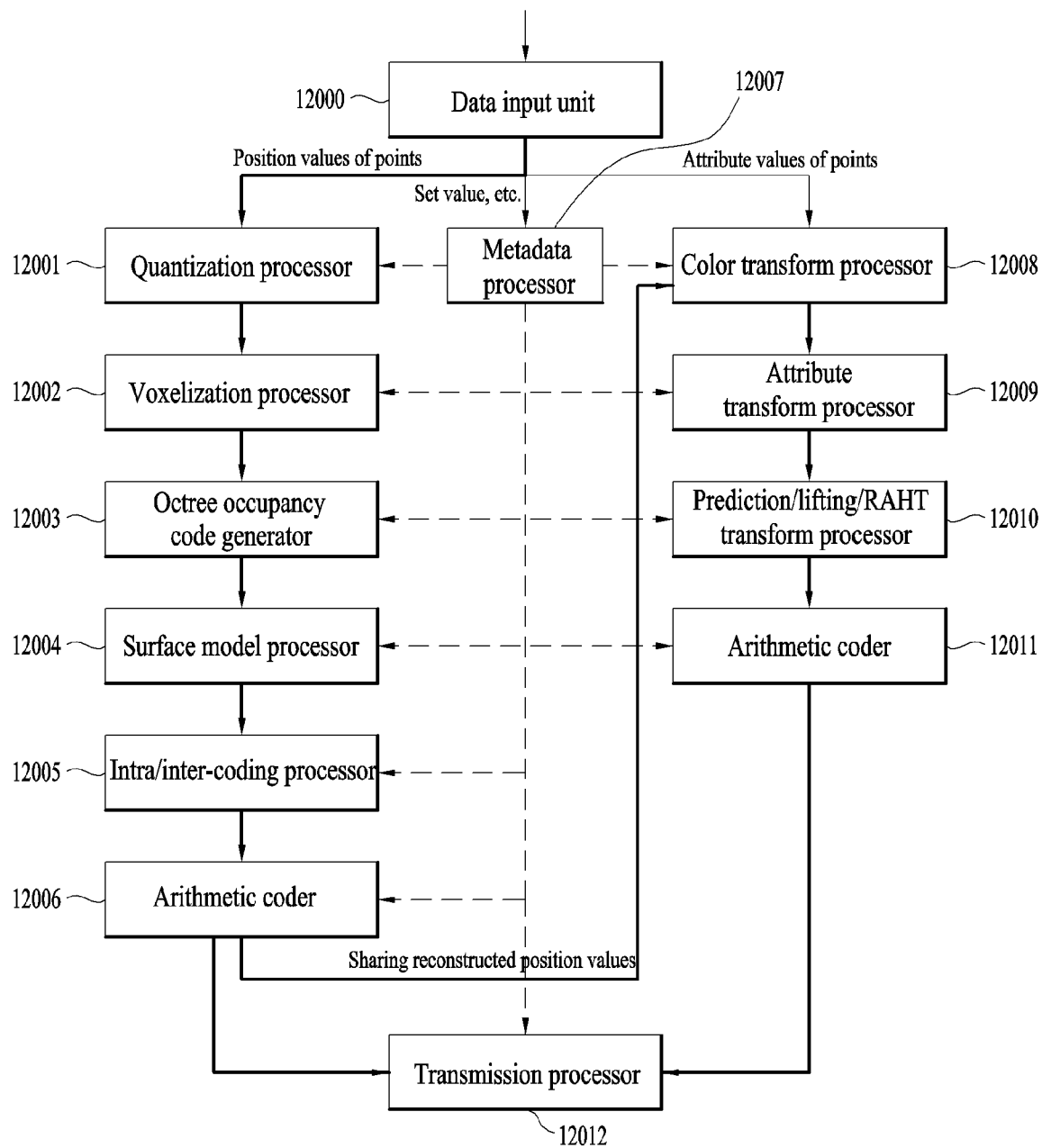
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom0⁰ and one or more attribute bitstreams Attr0⁰ and Attr1⁰. The TPS (or tile inventory) according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
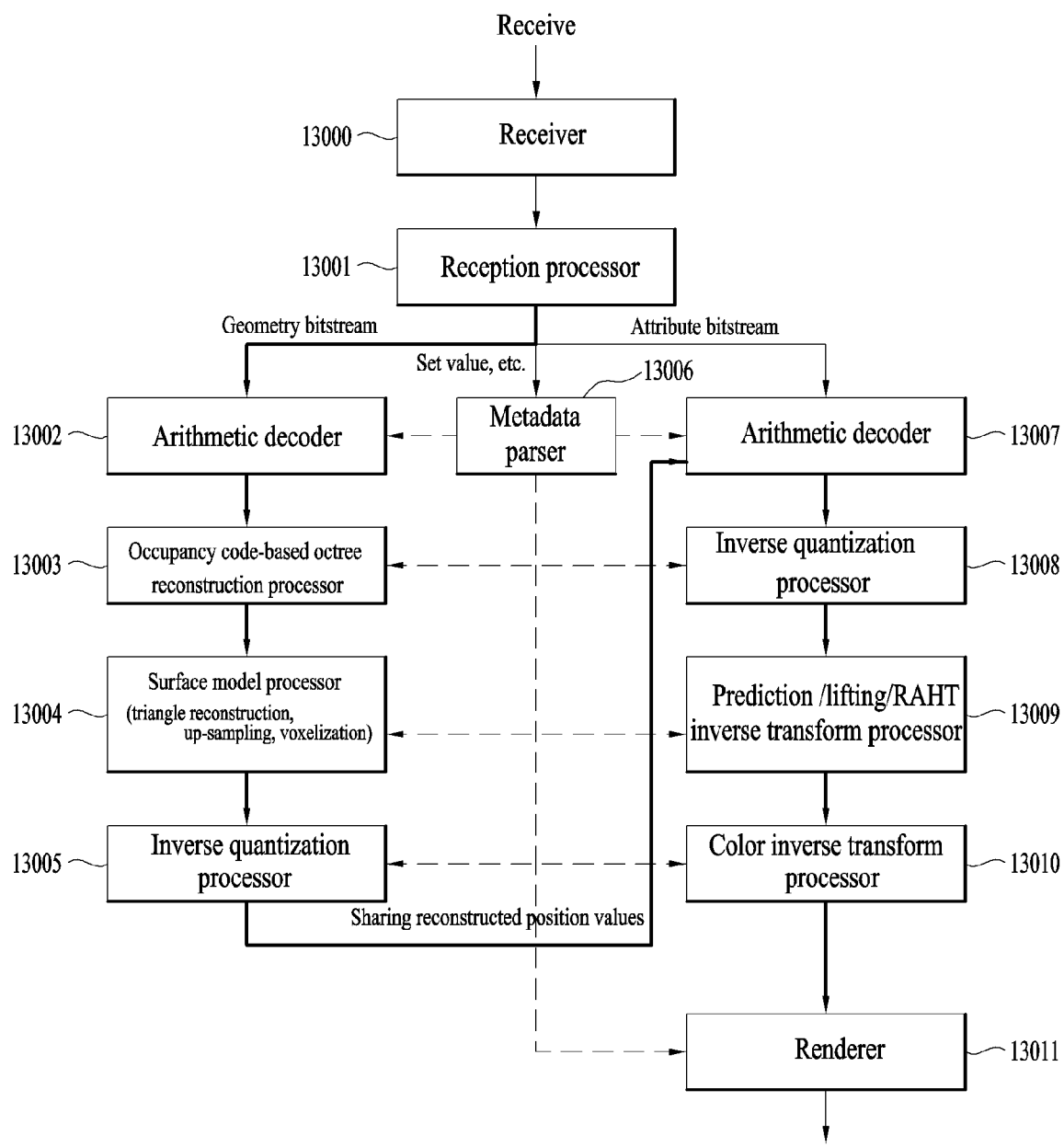
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding which are the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
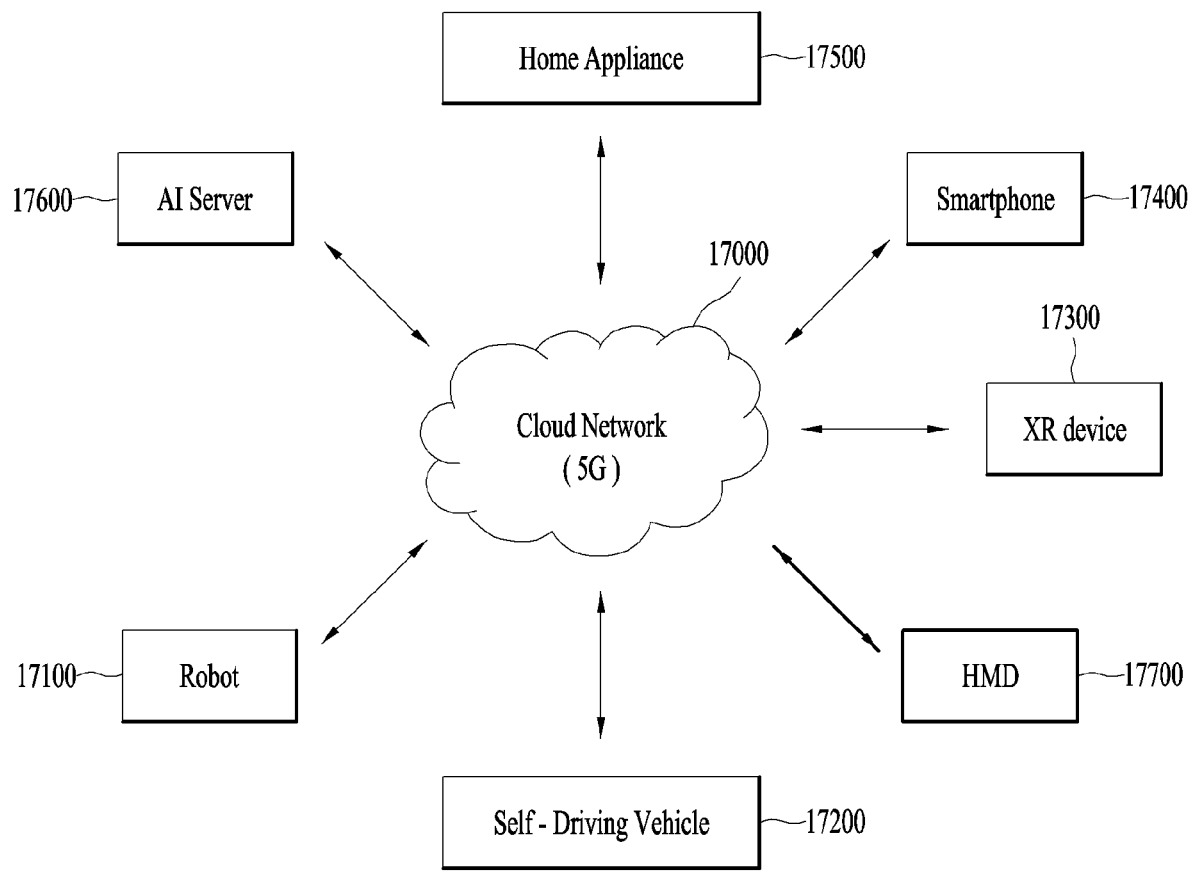
FIG. 14 illustrates an exemplary structure operable in connection with point cloud data methods/devices according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described above, point cloud data may be composed of a set of points, and each point may have geometry information and attribute information. The geometry information is three-dimensional position information (xyz) about each point, and the attribute information is a color (RGB, YUV, etc.) and/or reflectance value of the point.

Figure 45:
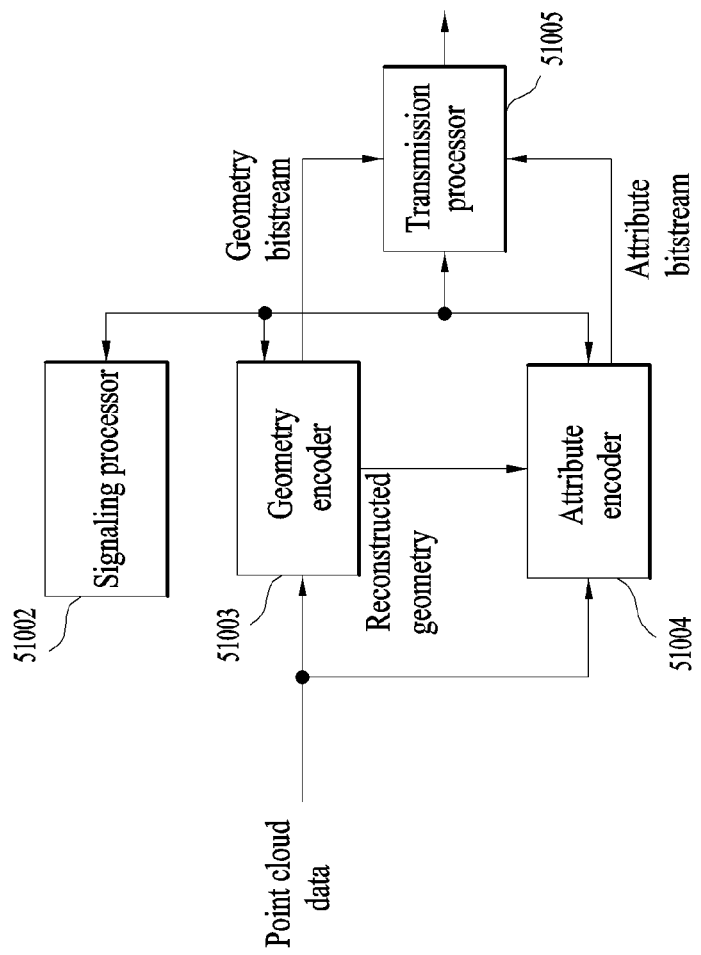
FIG. 45 illustrates another example of a point cloud transmission device according to embodiments.
Figure 48:
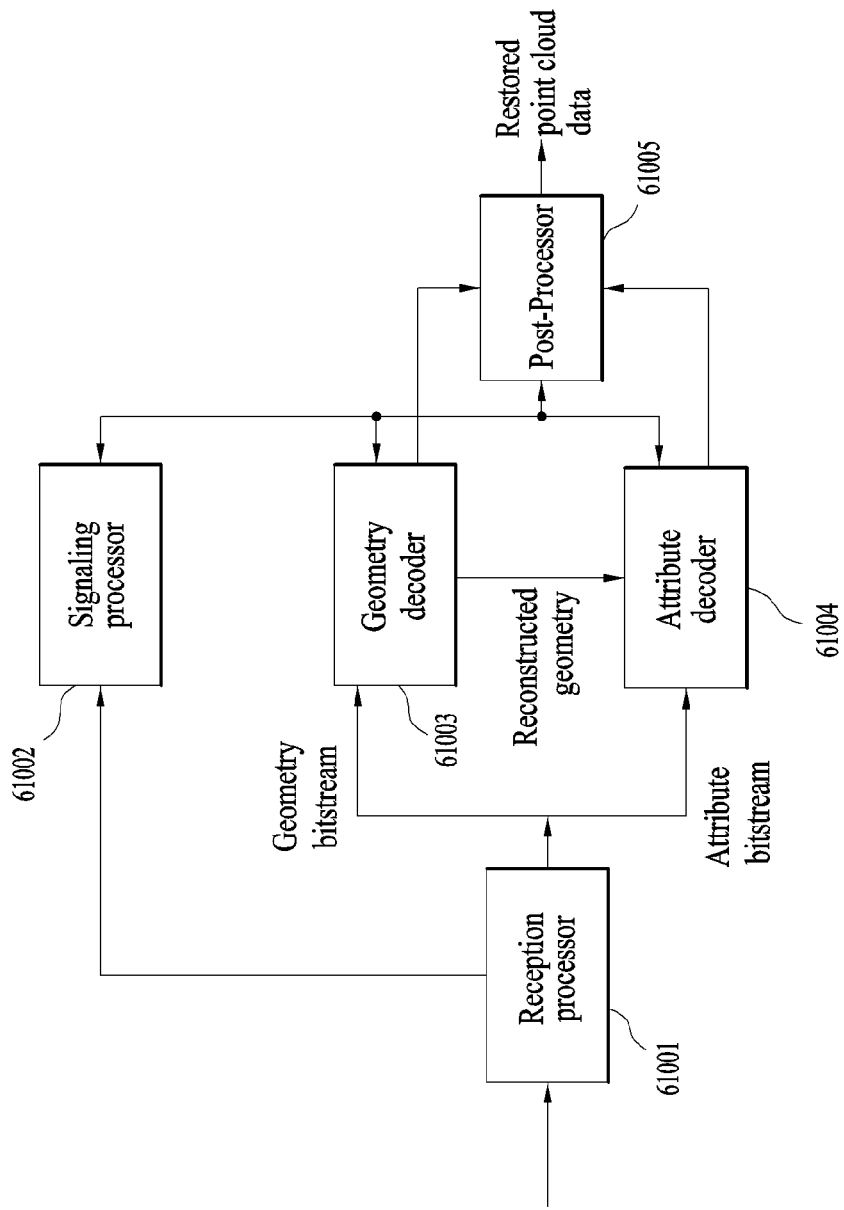
FIG. 48 illustrates another example of a point cloud reception device according to embodiments.

The encoding process of the point cloud data includes compressing geometry information and compressing attribute information based on the geometry information reconstructed based on information about reconstructed geometry (reconstructed geometry=decoded geometry) obtained based on position information changed through the compression. In addition, the decoding process of the point cloud data includes receiving an encoded geometry bitstream and attribute bitstream, decoding the geometry information, and decoding the attribute information based on the geometry information reconstructed through the decoding. According to embodiments, the encoding process of the point cloud data may be performed by the point cloud video encoder 10002 of FIG. 1, the encoding 20001 of FIG. 2, the point cloud video encoder of FIG. 4, the point cloud video encoder of FIG. 12, or the geometry encoder 51003 and attribute encoder 51004 of FIG. 45. The decoding process of the point cloud data may be performed by the point cloud video decoder of FIG. 10006, the decoding 20003 of FIG. 2, the point cloud video decoder of FIG. 11, the point cloud video decoder of FIG. 13, or the geometry decoder 61003 and attribute decoder 61004 of FIG. 48. According to an embodiment, the encoding of the geometry information described below may be performed by the geometry encoder 51003 of FIG. 45, and the encoding of the attribute information may be performed by the attribute encoder 51004 of FIG. 45. FIGS. 45 and 48 will be described in detail later.

According to embodiments, the geometry encoder 51003 may use an octree-based, quad-tree (hereinafter referred to as QT)-based or binary tree (hereinafter referred to as BT)-based compression method for geometry information compression. In the present disclosure, for simplicity, the octree, quad tree, or binary tree used for geometry compression will be referred to as a geometry tree. That is, the geometry tree may be one or more of the octree, the quad-tree, or the binary tree.

According to embodiments, in order to increase the efficiency of geometry compression for asymmetrically distributed points, the geometry encoder 51003 may compress the geometry information based on a quad-tree (hereinafter referred to as QT) or a binary tree (hereinafter referred to as BT).

That is, for the 8 node positions constituting the octree, when the points are distributed biased toward one plane or one line segment, the number of bits used for geometry compression may be reduced by additionally using the QT or BT.

Figure 15:
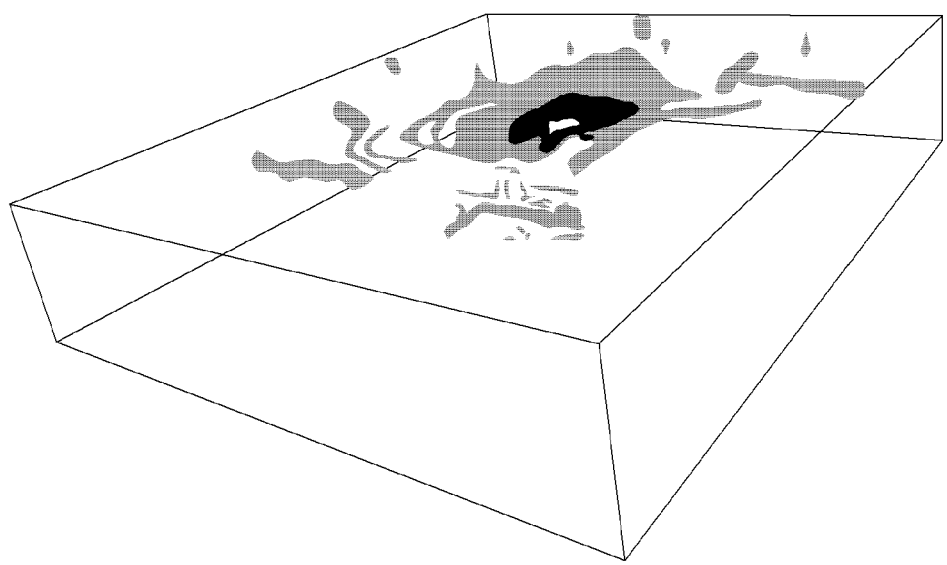
FIG. 15 is a diagram illustrating an example of point cloud data consisting of asymmetrically distributed points according to embodiments.

FIG. 15 is a diagram illustrating an example of point cloud data consisting of asymmetrically distributed points according to embodiments.

According to embodiments, the geometry encoder 51003 may partition a bounding box (which may be interchangeably used with B below) of point cloud data as shown in FIG. 15 based on one or more of OT, QT, and BT to compress the geometry information.

Figure 16:
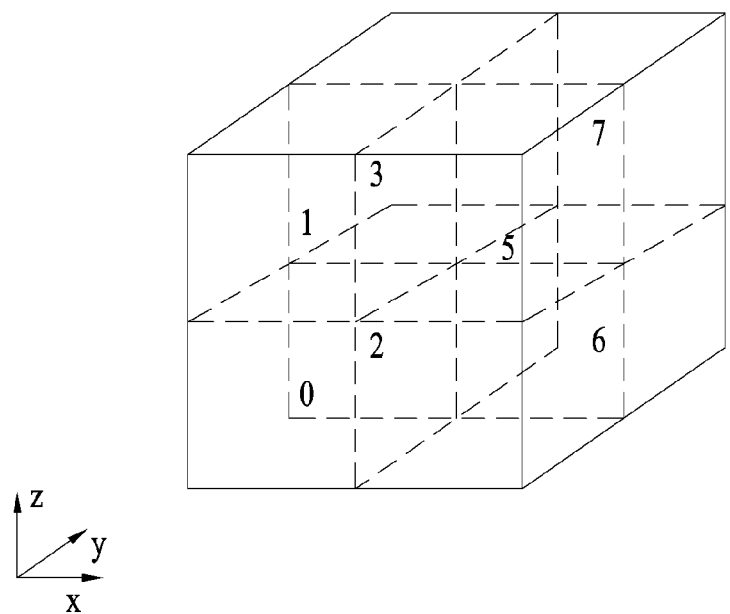
FIG. 16 is a diagram illustrating an example of partitioning of a cube based on an octree in a 3D space.

FIG. 16 is a diagram illustrating an example of partitioning of a cube based on an OT in a 3D space.

In an embodiment, when the points of the point cloud data are uniformly distributed, an OT-based partitioning method of equally dividing a cube (i.e., a 3D cube) into eight cubes may be used for compression of geometry information about the point cloud data. In this method, the process of dividing an occupied node among the 8 nodes into 8 cubes by dividing each side of the node into halves is repeated. Whether each node is occupied may be indicated as 0 or 1 by using 1 bit in order. That is, when a cube is divided into 8 cubes, 8 bits may be used to indicate whether the 8 sub-nodes are occupied. For example, when nodes 0, 3, 4, and 5 are occupied among the 8 nodes in FIG. 16, the occupancy of the respective nodes may be indicated as 10011100. That is, when the OT-based partitioning method is performed, one occupancy code is expressed for 8 child nodes. In other words, when a 3D cube is partitioned based on the OT, 8 cubic nodes are generated, and the occupancy code is represented as an 8-bit code. In an embodiment, the 8 cubic nodes may be referred to as 8 child nodes.

Figure 17:
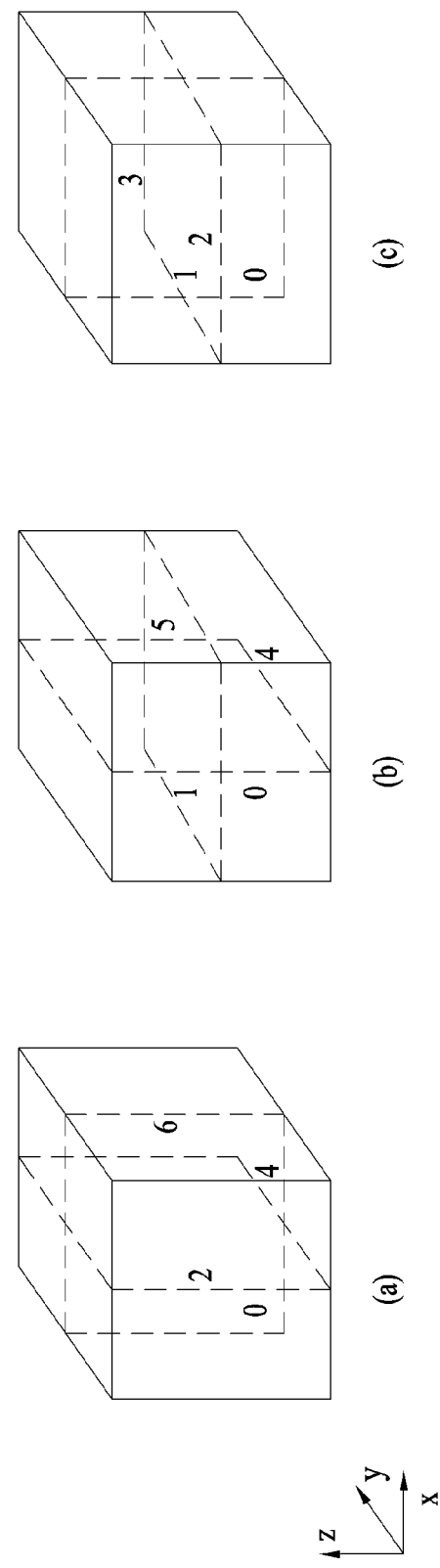
FIGS. 17-(a) to 17-(c) are diagrams illustrating examples of partitioning of a cube based on a quad tree in a 3D space.

FIGS. 17-(a) to 17-(c) are diagrams illustrating examples of partitioning of a cube based on a QT in a 3D space.

Figure 18:
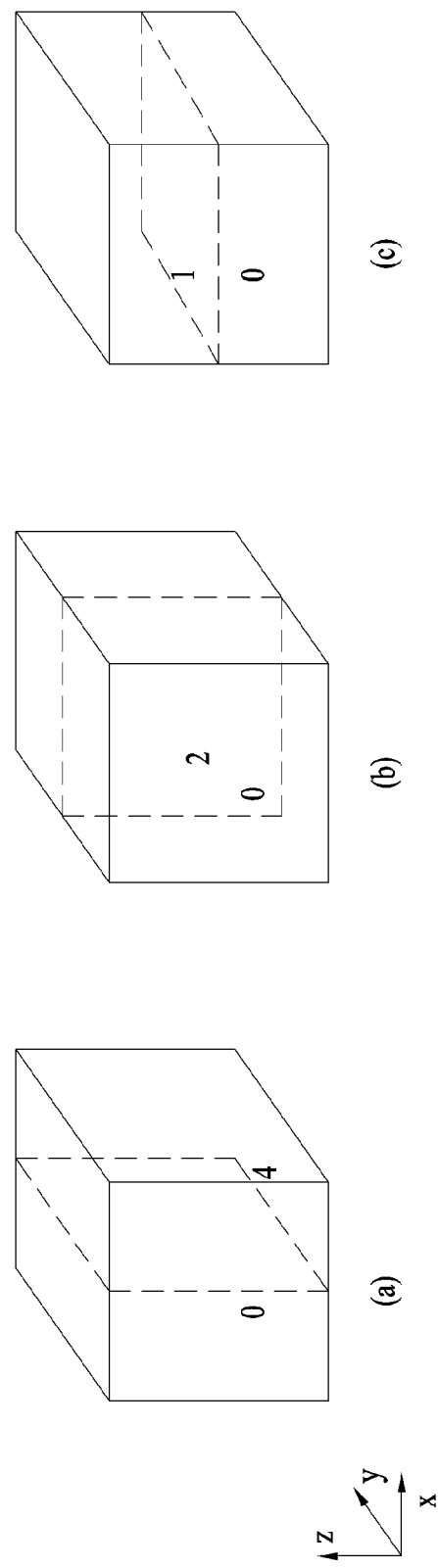
FIGS. 18-(a) to 18-(c) are diagrams illustrating examples of partitioning of a cube based on a binary tree in a 3D space.

FIGS. 18-(a) to 18-(c) are diagrams illustrating examples of partitioning of a cube based on a BT in a 3D space.

In an embodiment, when the point distribution of the point cloud data is not uniform, the number of bits used to indicate the occupancy may be reduced by using a QT and/or a BT according to the characteristics of the point distribution.

According to embodiments, in the case of the QT, the 3D cube may be partitioned along the x-y axes, the y-z axes, or the x-z axes, as in FIGS. 17-(a) to 17-(c). Therefore, when a 3D cube is partitioned based on the QT, four cuboid nodes are generated, and the occupancy code is represented as a 4-bit code. In this case, the occupancy code may be reduced by 4 bits from that for the octree-based partitioning. In an embodiment, the 4 cuboid nodes may be referred to as 4 child nodes. That is, one parent node may have 4 child nodes. For example, when a 3D cube is partitioned along the x-y axes based on a QT, and nodes 0 and 6 among the four nodes are occupied, the occupancy of each node may be indicated by 1001 while indicating that the partitioning is based on the QT in the x-y direction.

According to embodiments, in the case of the BT, the 3D cube may be partitioned along the x-axis, the y-axis, or the z-axis, as shown in FIGS. 18-(a) to 18-(c). Therefore, when the 3D cube is partitioned based on the BT, two cuboid nodes are generated, and the occupancy code is represented as a 2-bit code. In this case, the occupancy code may be reduced by 6 bits from the occupancy code for the OT-based partitioning. In an embodiment, the two cuboid nodes may be referred to as two child nodes. That is, one parent node may have two child nodes.

According to embodiments, the order of OT, QT, and BT for the point cloud data may be determined according to parameters K and M.

According to embodiments, the parameter K may denote the number of times QTBT is performed when partitioning of a 3D bounding box is started, and the parameter M may denote the number of OTs executed immediately before partitioning for a leaf node level.

According to embodiments, for a point cloud having a bounding box whose dimensions are $2^{dx}$, $2^{dy}$, and $2^{dz}$, the parameter K may have a value in a range from 0 to max(dx, dy, dz)−min(dx, dy, dz) as follows. The parameter M may have a value in a range from 0 and min(dx, dy, dz) as follows.

$$K(0 \leq K \leq \max(dx,dy,dz) - \min(dx,dy,dz))$$

That is, the parameter K denotes the maximum number of times of QT&BT before OT (maximum times of QT&BT before OT).

$$M(0 \leq M \leq \min(dx,dy,dz))$$

That is, the parameter M denotes the minimum size of QT&BT. When the X-axis dimension (dx), Y-axis dimension (dy), and Z-axis dimension (dz) are less than or equal to M, QT and BT may not be performed (NO QT&BT if dx, dy, dz ≤ M).

In addition, when the X-axis dimension (dx), the Y-axis dimension (dy), and the Z-axis dimension (dz) are different from each other (when dx≠dy≠dz), BT is performed before QT. M=0 means that OT is performed at least 0 or more times immediately before partitioning for the leaf node level. For example, when M=0, OT may not be performed immediately before partitioning for the leaf node level, but OT may be performed a predetermined number of times, such as once or twice.

Here, min( ), med( ), and max( ) are functions to find the minimum, median, and maximum values, and dx, dy, and dz are values of log 2 for the size for each of the xyz axes of the sub-node for a specific depth.

According to embodiments, the number of times of OT/QT/BT may be determined according to the size of the bounding box as follows.

$$N(OT)=\min(dx,dy,dz)$$

$$N(QT)=\text{med}(dx,dy,dz)-\min(dx,dy,dz)$$

$$N(BT)=\max(dx,dy,dz)-\text{med}(dx,dy,dz)$$

For example, when QT/BT-based partitioning is performed, the total number of executions of the partitioning is N(OT)+N(QT)+N(BT)=max(dx, dy, dz), which is equal to the total number of executions of OT-based partitioning, max(dx, dy, dz). The order of OT/QT/BT is determined by the parameters K and M.

Figure 19:
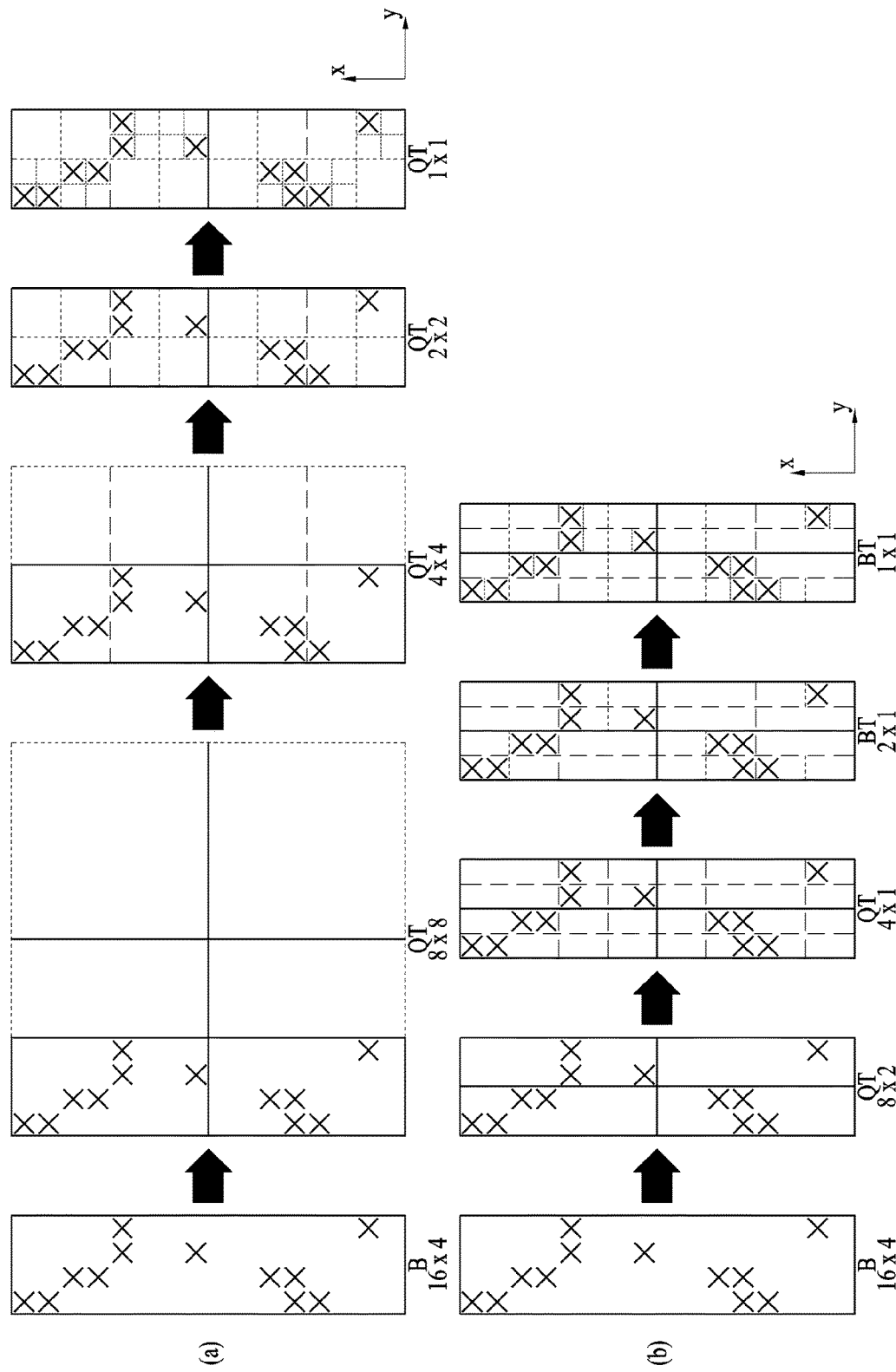
FIGS. 19-(a) and 19-(b) show examples of partitioning of a bounding box in a 2D space.

FIGS. 19-(a) and 19-(b) show examples of partitioning of a bounding box in a 2D space. In FIGS. 19-(a) and 19-(b), the x marks indicate the positions where the points are present in the bounding box.

FIG. 19-(a) shows an example of a partitioning order of point cloud data distributed in a 16×4 bounding box in a 2D space based on QT alone, and FIG. 19-(b) shows an example of a partitioning order of point cloud data distributed in a 16×4 bounding box in a 2D space based on QT and BT.

The examples of FIGS. 19-(a) and 19-(b) may be generalized to a partitioning order in 3D space according to use of OT, QT, and BT. In this case, QT becomes OT in 3D space 3, and BT becomes QT or BT in 3D space.

In the examples of FIGS. 19-(a) and 19-(b), partitioning is performed four times up to a 1×1 leaf node.

When partitioning is performed based on QT (OT in 3D space) alone as shown in FIG. 19-(a), partitioning is performed, assuming that the 16×4-size bounding box has a size of 16×16. In the figure, the partitioning proceeds to the right, and an occupied node is divided by solid or dotted lines according to QT (OT in 3D space) at each stage. The unit node size at each stage may be represented as 16×4, 8×8, 4×4, 2×2, or 1×1. That is, in FIG. 19-(a), a dotted line or a solid line in the bounding box at each stage indicates nodes at each depth when partitioning is performed based on QT.

When partitioning is performed based on a combination of QT (OT in 3D space) and BT (QT in 3D space) as shown in FIG. 19-(b), the asymmetric bounding box of 16×4 may be used, and QT may be performed twice and BT may be performed twice until a 1×1 leaf node is reached. As an example, in the case of FIG. 19-(b), parameters K and M are set as K=0 and M=0, and partitioning proceeds to the right according to QT, QT, BT, and BT in this order. In this case, the unit node sizes at the respective stages may be expressed as 16×4, 8×2, 4×1, 2×1, and 1×1.

Compression of attribute information may be performed by the attribute encoder 51004 based on Levels of Detail (LoD). In this case, the attribute encoder 51004 may generate LoDs using various methods. In an embodiment, the attribute encoder 51004 may generate LoDs based on an octree.

According to embodiments, the LOD indicates a degree of detail of the point cloud data (or the point cloud content). Decrease in the LOD value means degradation of the detail of the point cloud content, and increase in the LOD value means enhancement of the detail of the point cloud content. That is, the LODs are configured such that the density of points increases as the LOD rises. Points of the geometry reconstructed by the geometry encoder 51003, that is, reconstructed positions, may be classified according to the LOD by the attribute encoder 51004.

In an embodiment, when the predictive transform coding technique and the lifting transform coding technique are used, points may be grouped by dividing the points into LODs.

This operation may be referred to as an LOD generation process, and a group having different LODs may be referred to as a set $LOD_l$. Here, 1 denotes the LOD and is an integer starting from 0. The detail of point cloud content is the lowest in at $LOD_0$, and the detail of the point cloud content increases as 1 increases.

Figure 20:
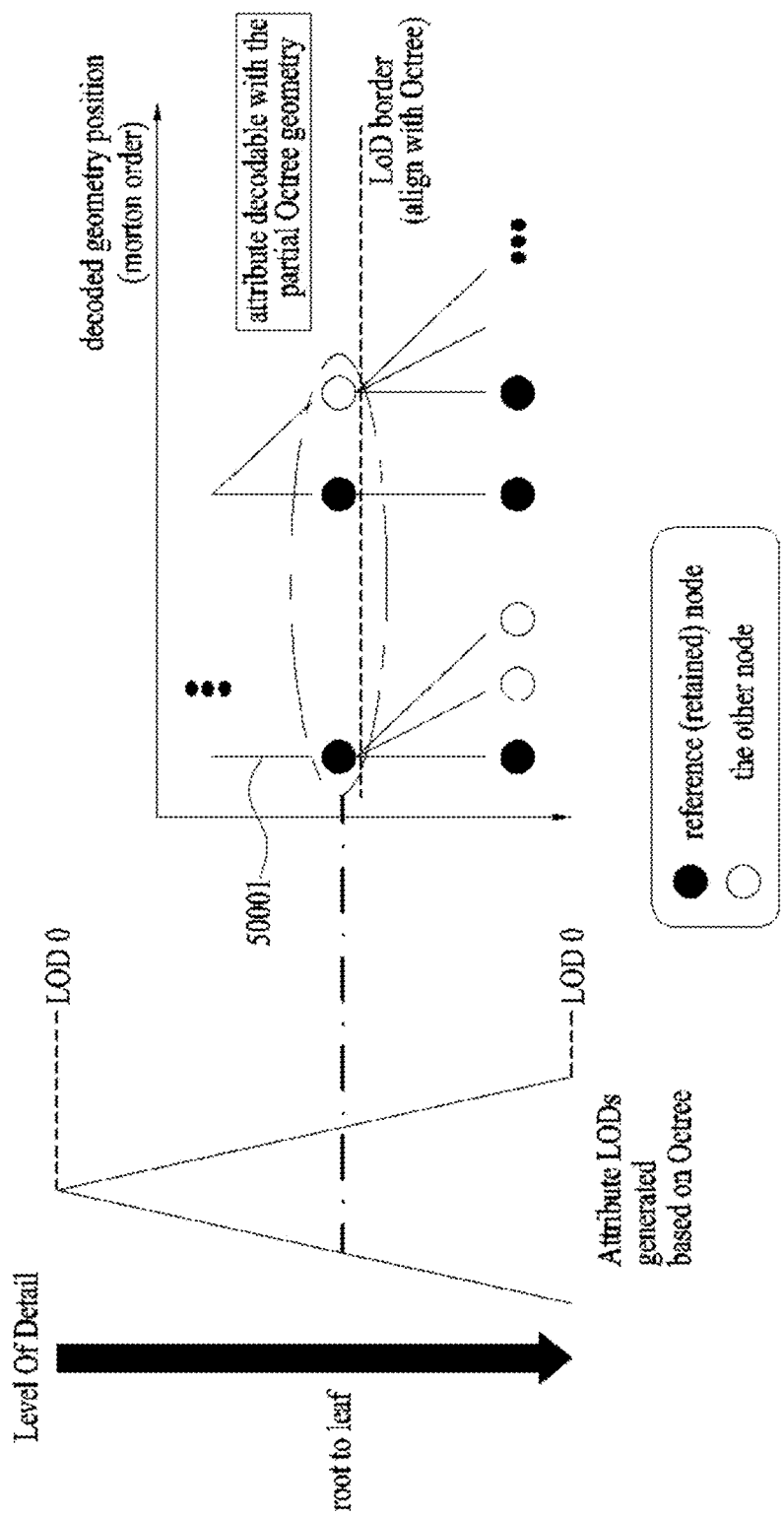
FIG. 20 is a diagram illustrating an example of generation of LODs based on an octree by an attribute encoder according to embodiments.

FIG. 20 is a diagram illustrating an example of generating LODs based on an octree by the attribute encoder 51004 according to embodiments. In FIG. 20, the points may be points of a captured point cloud, or points of geometry reconstructed by the geometry encoder 51003.

According to embodiments, when LODs are generated based on the octree, each depth level of the octree may be matched to each LOD as shown in FIG. 20. That is, in the octree-based LOD generation method, LODs are generated based on the principle that as the depth level increases in the octree structure (in the direction from the root to the leaf), the detail representing the point cloud data increases. According to embodiments, the octree-based LOD configuration may proceed from the root node to the leaf node, or from the leaf node to the root node.

In this example, the points at each depth level are arranged based on the Morton code order, and the first node among the child nodes is selected as a reference or retained node of the parent node is shown. Reference numeral 50001 represents an example of points belonging to LOD N-x. In other words, the points belonging to LOD N-x corresponds to the number of occupied nodes at the corresponding depth level.

Figure 21:
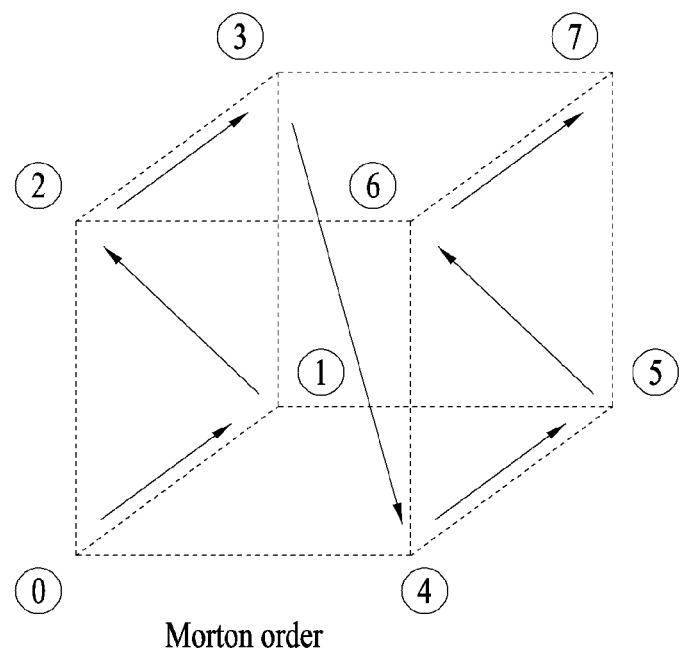
FIG. 21 is a diagram illustrating an example of a Morton code order in a 3D cube according to embodiments.

FIG. 21 is a diagram illustrating an example of a Morton code order in a 3D cube according to embodiments.

That is, the Morton code of each point in the point cloud is generated based on the x, y, and z position values of each point. Once Morton codes of the points in the point cloud are generated through this process, the points in the point cloud may be sorted in order of the Morton codes. According to embodiments, the points in the point cloud may be sorted in ascending order of the Morton codes. The order of the points sorted in ascending order of Morton codes may be called a Morton order.

According to embodiments, when the attribute encoder 51004 generates LODs based on the octree as described above, spatial scalability may be supported. With the spatial scalability, one can access a lower resolution point cloud as a thumbnail with less decoder complexity and/or with less bandwidth when a source point cloud is dense. The spatial scalability function of the geometry may be provided through the process of encoding or decoding the occupancy bits up to the selected depth level by adjusting the depth level of the octree in geometry encoding/decoding. Also, in attribute encoding/decoding, the spatial scalability function of an attribute may be provided through the process of generating LODs from the selected depth level of the octree and configuring points for which the attribute is to be encoded/decoded.

That is, in scalable attribute encoding, the resolution may increase according to the depth of the octree-based geometry encoding. In other words, as the octree is partitioned, the detail increases. In this case, scalable representation may be enabled by matching the attribute to the occupied node at each depth (or depth level). To this end, in the process of scalable attribute encoding, octree-based LoD generation is performed, and selection is performed according to the unit node, not according to the distance. In this case, child nodes having the same node as a parent may be defined as neighbors (or a neighbor search range), and one attribute may be selected within the neighbor nodes (or points) and matched to the parent node. For example, the attribute of the first child node among 8 child nodes may be selected as the attribute of the parent node.

Figure 22:
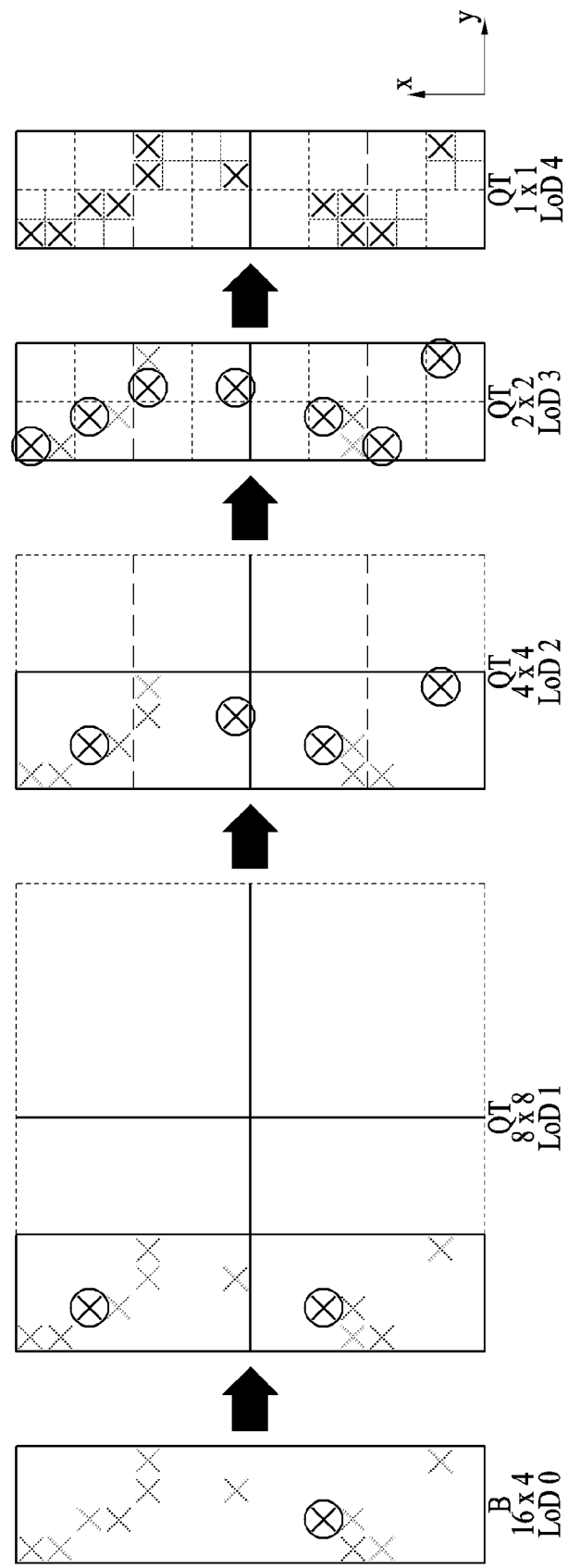
FIG. 22 is a diagram illustrating an example of an attribute selection process according to LoD generation for nodes in a 2D plane according to embodiments.

FIG. 22 is a diagram illustrating an example of an attribute selection process according to LoD generation for nodes (or points) in a 2D plane, according to embodiments.

In FIG. 22, the x marks indicate positions where points are present in a bounding box having a size of 16×4. The dotted lines or solid lines in the bounding box at each stage represent nodes at each depth according to the QT-based partitioning at each stage. That is, in FIG. 22, the partitioning proceeds to the right, and the unit node size at each stage may be represented as 16×4, 8×8, 4×4, 2×2, or 1×1.

When LoD generation is performed based on the tree structure used for partitioning as shown in FIG. 22, the operation may proceed from the leaf to the root, or may proceed from the root to the leaf as necessary. The generated LoDs may be configured such that the LoD increases in the direction from the root to the leaf. In addition, circles at each stage may represent points constituting each LoD, and max LoD (e.g., LoD4) may contain all points. As another example, in FIG. 22, when LoD2 is generated based on the points constituting LoD3, the number of points constituting LoD2 is 4 because the number of occupied nodes at the depth level is 4.

As described above, when the octree-based geometry compression method is used, scalable coding is supported by configuring attributes corresponding to the octree layer structure. In this case, the ratio of with, depth and height of the unit node used at the depth of the geometry information tree is the same. Also, the geometry information and attribute information included at a specific octree depth are matched to each other in a one-to-one correspondence manner In other words, once the geometry encoder 51003 performs octree-based geometry compression and the attribute encoder 51004 generates LoDs based on the octree and performs attribute compression, the number of points for the geometry is the same as that for the attribute. Thus, when a partial-octree decoded point cloud is provided to the attribute decoder 61004 on the receiving side, the attribute decoder 61004 may accurately perform scalable attribute decoding from the provided depth level.

Figure 23:
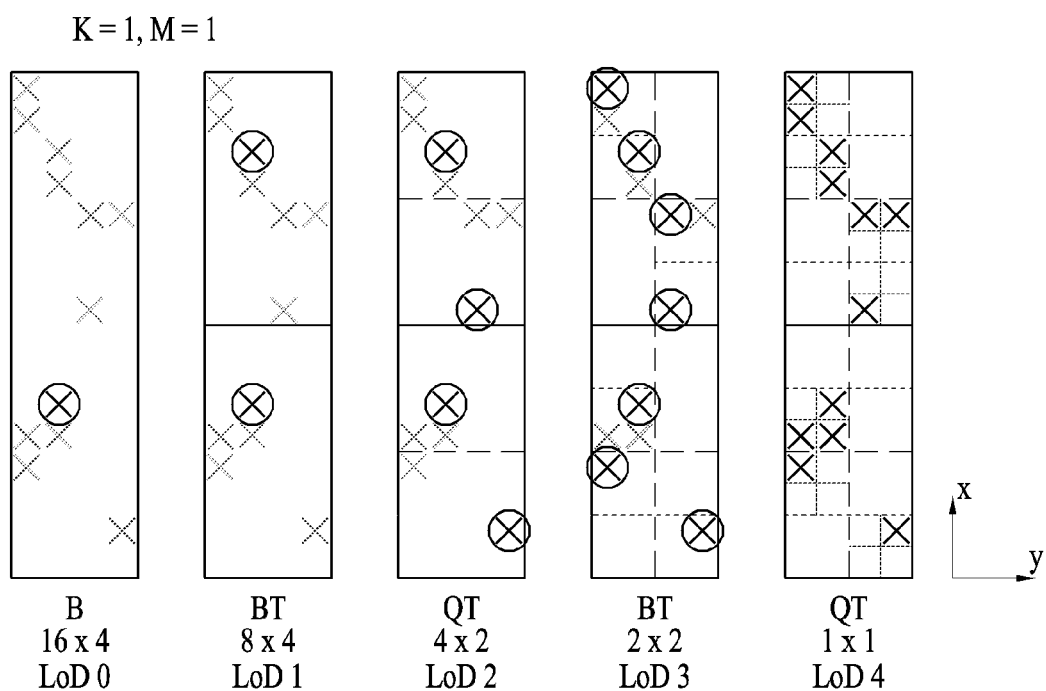
FIG. 23 is a diagram illustrating another example of an attribute selection process according to LoD generation for nodes in a 2D plane by an attribute encoder according to embodiments.

FIG. 23 is a diagram illustrating another example of an attribute selection process according to LoD generation for nodes (or points) in a 2D plane by the attribute encoder 51004 according to embodiments.

In FIG. 23, the x marks indicate positions where points are present in a bounding box having a size of 16×4. The dotted lines or solid lines in the bounding box at each stage represent nodes at each depth according to the QT or BT-based partitioning at each stage. That is, FIG. 23 shows the case of K=1 and M=1, and partitioning proceeds to the right according to BT, QT, BT, and QT in this order. In other words, when BT-based partitioning is performed based on parameters K=1 and M=1, initial partitioning is performed based on BT, and partitioning is performed based on QT in the leaf node generation. Accordingly, the bounding box is partitioned according to BT, QT, BT, and QT in this order. In this case, the unit node size at this stage and may have represented as 16×4, 8×4, 4×2, 2×2, or 1×1.

Even when LoD generation is performed based on the geometry tree structure used for partitioning as shown in FIG. 23, the LoD generation may proceed from the leaf to the root or may be proceed from the root to the leaf as necessary. Also, the generated LoDs may be configured such that the LoD increases in the direction from the root to the leaf. In this case, the LoD may be configured with a representative point of the node at each stage. As an example, the circles at each stage may represent points constituting each LoD, and max LoD (e.g., LOD 4) may contain all points. As another example, in FIG. 23, when LoD2 is generated based on the points constituting LoD3, the number of points constituting LoD2 is 5 because the number of occupied nodes at the depth level is 5.

When BT (BT or QT in 3D space) is used in geometry coding as shown in FIG. 23, the LoD may be configured at a specific depth level with a number of points different from that in the example of FIG. 22 as described above. This is because the selected points may be changed according to the setting of the neighbor search range in LoD generation. For example, the neighbor search range (i.e., the number of child nodes) may be 8 in the octree structure. The neighbor search range may be 4 in the quad-tree structure. The neighbor search range may be 2 in the binary tree structure.

According to the embodiments, in the case of the QT-based LoD configuration as shown in FIG. 22, the number of points belonging to LoD2 may be 4. On the other end, in the case of the QTBT-based LoD configuration as shown in FIG. 23, the number of points belonging to LoD2 may be 5. Accordingly, when the geometry encoder 51003 compresses geometry information by generating a geometry tree based on OT/QT/BT, but the attribute encoder 51004 configures LoDs based on OT, a mismatch of points may occur between geometry and attributes at specific depths, for example, LoD2. In other words, when scalable presentation is performed using LoD2, the number of points in the geometry may differ from the number of points in the attribute for LOD configuration. As a result, wrong attributes may be matched to the geometry, or there may be points having attributes that are not matched.

As such, when OT/QT/BT is used to partition a bound box to consider an asymmetric point distribution in the compression of geometry information, unit nodes used in each depth of the geometry tree may have different ratios of width, depth and height. For example, in FIG. 23, the unit nodes at the respective stages according to the 2D plane are 16×4, 8×4, 4×2, 2×2, and 1×1. In this case, when the layer structure of geometry coding is not considered in scalable attribute coding, the scalable point cloud representation may be inaccurate due to the lack of one-to-one matching between the geometry information and the attribute information for any scalable layer. In other words, when the geometry encoder 51003 compresses geometry information by generating a geometry tree based on OT/QT/BT, and the attribute encoder 51004 compresses attribute information by generating LoDs based on OT, the number of points for the geometry may differ from the number of points for the attributes. In this case, the scalable point cloud representation at the corresponding depth may be inaccurate.

To address this issue of discrepancy, a LoD-based scalable layer may be configured using an asymmetric neighbor node in scalable point cloud encoding. Thereby, the attribute compression efficiency of content having asymmetric point distribution may be increased. In other words, in the case where the geometry encoder 51003 performs geometry compression by generating a geometry tree based on OT/QT/BT, the attribute encoder 51004 performs attribute compression by generating LoDs based on OT/QT/BT. Accordingly, the number of points for geometry coincides with the number of points for attributes at each depth.

The present disclosure provides a compression method based on asymmetric node partitioning among methods for scalable point cloud coding. The compression method based on asymmetric node partitioning described in the present disclosure may be used as a scalable attribute compression method when an OT/QT/BT-based geometry compression method is used. The method proposed in the present disclosure may be used not only for scalable point cloud coding, but also be used as a method for adaptively providing point cloud services in a low latency environment. In addition, the prediction-based attribute compression method proposed in the present disclosure may be used independently of the geometry compression method, and may be used for geometry compression as well as attribute compression based on the method proposed in the present disclosure. The LoD generation method proposed in the present disclosure may be used not only in the application field of scalable coding but also in general point cloud compression.

Next, a description will be made of scalable attribute coding methods considering asymmetric point distribution, including an LoD generation method considering cuboid nodes and an attribute coding method considering node changes according to layers when OT/QT/BT-based geometry compression is used, or constraints and signaling for using OT-based scalable attribute compression.

Embodiment 1

When geometry encoding is performed by generating a geometry tree based on OT/QT/BT, an asymmetric (or cuboid) node may be used at each depth of the geometry tree. In this case, when scalable coding is considered, scalability is supported on a depth-by-depth basis in the geometry tree. Embodiment 1 is an example of attribute coding performed by generating LoDs according to the geometry tree structure. In an embodiment of the present disclosure, LoDs are generated in consideration of an asymmetric node of the geometry tree for scalable coding.

According to embodiments, first, in order to consider distribution characteristics of points distributed in a specific direction, neighbor search is performed based on a non-cubic node as an example. According to embodiments, when the dimensions of a node at each depth are $2^{dx}$, $2^{dy}$, and $2^{dz}$ in the geometry tree structure used in geometry coding, dx, dy, and dz may have different values. However, in an embodiment, when (k) is assumed to be the k-th depth, the relationships of $dx(k) >= dx(k+1)$, $dy(k) >= dy(k+1)$, and $dz(k) >= dz(k+1)$ may be established. As an example, in octree-based LoD generation, neighbor search may be performed based on a cubic node. In this case, only the case of dx=dy=dz is considered.

In addition, criteria for selecting points for the LoD for a neighbor search range given at a corresponding depth may be configured. The neighbor search range given at the depth depends on whether the operation is based on OT, QT, or BT. For example, the neighbor search range (i.e., the number of child nodes) for the OT-based operation may be 8. The neighbor search range for the QT-based operation may be 4. The neighbor search range for the BT-based operation may be 2. In an embodiment, the first point sorted according to the order of the Morton code order (i.e., the first occupied node among the occupied nodes sorted according to the order of the Morton code order) may be selected within the neighbor search range. In another embodiment, points at different positions may be selected according to the depth. For example, when the first point among the points sorted according to the Morton code order within the neighbor search range is selected for the k-th LoD, the last point among the points sorted according to the Morton code order within the neighbor search range may be selected for the k−1-th LoD. In another embodiment, a point which is at a close distance from the center of the node may be selected. In an embodiment, information (e.g., LoD_sampling_method) for identifying the point selection method used at a depth may be signaled through signaling information. The signaling information may be at least an attribute parameter set or an attribute slice header. In the present disclosure, for simplicity, the information (e.g., LoD_sampling_method) for identifying the point selection method used at a depth may be referred to as information for identifying the LoD sampling method.

FIGS. 24-(a) and 24-(b) are diagrams illustrating examples of LoD generation for each depth based on a geometry tree structure used to partition point cloud data distributed in a 2D plane.

FIGS. 24-(a) and 24-(b) illustrate examples in which QT/BT is used for partitioning of a bounding box when geometry encoding is performed by the geometry encoder 51003, and a geometry tree is configured according to QT, QT, BT, and BT in this order based on parameters set as K=0 and M=0. According to embodiments, the attribute encoder 51004 may perform LoD generation based on the geometry tree structure having a non-square node of FIG. 24. In this case, LoDs may be generated in consideration of an asymmetric node at each depth of the geometry tree. For example, when LoD4 is assumed to be max LoD, LoD4 contains all points of the bounding box. In addition, for a lower LoD (small-numbered LoD) configuration, neighbors may be configured in a node unit having a unit node size of a depth corresponding to the lower LoD of the unit node size of the lower LoD corresponding to the lower LoD among points constituting a higher LoD (large-numbered LoD), and a specific point may be selected from among the points configured as neighbors. Thereby, lower LoDs may be configured. In FIG. 24, the unit node sizes at the respective depths may be represented as 16×4, 8×2, 4×1, 2×1, and 1×1. For example, LoD3 may be configured by configuring neighbors (a neighbor search range) in a node (BT) unit having a size of 2×1 among the points constituting LoD4 and selecting a specific point among the points configured as the neighbors. LoD2 may be configured by configuring neighbors in a node (BT) unit having a size of 4×1 among the points constituting LoD3 and selecting a specific point among the points configured as the neighbors. LoD1 may be configured by configuring neighbors in a node (QT) unit having a size of 8×2 among the points constituting LoD2 and selecting a specific point among the points configured as the neighbors. LoD0 may be configured by configuring the four points contained in LoD1 as neighbors and selecting a specific point from among the four points configured as the neighbors.

FIG. 24-(a) illustrates an example of selecting the first point in terms of Morton code in a point selection process for each depth. That is, for LoD3 to LoD0, in selecting a specific point is selected from among the points configured as neighbors, the first point is selected from the neighbor points sorted according to the Morton code order.

FIG. 24-(b) illustrates an example of selecting the first point or the last point in terms of Morton code according to a depth in the point selection process. More specifically, the figure illustrates an example of alternately selecting the points at the first and last positions in terms of Morton code at consecutive depths in the point selection process. In other words, for LoD3, the first point may be selected from among the points sorted according to the Morton code order in the neighbor search range. For LoD2, the last point may be selected from among the points sorted according to the Morton code order in the neighbor search range. For LoD1, the first point may be selected from among the points sorted according to the Morton code order in the neighbor search range. For LOD0, the last point may be selected from among the points sorted according to the Morton code order in the neighbor search range.

In contrast with FIG. 24-(a), the point distribution in FIG. 24-(b) may be configured such that points of a lower LOD are closer to the center of the node. Points 50003 and 50005 in FIG. 24-(a) are the first points selected based on Morton code at the corresponding depths, and points 50007 and 50009 in FIG. 24-(b) are the last points selected based on Morton code at the corresponding depths.

FIGS. 25-(a) and 25-(b) are diagrams illustrating other examples of LoD generation for each depth based on a geometry tree structure used to partition point cloud data distributed on a 2D plane.

FIGS. 25-(a) and 25-(b) illustrate examples in which QT/BT is used for partitioning of a bounding box when geometry encoding is performed by the geometry encoder 51003, and a geometry tree is configured according to BT, QT, QT, and BT in this order based on parameters set as K=1 and M=0. According to embodiments, the attribute encoder 51004 may perform LoD generation based on the geometry tree structure having a non-square node of FIG. 25. In this case, LoDs may be generated in consideration of an asymmetric node at each depth of the geometry tree. For example, when LoD4 is assumed to be max LoD, LoD4 contains all points of the bounding box. In addition, for a lower LoD (small-numbered LoD) configuration, neighbors may be configured in a node unit having a unit node size of a depth corresponding to the lower LoD of the unit node size of the lower LoD corresponding to the lower LoD among points constituting a higher LoD (large-numbered LoD), and a specific point may be selected from among the points configured as neighbors. Thereby, lower LoDs may be configured. In FIG. 25, the unit node sizes at the respective depths may be represented as 16×4, 18×4, 4×2, 2×1, and 1×1. For example, LoD3 may be configured by configuring neighbors (a neighbor search range) in a node (BT) unit having a size of 2×1 among the points constituting LoD4 and selecting a specific point among the points configured as the neighbors. LoD2 may be configured by configuring neighbors in a node (QT) unit having a size of 4×2 among the points constituting LoD3 and selecting a specific point among the points configured as the neighbors. LoD1 may be configured by configuring neighbors in a node (QT) unit having a size of 8×4 among the points constituting LoD2 and selecting a specific point among the points configured as the neighbors. LoD0 may be configured by configuring the two points contained in LoD1 as neighbors and selecting a specific point from among the two points configured as the neighbors.

FIG. 25-(a) illustrates an example of selecting the first point in terms of Morton code in a point selection process for each depth. That is, for LoD3 to LoD0, in selecting a specific point is selected from among the points configured as neighbors, the first point is selected from the neighbor points sorted according to the Morton code order.

FIG. 25-(b) illustrates an example of selecting the first point or the last point in terms of Morton code according to a depth in the point selection process. More specifically, the figure illustrates an example of alternately selecting the points at the first and last positions in terms of Morton code at consecutive depths in the point selection process. In other words, for LoD3, the first point may be selected from among the points sorted according to the Morton code order in the neighbor search range. For LoD2, the last point may be selected from among the points sorted according to the Morton code order in the neighbor search range. For LoD1, the first point may be selected from among the points sorted according to the Morton code order in the neighbor search range. For LOD0, the last point may be selected from among the points sorted according to the Morton code order in the neighbor search range.

As in the case of FIGS. 24-(a) and 24-(b), it may be seen that, in contrast with FIG. 25-(a), the point distribution in FIG. 25-(b) may be configured such that points of a lower LOD are closer to the center of the node.

Embodiment 2

When geometry coding is performed by generating a geometry tree based on OT/QT/BT, an asymmetric (or cuboid) node may be used at each depth of the geometry tree. In this case, when scalable coding is considered, scalability is supported on a depth-by-depth basis in the geometry tree. Embodiment 2 is an example of adding constraints to consider the characteristics of octree-based LoD generation in geometry coding. That is, when a cubic node is ensured for a certain depth range from the leaf level (i.e., when the size of the unit node is the same in the xyz directions), the scalability may be ensured for the corresponding depth range by allowing the attribute encoder 51004 to perform octree-based LoD generation. To this end, in the present disclosure, attribute compression may be restricted to be performed using only LoD(s) generated when depths close to the leaf node are symmetric nodes.

Figure 26:
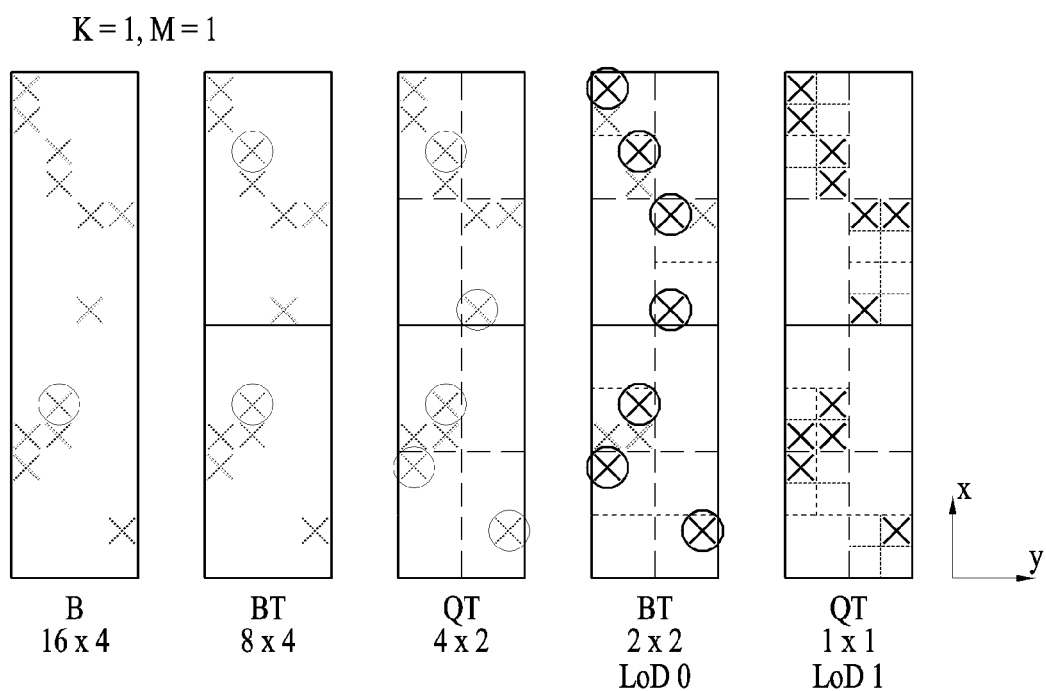
FIG. 26 is a diagram illustrating an example of LoD generation at some depths in a geometry tree structure used to partition point cloud data distributed in a 2D plane.

FIG. 26 is a diagram illustrating an example of LoD generation at some depths in a geometry tree structure used to partition point cloud data distributed in a 2D plane. FIG. 26 illustrates an example in which QT/BT is used for partitioning of a bounding box when geometry encoding is performed by the geometry encoder 51003, and a geometry tree is configured according to BT, QT, BT, and QT in this order based on parameters set as K=1 and M=1. In FIG. 26, it is assumed that two depth levels including the leaf level have a cubic node. In this case, as an embodiment, the attribute encoder 51004 may generate LoDs only at two consecutive depth levels including the leaf level.

Figure 27:
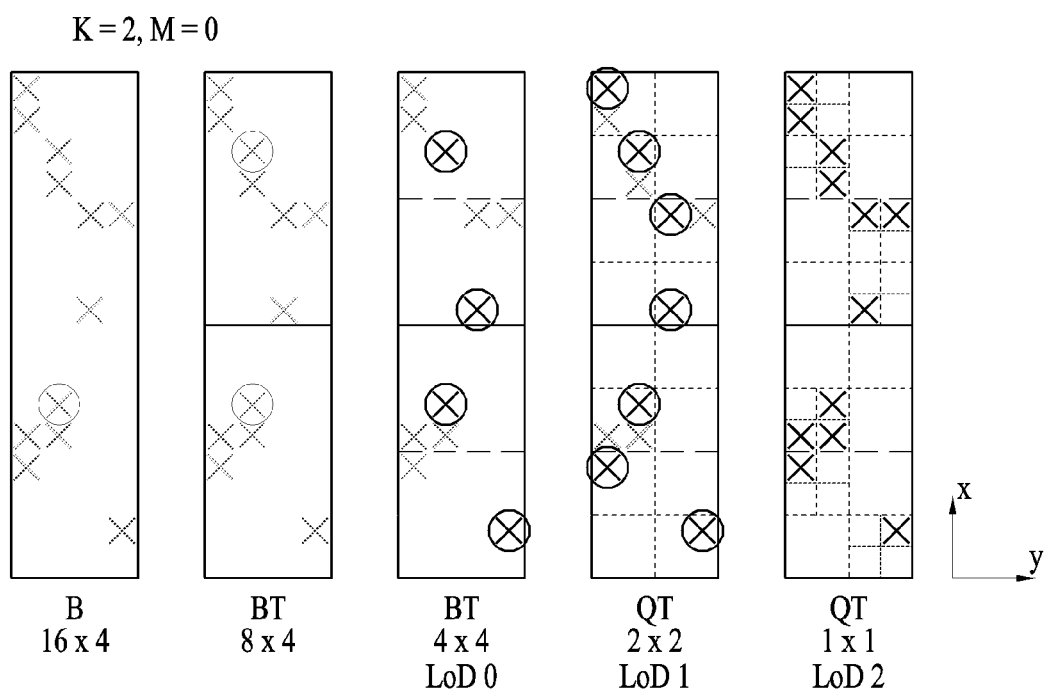
FIG. 27 is a diagram illustrating another example of LoD generation at some depths in a geometry tree structure used to partition point cloud data distributed in a 2D plane.

FIG. 27 is a diagram illustrating another example of LoD generation in some depth of a geometry structure in which point cloud data distributed on a 2D plane is partitioned. FIG. 27 illustrates an example in which QT/BT is used for partitioning of a bounding box when geometry encoding is performed by the geometry encoder 51003, and a geometry tree is configured according to BT, BT, QT, and QT in this order based on parameters set as K=2 and M=0. In FIG. 27, it is assumed that three depth levels including the leaf level have a cubic node. In this case, as an embodiment, the attribute encoder 51004 may generate LoDs only at three consecutive depth levels including the leaf level.

In the present disclosure, point mismatch between geometry and attributes may be prevented in scalable presentation by imposing a restriction that LoD(s) should be generated only for depths that match the QT (OT in 3D space)-based LoD generation method in the geometry structure used for geometry compression.

In an embodiment, the information (e.g., max_num_LoD) indicating the maximum number of LODs and/or LoD start depth information (e.g., LoD_starting_depth) may be signaled through signaling information. The signaling information may be at least an attribute parameter set or an attribute slice header.

In other words, the number of LoDs used in scalable coding may be notified to the attribute decoder 61004 of the reception device by signaling information (e.g., max_num_LoD) indicating the maximum number of LODs, or a position at which LoD0 stars may be notified to the attribute decoder 61004 of the reception device by signaling the LoD start depth information (e.g., LoD_starting_depth). According to embodiments, the LoD start depth information (e.g., LoD_starting_depth) may indicate a maximum LoD depth that may be matched with octree-based LoD generation. That is, it may indicate the number of depths from the leaf level. As an example, in FIG. 26, the number of depths indicated by the LoD start depth information (e.g., LoD_starting_depth) is 2, which is a depth corresponding to LoD0. As an example, in FIG. 27, the number of depths matching the octree-based LoD generation starting from the leaf level may be 3, which is a depth corresponding to LoD0.

According to embodiments, the information (e.g., max_num_LoD) indicating the maximum number of LODs and the LoD start depth information (e.g., LoD_starting_depth) may have the following values.

max_num_LoD=max_dimension−min_dimension−*M*

LoD_starting_depth=max_dimension−*M*

In addition, a constraint that K+M=max_dimension−min_dimension should be established when the geometry coding is performed by the geometry encoder 51003 may be added.

According to embodiments, max_dimension denotes max (dx, dy, dz), and min_dimension denotes min(dx, dy, dz).

Embodiment 3

When geometry coding is performed by generating a geometry tree based on OT/QT/BT, an asymmetric (or cuboid) node may be used at each depth of the geometry tree. When scalable coding is considered, scalability is supported on a depth-by-depth basis in the geometry tree. Embodiment 3 is an example in which LoD generation is skipped at depth(s) of the geometry tree where point mismatch between geometry and attributes occurs or LoD(s) generated at the depth(s) are not used in attribute compression, and information (e.g., LoD_skip_flag) indicating the skip is signaled through signaling information. The signaling information may be at least an attribute parameter set or an attribute slice header.

In one embodiment, generating LoDs corresponding to the depth(s) of the geometry tree where point mismatch between the geometry and the attributes occurs may be skipped, and LoD skip information (e.g., LoD_skip_flag) indicating the skip may be signaled and notified to the attribute decoder 61004 of the reception device. In this case, in an embodiment, LoD(s) may be generated at the remaining depth(s) except for the depth(s) of the geometry where the mismatch occurs, in consideration of an asymmetric node for each depth. For example, LoD skip information (e.g., LoD_skip_flag) equal to 1 may indicate that the point mismatch between the geometry and the attributes at the depth of the geometry tree, and/or that LoD generation has been skipped at the depth. The LoD skip information (e.g., LoD_skip_flag) equal to 0 may indicate that the points are matched between the geometry and the attributes at the depth, and/or that an LoD has been generated at the depth.

In another embodiment, LoD(s) generated at the depth(s) of the geometry tree where point mismatch between the geometry and the attributes occurs may not be used for attribute compression, and LoD skip information (e.g., LoD_skip_flag) indicating the skip may be signaled and notified to the attribute decoder 61004 of the reception device. In this case, in an embodiment, attribute compression may be performed using the LoD(s) generated at the remaining depth(s) except for the depth(s) of the geometry undergoing the mismatch in consideration of an asymmetric node for each depth. For example, LoD skip information (e.g., LoD_skip_flag) equal to 1 may indicate that the point mismatch between the geometry and the attributes at the depth of the geometry tree, and/or that LoDs generated at the depth are not used for attribute compression. The LoD skip information (e.g., LoD_skip_flag) equal to 0 may indicate that the points are matched between the geometry and the attributes at the depth, and/or that LoDs generated at the depth are used for the attribute compression.

That is, when the value of the LoD skip information (e.g., LoD_skip_flag) is 1, the LoD corresponding to the depth may not be used for attribute compression. Alternatively, the LoD may be defined for the depth, but may not be used in scalable presentation.

According to embodiments, the setting of the LoD skip information (e.g., LoD_skip_flag) may conform to the following conditions.

if  dx_ot=dx  &  dy_ot=dy  &  dz_ot=dz  LoD_skip_flag=0 else LoD_skip_flag=1

Here, dx_ot, dy_ot, and dz_ot may denote the xyz axis node size in a bounding box where points are actually distributed when OT-based partitioning is used, and dx, dy, and dz may denote the xyz axis node size when QTBT-based partitioning is used.

In other words, the LoD skip information (e.g., LoD_skip_flag) may be set to 0 only if the x-axis node size (dx_ot) when OT-based partitioning is used is the same as the x-axis node size (dx) in the bounding box when QTBT-based partitioning is used, the y-axis node size (dy_ot) in the bounding box when OT-based partitioning is used is the same as the y-axis node size (dy) when QTBT-based partitioning is used, and the z-axis node size (dz_ot) in the bounding box when OT-based partitioning is used is the same as the z-axis node size (dz) when QTBT-based partitioning is used. Also, if the sizes are not the same on any of the xyz axes, the LoD skip information (e.g., LoD_skip_flag) may be set to 1.

In other words, in the case of skip LoD, a hierarchical structure is provided by scalable coding, but the LoD is not structurally matched with the geometry. Accordingly, the LoD skip information (e.g., LoD_skip_flag) may be used to inform that it is inappropriate to output (or use) the LoD for attribute compression.

FIGS. 28-(a) and 28(b) are diagrams illustrating examples of setting of LoD skip according to the conditions described above at some depths in a geometry tree structure used to partition point cloud data distributed in a 2D plane. FIGS. 28-(a) and 28-(b) illustrate examples in which QT/BT is used for partitioning of a bounding box when geometry encoding is performed by the geometry encoder 51003, and a geometry tree is configured according to BT, QT, BT, and QT in this order, based on parameters set as K=1 and M=1. FIG. 28(a) illustrates an example in which the LoD skip is set for a third depth based on a root node, and FIG. 28(b) illustrates an example in which the LoD skip is set for three depths based on the root node.

According to the embodiments, in FIG. 28-(a), LoD0 and LoD1 represent a case where one cuboid node is contained in a cubit node. In this case, the LoDs may be set not to be skipped because they match the geometry.

Figure 29:
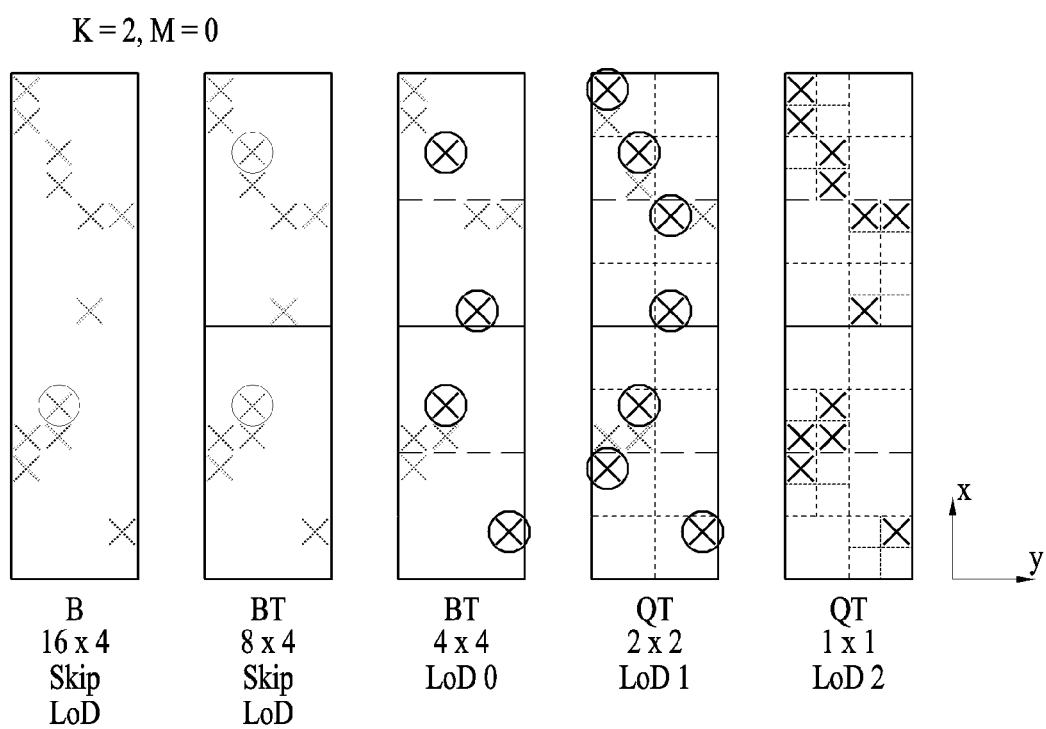
FIG. 29 is a diagram illustrating another example of configuration of LoD skip according to the conditions described above at some depths in a geometry tree structure used to partition point cloud data distributed in a 2D plane.

FIG. 29 is a diagram illustrating another example of setting of LoD skip according to the conditions described above at some depths in a geometry tree structure used to partition point cloud data distributed in a 2D plane. FIG. 29 illustrates an example in which QT/BT is used for partitioning of a bounding box when geometry encoding is performed by the geometry encoder 51003, and a geometry tree is configured according to BT, BT, QT, and QT in this order based on parameters set as K=2 and M=0. In the example of FIG. 29, the LoD skip is set for two depths.

Figure 30:
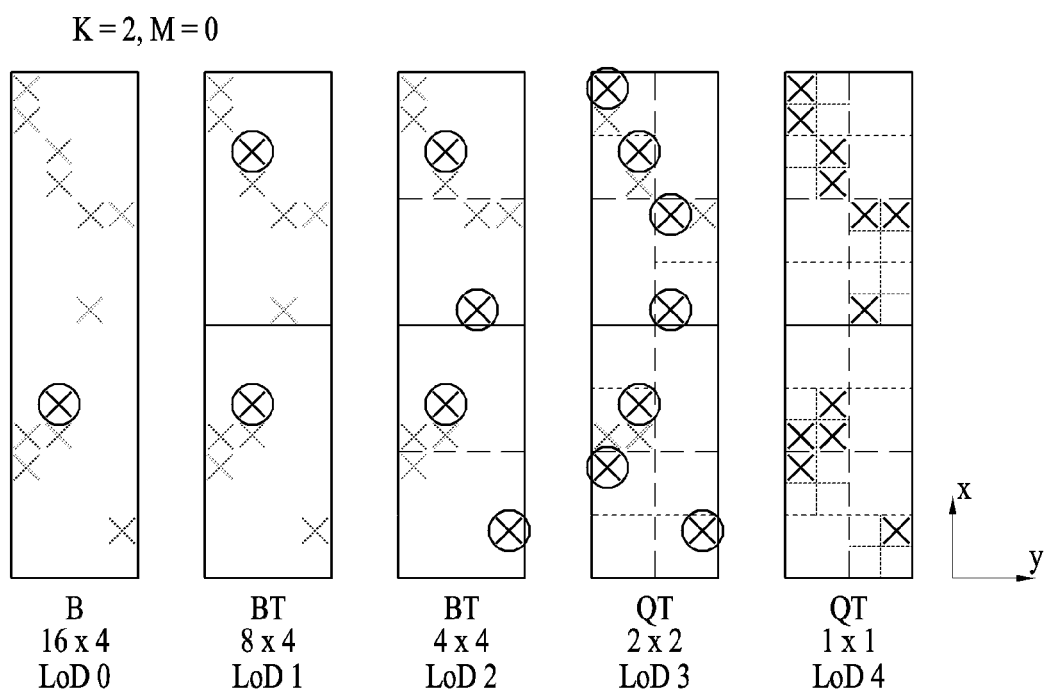
FIG. 30 is a diagram illustrating another example of LoD generation for each depth based on a geometry tree structure used to partition point cloud data distributed in a 2D plane.

FIG. 30 is a diagram illustrating another example of LoD generation for each depth based on a geometry tree structure used to partition point cloud data distributed in a 2D plane. FIG. 30 illustrates an example in which QT/BT is used for partitioning of a bounding box when geometry encoding is performed by the geometry encoder 51003, and a geometry tree is configured according to BT, BT, QT, and QT in this order based on parameters set as K=2 and M=0. According to embodiments, the attribute encoder 51004 may perform LoD generation based on the geometry tree structure having the non-cubic node of FIG. 30.

According to embodiments, the LoD skip information (e.g., LoD_skip_flag) may also be applied to the geometry tree structure as shown in FIG. 30. That is, it may be seen that each depth of the geometry of FIG. 30 has the same node size as the node size in the QT-based LoD generation method. Therefore, when this characteristic is pre-identified by the attribute encoder 51004, the LoD skip information (e.g., LoD_skip_flag) may be signaled such that LoD skip information (e.g., LoD_skip_flag)=0 is set for all LoDs.

According to embodiments, the geometry encoder 51003 and/or the attribute encoder 51004 of the transmission device may perform geometry information compression and/or attribute information compression or perform scalable attribute encoding by combining one or more of Embodiments 1 to 3 described above. In addition, the geometry decoder 61003 and/or the attribute decoder 61004 of the reception device may perform geometry information reconstruction and/or attribute information reconstruction or perform scalable attribute decoding by combining one or more of Embodiments 1 to 3 described above.

Next, signaling information for signaling information related to the above-described LoD-based attribute compression a bitstream structure including the signaling information will be described. According to embodiments, information related to LoD-based attribute compression may include at least one of information for identifying a LoD sampling method (e.g., LoD_sampling_method), information indicating the maximum number of LODs (e.g., max_num_LoD), LoD start depth information (e.g., LoL_starting_depth), or LOD skip information (e.g., LoD_skip_flag). The information related to LoD-based attribute compression may be referred to as information related to LoD-based attribute encoding.

According to configurations, when geometry information is encoded by a point cloud video encoder, a geometry bitstream is generated as a result. When attribute information is encoded, an attribute bitstream is generated as a result. The geometry bitstream and the attribute bitstream according to the embodiments may be multiplexed and output as one bitstream. The bitstream according to the embodiments may further include signaling information related to the geometry encoding and attribute encoding. In an embodiment, the signaling information may include information related to LoD-based attribute compression.

Figure 31:
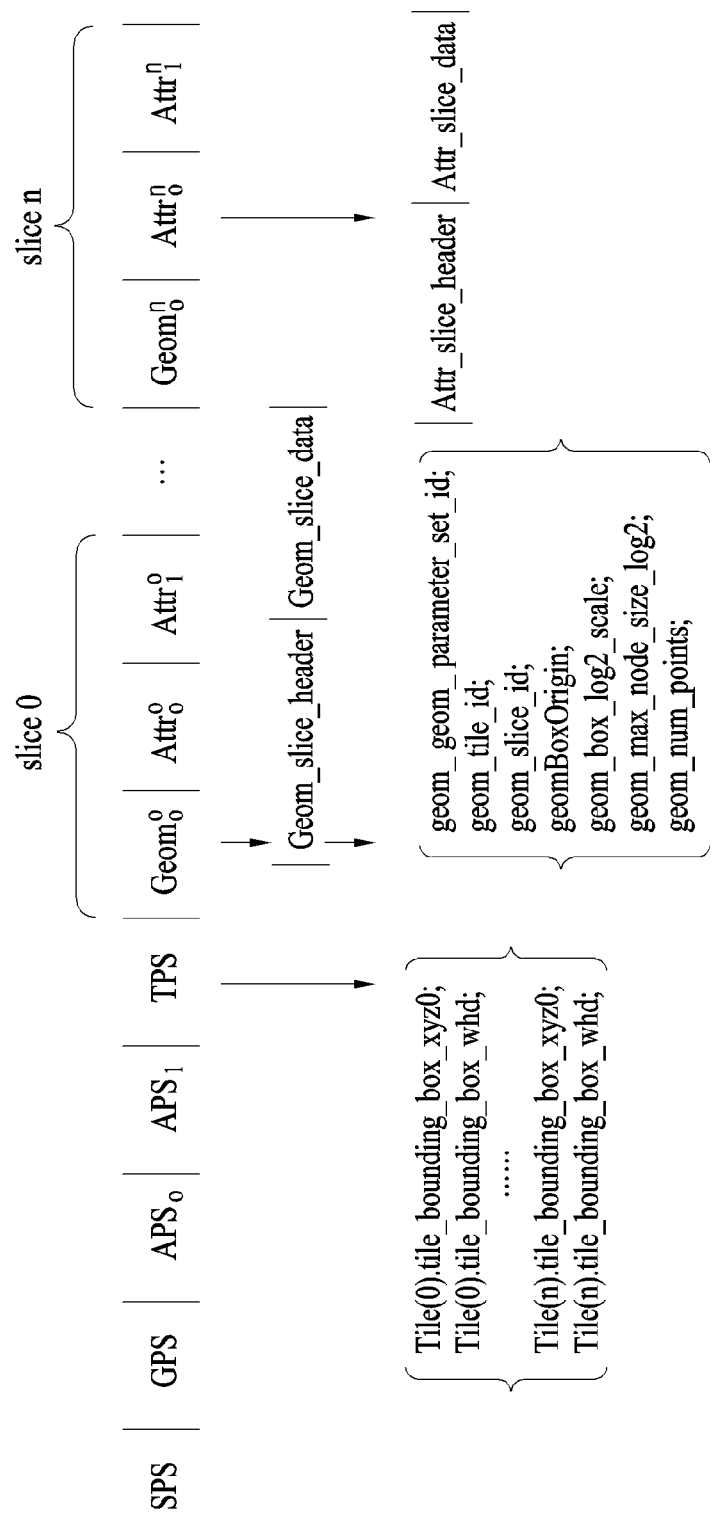
FIG. 31 illustrates an exemplary bitstream structure for point cloud data for transmission/reception according to embodiments.

FIG. 31 illustrates an example of a bitstream structure of point cloud data for transmission/reception according to embodiments.

When a geometry bitstream, an attribute bitstream, and/or a signaling bitstream (or signaling information) according to embodiments are configured as one bitstream (or G-PCC bitstream), the bitstream may include one or more sub-bitstreams. The bitstream according to the embodiments may include a sequence parameter set (SPS) for sequence level signaling, a geometry parameter set (GPS) for signaling of geometry information coding, one or more attribute parameter sets (APSs) ($APS_0$, $APS_1$) for signaling of attribute information coding, a tile parameter set (TPS or tile inventory) for tile level signaling, and one or more slices (slice 0 to slice n). That is, a bitstream of point cloud data according to embodiments may include one or more tiles, and each of the tiles may be a group of slices including one or more slices (slice 0 to slice n). The tile inventory (or TPS) according to the embodiments may contain information about each of the one or more tiles (e.g., coordinate value information and height/size information about the tile bounding box). Each slice may include one geometry bitstream (Geom0) and one or more attribute bitstreams (Attr0 and Attr1). For example, a first slice (slice 0) may include one geometry bitstream)($Geom0^0$ and one or more attribute bitstreams ($Attr0^0$, $Attr1^0$).

The geometry bitstream in each slice may be composed of a geometry slice header (geom_slice_header) and geometry slice data (geom_slice_data). According to embodiments, geom_slice_header may include identification information (geom_parameter_set_id), a tile identifier (geom_tile_id), and a slice identifier (geom_slice_id) for a parameter set included in the GPS, and information (geomBoxOrigin, geom_box_log2_scale, geom_max_node_size_log2, geom_num_points) about data contained in the geometry slice data (geom_slice_data). geomBoxOrigin is geometry box origin information indicating the origin of the box of the geometry slice data, geom_box_log2_scale is information indicating the log scale of the geometry slice data, geom_max_node_size_log2 is information indicating the size of the root geometry octree node, and geom_num_points is information related to the number of points of the geometry slice data. According to embodiments, the geom_slice_data may include geometry information (or geometry data) about the point cloud data in a corresponding slice.

Each attribute bitstream in each slice may be composed of an attribute slice header (attr_slice_header) and attribute slice data (attr_slice_data). According to embodiments, the attr_slice_header may include information about the corresponding attribute slice data. The attribute slice data may contain attribute information (or attribute data) about the point cloud data in the corresponding slice. When there is a plurality of attribute bitstreams in one slice, each of the bitstreams may contain different attribute information. For example, one attribute bitstream may contain attribute information corresponding to color, and another attribute stream may contain attribute information corresponding to reflectance.

Figure 32:
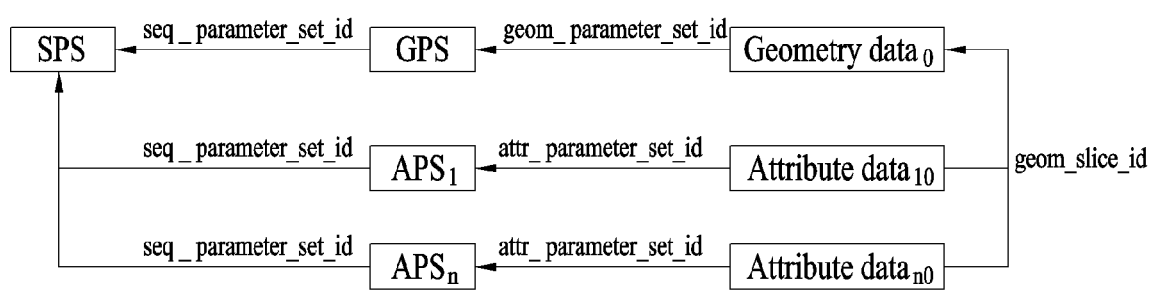
FIG. 32 illustrates an exemplary bitstream structure for point cloud data for transmission/reception according to embodiments.

FIG. 32 illustrates an exemplary bitstream structure for point cloud data for transmission/reception according to embodiments.

Figure 33:
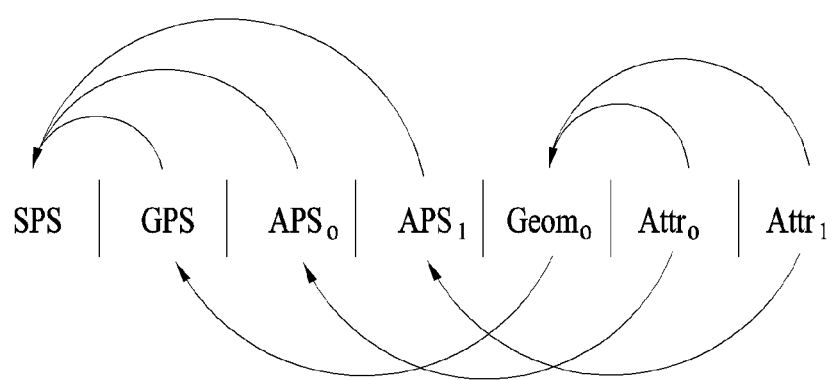
FIG. 33 illustrates a connection relationship between elements in a bitstream of point cloud data according to embodiments.

FIG. 33 illustrates a connection relationship between elements in a bitstream of point cloud data according to embodiments.

The bitstream structure for the point cloud data illustrated in FIGS. 32 and 33 may represent the bitstream structure for point cloud data shown in FIG. 31.

According to the embodiments, the SPS may include an identifier (seq_parameter_set_id) for identifying the SPS, and the GPS may include an identifier (geom_parameter_set_id) for identifying the GPS and an identifier (seq_parameter_set_id) indicating an active SPS to which the GPS belongs. The APS may include an identifier (attr_parameter_set_id) for identifying the APS and an identifier (seq_parameter_set_id) indicating an active SPS to which the APS belongs. According to embodiments, geometry data may include a geometry slice header and geometry slice data. The geometry slice header may include an identifier (geom_parameter_set_id) of an active GPS to be referred to by a corresponding geometry slice. Moreover, the geometry slice header may further include an identifier (geom_slice_id) for identifying a corresponding geometry slice and/or an identifier (geom_tile_id) for identifying a corresponding tile. The geometry slice data may include a geometry bitstream belonging to a corresponding slice. According to embodiments, attribute data may include an attribute slice header and attribute slice data. The attribute slice header may include an identifier (attr_parameter_set_id) of an active APS to be referred to by a corresponding attribute slice and an identifier (geom_slice_id) for identifying a geometry slice related to the attribute slice. The attribute slice data may include an attribute bitstream belonging to a corresponding slice.

That is, the geometry slice refers to the GPS, and the GPS refers the SPS. In addition, the SPS lists available attributes, assigns an identifier to each of the attributes, and identifies a decoding method. The attribute slice is mapped to output attributes according to the identifier. The attribute slice has a dependency on the preceding (decoded) geometry slice and the APS. The APS refers to the SPS.

According to embodiments, parameters necessary for encoding of the point cloud data may be newly defined in a parameter set of the point cloud data and/or a corresponding slice header. For example, when encoding of the attribute information is performed, the parameters may be added to the APS. When tile-based encoding is performed, the parameters may be added to the tile and/or slice header.

As shown in FIGS. 31 to 33, the bitstream of the point cloud data provides tiles or slices such that the point cloud data may be partitioned and processed by regions. According to embodiments, the respective regions of the bitstream may have different importances. Accordingly, when the point cloud data is partitioned into tiles, a different filter (encoding method) and a different filter unit may be applied to each tile. When the point cloud data is partitioned into slices, a different filter and a different filter unit may be applied to each slice.

When the point cloud data is partitioned and compressed, the transmission device and the reception device according to the embodiments may transmit and receive a bitstream in a high-level syntax structure for selective transmission of attribute information in the partitioned regions.

The transmission device according to the embodiments may transmit point cloud data according to the bitstream structure as shown in FIGS. 31 to 33. Accordingly, a method to apply different encoding operations and use a good-quality encoding method for an important region may be provided. In addition, efficient encoding and transmission may be supported according to the characteristics of point cloud data, and attribute values may be provided according to user requirements.

The reception device according to the embodiments may receive the point cloud data according to the bitstream structure as shown in FIGS. 31 to 33. Accordingly, different filtering (decoding) methods may be applied to the respective regions (regions partitioned into tiles or into slices), rather than a complexly decoding (filtering) method being applied to the entire point cloud data. Therefore, better image quality in a region important is provided to the user and an appropriate latency to the system may be ensured.

A field, which is the term used in syntaxes of the present disclosure described later, may have the same meaning as a parameter or an element.

FIG. 34 shows an embodiment of a syntax structure of a sequence parameter set (SPS) (seq_parameter_set( )) according to the present disclosure. The SPS may contain sequence information about a point cloud data bitstream.

The SPS according to the embodiments may include a main_profile_compatibility_flag field, a unique_point_positions_constraint_flag field, a level_idc field, an sps_seq_parameter_set_id field, an sps_bounding_box_present_flag field, an sps_source_scale_factor_numerator_minus1 field, an sps_source_scale_factor_denominator_minus1 field, an sps_num_attribute_sets field, log2_max_frame_idx field, an axis_coding_order field, an sps_bypass_stream_enabled_flag field, and an sps_extension_flag field.

The main_profile_compatibility_flag field may indicate whether the bitstream conforms to the main profile. For example, main_profile_compatibility_flag equal to 1 may indicate that the bitstream conforms to the main profile. For example, main_profile_compatibility_flag equal to 0 may indicate that the bitstream conforms to a profile other than the main profile.

When unique_point_positions_constraint_flag is equal to 1, in each point cloud frame that is referred to by the current SPS, all output points may have unique positions. When unique_point_positions_constraint_flag is equal to 0, in any point cloud frame that is referred to by the current SPS, two or more output points may have the same position. For example, even when all points are unique in the respective slices, slices in a frame and other points may overlap. In this case, unique_point_positions_constraint_flag is set to 0.

level_idc indicates a level to which the bitstream conforms.

sps_seq_parameter_set_id provides an identifier for the SPS for reference by other syntax elements.

The sps_bounding_box_present_flag field indicates whether a bounding box is present in the SPS. For example, sps_bounding_box_present_flag equal to 1 indicates that the bounding box is present in the SPS, and sps_bounding_box_present_flag equal to 0 indicates that the size of the bounding box is undefined.

According to embodiments, when sps_bounding_box_present_flag is equal to 1, the SPS may further include an sps_bounding_box_offset_x field, an sps_bounding_box_offset_y field, an sps_bounding_box_offset_z field, an sps_bounding_box_offset_log2_scale field, an sps_bounding_box_size_width field, an sps_bounding_box_size_height field, and an sps_bounding_box_size_depth field.

sps_bounding_box_offset_x indicates the x offset of the source bounding box in Cartesian coordinates. When the x offset of the source bounding box is not present, the value of sps_bounding_box_offset_x is 0.

sps_bounding_box_offset_y indicates the y offset of the source bounding box in Cartesian coordinates. When the y offset of the source bounding box is not present, the value of sps_bounding_box_offset_y is 0.

sps_bounding_box_offset_z indicates the z offset of the source bounding box in Cartesian coordinates. When the z offset of the source bounding box is not present, the value of sps_bounding_box_offset_z is 0.

sps_bounding_box_offset_log2_scale indicates a scale factor for scaling quantized x, y, and z source bounding box offsets.

sps_bounding_box_size_width indicates the width of the source bounding box in Cartesian coordinates. When the width of the source bounding box is not present, the value of sps_bounding_box_size_width may be 1.

sps_bounding_box_size_height indicates the height of the source bounding box in Cartesian coordinates. When the height of the source bounding box is not present, the value of sps_bounding_box_size_height may be 1.

sps_bounding_box_size_depth indicates the depth of the source bounding box in Cartesian coordinates. When the depth of the source bounding box is not present, the value of sps_bounding_box_size_depth may be 1.

sps_source_scale_factor_numerator_minus1 plus 1 indicates the scale factor numerator of the source point cloud.

sps_source_scale_factor_denominator_minus1 plus 1 indicates the scale factor denominator of the source point cloud.

sps_num_attribute_sets indicates the number of coded attributes in the bitstream.

The SPS according to the embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension_minus1[i] field and an attribute_instance_id[i] field. attribute_dimension_minus1[i] plus 1 indicates the number of components of the i-th attribute.

The attribute_instance_id[i] field specifies the instance ID of the i-th attribute.

According to embodiments, when the value of the attribute_dimension_minus1[i] field is greater than 1, the iteration statement may further include an attribute_secondary_bitdepth_minus1[i] field, an attribute_cicp_colour_primaries[i] field, an attribute_cicp_transfer_characteristics[i] field, an attribute_cicp_matrix_coeffs[i] field, and an attribute_cicp_video_full_range_flag[i] field.

attribute_secondary_bitdepth_minus1[i] plus 1 specifies the bitdepth for the secondary component of the i-th attribute signal(s).

attribute_cicp_colour_primaries[i] indicates the chromaticity coordinates of the color attribute source primaries of the i-th attribute.

attribute_cicp_transfer_characteristics[i] either indicates the reference opto-electronic transfer characteristic function of the color attribute as a function of a source input linear optical intensity with a nominal real-valued range of 0 to 1 or indicates the inverse of the reference electro-optical transfer characteristic function as a function of an output linear optical intensity attribute_cicp_matrix_coeffs[i] describes the matrix coefficients used in deriving luma and chroma signals from the green, blue, and red, or Y, Z, and X primaries of the i-th attribute.

attribute_cicp_video_full_range_flag[i] specifies the black level and range of the luma and chroma signals as derived from E′Y, E′PB, and E′PR or E′R, E′G, and E′B real-valued component signals of the i-th attribute.

The known_attribute_label_flag[i] field indicates whether a know_attribute_label[i] field or an attribute_label_four_bytes[i] field is signaled for the i-th attribute. For example, when known_attribute_label_flag[i] equal to 0 indicates the known_attribute_label[i] field is signaled for the i-th attribute. known_attribute_label_flag[i] equal to 1 indicates that the attribute_label_four_bytes[i] field is signaled for the i-th attribute.

known_attribute_label[i] specifies the type of the i-th attribute. For example, known_attribute_label[i] equal to 0 may specify that the i-th attribute is color. known_attribute_label[i] equal to 1 may specify that the i-th attribute is reflectance. known_attribute_label[i] equal to 2 may specify that the i-th attribute is frame index. Also, known_attribute_label[i] equal to 4 specifies that the i-th attribute is transparency. known_attribute_label[i] equal to 5 specifies that the i-th attribute is normals.

attribute_label_four_bytes[i] indicates the known attribute type with a 4-byte code.

According to embodiments, attribute_label_four_bytes[i] equal to 0 may indicate that the i-th attribute is color. attribute_label_four_bytes[i] equal to 1 may indicate that the i-th attribute is reflectance. attribute_label_four_bytes[i] equal to 2 may indicate that the i-th attribute is a frame index. attribute_label_four_bytes[i] equal to 4 may indicate that the i-th attribute is transparency. attribute_label_four_bytes[i] equal to 5 may indicate that the i-th attribute is normals.

log2_max_frame_idx indicates the number of bits used to signal a syntax variable frame_idx.

axis_coding_order specifies the correspondence between the X, Y, and Z output axis labels and the three position components in the reconstructed point cloud RecPic[pointidx][axis] with and axis=0 . . . 2.

sps_bypass_stream_enabled_flag equal to 1 specifies that the bypass coding mode may be used in reading the bitstream. As another example, sps_bypass_stream_enabled_flag equal to 0 specifies that the bypass coding mode is not used in reading the bitstream.

sps_extension_flag indicates whether the sps_extension_data syntax structure is present in the SPS syntax structure. For example, sps_extension_present_flag equal to 1 indicates that the sps_extension_data syntax structure is present in the SPS syntax structure. sps_extension_present_flag equal to 0 indicates that this syntax structure is not present.

When the value of the sps_extension_flag field is 1, the SPS according to the embodiments may further include an sps_extension_data_flag field.

sps_extension_data_flag may have any value.

FIG. 35 shows an embodiment of a syntax structure of the GPS (geometry_parameter_set( )) according to the present disclosure. The GPS may include information on a method of encoding geometry information of point cloud data included in one or more slices.

According to embodiments, the GPS may include a gps_geom_parameter_set_id field, a gps_seq_parameter_set_id field, gps_box_present_flag field, a unique_geometry_points_flag field, a geometry_planar_mode_flag field, a geometry_angular_mode_flag field, a neighbour_context_restriction_flag field, a inferred_direct_coding_mode_enabled_flag field, a bitwise_occupancy_coding_flag field, an adjacent_child_contextualization_enabled_flag field, a log2_neighbour_avail_boundary field, a log2_intra_pred_max_node_size field, a log2_trisoup_node_size field, a geom_scaling_enabled_flag field, a gps_implicit_geom_partition_flag field, and a gps_extension_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry slice header that references the current GPS. Accordingly, when the gps_box_present_flag field is equal to 1, the GPS may further include a gps_gsh_box_log2_scale_present_flag field.

The gps_gsh_box_log2_scale_present_flag field specifies whether the gps_gsh_box_log2_scale field is signaled in each geometry slice header that references the current GPS. For example, the gps_gsh_box_log2_scale_present_flag field equal to 1 may specify that the gps_gsh_box_log2_scale field is signaled in each geometry slice header that references the current GPS. As another example, the gps_gsh_box_log2_scale_present_flag field equal to 0 may specify that the gps_gsh_box_log2_scale field is not signaled in each geometry slice header and a common scale for all slices is signaled in the gps_gsh_box_log2_scale field of the current GPS.

When the gps_gsh_box_log2_scale_present_flag field is equal to 0, the GPS may further include a gps_gsh_box_log2_scale field.

The gps_gsh_box_log2_scale field indicates the common scale factor of the bounding box origin for all slices that refer to the current GPS.

unique_geometry_points_flag indicates whether all output points have unique positions in one slice in all slices currently referring to GPS. For example, unique_geometry_points_flag equal to 1 indicates that in all slices that refer to the current GPS, all output points have unique positions within a slice. unique_geometry_points_flag field equal to 0 indicates that in all slices that refer to the current GPS, the two or more of the output points may have same positions within a slice.

The geometry_planar_mode_flag field indicates whether the planar coding mode is activated. For example, geometry_planar_mode_flag equal to 1 indicates that the planar coding mode is active. geometry_planar_mode_flag equal to 0 indicates that the planar coding mode is not active.

When the value of the geometry_planar_mode_flag field is 1, that is, TRUE, the GPS may further include a geom_planar_mode_th_idcm field, a geom_planar_mode_th[1] field, and a geom_planar_mode_th[2] field.

The geom_planar_mode_th_idcm field may specify the value of the threshold of activation for the direct coding mode.

geom_planar_mode_th[i] specifies, for i in the range of 0 . . . 2, specifies the value of the threshold of activation for planar coding mode along the i-th most probable direction for the planar coding mode to be efficient.

geometry_angular_mode_flag indicates whether the angular coding mode is active. For example, geometry_angular_mode_flag field equal to 1 may indicate that the angular coding mode is active. geometry_angular_mode_flag field equal to 0 may indicate that the angular coding mode is not active.

When the value of the geometry_angular_mode_flag field is 1, that is, TRUE, the GPS may further include an lidar_head_position[0] field, a lidar_head_position[1] field, a lidar_head_position[2] field, a number_lasers field, a planar_buffer_disabled field, an implicit_qtbt_angular_max_node_min_dim_log2_to_split_z field, and an implicit_qtbt_angular_max_diff_to_split_z field.

The lidar_head_position[0] field, lidar_head_position[1] field, and lidar_head_position[2] field may specify the (X, Y, Z) coordinates of the lidar head in the coordinate system with the internal axes.

number_lasers specifies the number of lasers used for the angular coding mode.

The GPS according to the embodiments includes an iteration statement that is repeated as many times as the value of the number_lasers field. In an embodiment, i is initialized to 0, and is incremented by 1 each time the iteration statement is executed. The iteration statement is repeated until the value of i becomes equal to the value of the number_lasers field. This iteration statement may include a laser_angle[i] field and a laser_correction[i] field.

laser_angle[i] specifies the tangent of the elevation angle of the i-th laser relative to the horizontal plane defined by the 0-th and the 1st internal axes.

laser_correction[i] specifies the correction, along the second internal axis, of the i-th laser position relative to the lidar_head_position[2].

planar_buffer_disabled equal to 1 indicates that tracking the closest nodes using a buffer is not used in process of coding the planar mode flag and the plane position in the planar mode. planar_buffer_disabled equal to 0 indicates that tracking the closest nodes using a buffer is used.

implicit_qtbt_angular_max_node_min_dim_log2_to_split_z specifies the log 2 value of a node size below which horizontal split of nodes is preferred over vertical split.

implicit_qtbt_angular_max_diff_to_split_z specifies the log 2 value of the maximum vertical over horizontal node size ratio allowed to a node.

neighbour_context_restriction_flag equal to 0 indicates that geometry node occupancy of the current node is coded with the contexts determined from neighbouring nodes which is located inside the parent node of the current node. neighbour_context_restriction_flag equal to 1 indicates that geometry node occupancy of the current node is coded with the contexts determined from neighbouring nodes which is located inside or outside the parent node of the current node.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element ocupancy_map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for the occupancy contextualization. The log2_neighbour_avail_boundary field specifies the value of the variable NeighbAvailBoundary that is used in the decoding process.

For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log2_neighbour_avail_boundary.

The log2_intra_pred_max_node_size field specifies the octree node size eligible for occupancy intra prediction.

The log2_trisoup_node_size field specifies the variable TrisoupNodeSize as the size of the triangle nodes.

geom_scaling_enabled_flag indicates specifies whether a scaling process for geometry positions is applied during the geometry slice decoding process. For example, geom_scaling_enabled_flag equal to 1 specifies that a scaling process for geometry positions is applied during the geometry slice decoding process. geom_scaling_enabled_flag equal to 0 specifies that geometry positions do not require scaling.

geom_base_qp indicates the base value of the geometry position quantization parameter.

gps_implicit_geom_partition_flag indicates whether the implicit geometry partition is enabled for the sequence or slice. For example, equal to 1 specifies that the implicit geometry partition is enabled for the sequence or slice. gps_implicit_geom_partition_flag equal to 0 specifies that the implicit geometry partition is disabled for the sequence or slice. When gps_implicit_geom_partition_flag is equal to 1, the following two fields, that is, a gps_max_num_implicit_qtbt_before_ot field and a gps_min_size_implicit_qtbt field, are signaled.

gps_max_num_implicit_qtbt_before_ot specifies the maximal number of implicit QT and BT partitions before OT partitions. Then, the variable K is initialized by gps_max_num_implicit_qtbt_before_ot as follows.

$$K=gps\_max\_num\_implicit\_qtbt\_before\_ot.$$

gps_min_size_implicit_qtbt specifies the minimal size of implicit QT and BT partitions. Then, the variable M is initialized by gps_min_size_implicit_qtbt as follows.

$$M=gps\_min\_size\_implicit\_qtbt$$

gps_extension_flag indicates whether a gps_extension_data syntax structure is present in the GPS syntax structure. For example, gps_extension_flag equal to 1 indicates that the gps_extension_data syntax structure is present in the GPS syntax. For example, gps_extension_flag equal to 0 indicates that the gps_extension_data syntax structure is not present in the GPS syntax.

When gps_extension_flag is equal to 1, the GPS according to the embodiments may further include a gps_extension_data_flag field.

gps_extension_data_flag may have any value. Its presence and value do not affect decoder conformance to profiles.

FIG. 36 shows an embodiment of a syntax structure of the attribute parameter set (APS) (attribute_parameter_set( )) according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

According to embodiments, the attr_coding_type field equal to 0 may indicate predicting weight lifting as the coding type. The attr_coding_type field equal to 1 may indicate RAHT as the coding type. The attr_coding_type field equal to 2 may indicate fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours_minus1 field, a lifting_search_range_minus1 field, and a lifting_neighbour_bias[k] field.

lifting_num_pred_nearest_neighbours plus 1 specifies the maximum number of nearest neighbors to be used for prediction. According to embodiments, the value of NumPredNearestNeighbours is set equal to lifting_num_pred_nearest_neighbours.

lifting_search_range_minus1 plus 1 specifies the search range used to determine nearest neighbours to be used for prediction and to build distance-based levels of detail (LODs). The variable LiftingSearchRange for specifying the search range may be obtained by adding 1 to the value of the lifting_search_range_minus1 field (LiftingSearchRange=lifting_search_range_minus1+1).

The lifting_neighbour_bias[k] field specifies a bias used to weight the k-th components in the calculation of the Euclidean distance between two points as part of the nearest neighbor derivation process.

When the value of the attr_coding_type field is 2, that is, when the coding type indicates fix weight lifting, the APS according to the embodiments may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points. The lifting_scalability_enabled_flag field equal to 0 specifies that that the attribute decoding process requires the complete octree decode result for the input geometry points.

According to embodiments, when the value of the lifting_scalability_enabled_flag field is FALSE, the APS may further include a lifting_num_detail_levels_minus1 field.

The lifting_num_detail_levels_minus1 field specifies the number of levels of detail for the attribute coding. The variable LevelDetailCount for specifying the number of LODs may be obtained by adding 1 to the value of the lifting_num_detail_levels_minus1 field. (LevelDetailCount=lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LODs) are built by a regular sampling strategy. For example, the lifting_lod_regular_sampling_enabled_flag equal to 1 specifies that levels of detail (LOD) are built by using a regular sampling strategy. The lifting_lod_regular_sampling_enabled_flag equal to 0 specifies that a distance-based sampling strategy is used instead.

According to embodiments, when the value of the lifting_scalability_enabled_flag field is FALSE, the APS may further include an iteration statement iterated as many times as the value of the lifting_num_detail_levels_minus1 field. In an embodiment, the index (idx) is initialized to 0 and incremented by 1 every time the iteration statement is executed, and the iteration statement is iterated until the index (idx) is greater than the value of the lifting_num_detail_levels_minus1 field. This iteration statement may include a lifting_sampling_period_minus2 [idx] field when the value of the lifting_lod_decimation_enabled_flag field is TRUE (e.g., 1), and may include a lifting_sampling_distance_squared_scale_minus1 [idx] field when the value of the lifting_lod_regular_sampling_enabled_flag field is FALSE (e.g., 0). Also, when the value of idx is not 0 (idx!=0), a lifting_sampling_distance_squared_offset [idx] field may be further included.

lifting_sampling_period_minus2 [idx] plus 2 specifies the sampling period for the level of detail idx.

lifting_sampling_distance_squared_scale_minus1 [idx] plus 1 specifies the scale factor for the derivation of the square of the sampling distance for the level of detail idx.

The lifting_sampling_distance_squared_offset [idx] field specifies the offset of the derivation of the square of the sampling distance for the level of detail idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled_flag field.

The lifting_adaptive_prediction_threshold field specifies the threshold to enable adaptive prediction. According to embodiments, a variable AdaptivePredictionThreshold for specifying a threshold for switching an adaptive predictor selection mode is set equal to the value of the lifting_adaptive_prediction_threshold field (AdaptivePredictionThreshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to LevelDetailCount indicates that target point could refer to decoded points in the same LOD layer for all LOD layers. For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

According to the embodiments, when the value of the attr_coding_type field is 1, that is, when the attribute coding type is RAHT, the APS may further include a raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. raht_prediction_enabled_flag equal to 0 specifies that the transform weight prediction is disabled in the RAHT decoding process.

According to embodiments, when the value of the raht_prediction_enabled_flag field is TRUE, the APS may further include a raht_prediction_threshold0 field and a raht_prediction_threshold1 field.

The raht_prediction_threshold0 field specifies a threshold to terminate the transform weight prediction from neighbour points.

The raht_prediction_threshold1 field specifies a threshold to skip the transform weight prediction from neighbour points.

The aps_extension_flag field specifies whether the aps_extension_data_flag syntax structure is present in the APS syntax structure. For example, aps_extension_flag equal to 1 indicates that the aps_extension_data syntax structure is present in the APS syntax structure. For example, aps_extension_flag equal to 0 indicates that the aps_extension_data syntax structure is not present in the APS syntax structure.

When the value of the aps_extension_flag field is 1, the APS according to the embodiments may further include an aps_extension_data_flag field.

The aps_extension_data_flag field may have any value. Its presence and value do not affect decoder conformance to profiles.

The APS according to the embodiments may further include information related to LoD-based attribute compression.

FIG. 37 shows an embodiment of a syntax structure of an APS (attribute_parameter_set( )) including information related to LoD-based attribute compression according to embodiments.

In FIG. 37, the information related to LoD-based attribute compression may include a constrained_QTBT_flag field, a num_LoD_minus1 field, and a LoD_sampling_method field.

The constrained_QTBT_flag field may indicate whether there is a constraint in generating a tree structure for compression of geometry information and/or compression of attribute information by a point cloud video encoder. For example, constrained_QTBT_flag equal to 1 may indicate that there is a constraint in generating the tree structure. According to embodiments, the constraint may be a condition for scalable attribute coding and/or may indicate that OT-based LoD generation may be used for a specific depth or lower depth (see the description of Embodiment 2 given above). For example, the value of the constrained_QTBT_flag field equal to 1 may be used to indicate that the attribute decoder 61004 of the reception device can generate LoDs using the OT/QT/BT-based geometry tree. As another example, the value of the constrained_QTBT_flag field equal to 1 may be used to indicate that the attribute decoder 61004 of the reception device can use some depths (starting from, for example, a leaf node) of the geometry tree for octree-based LoD generation.

According to embodiments, when the value of the constrained_QTBT_flag field is 1, the information related to the LoD-based attribute compression may further include a max_num_LoD field indicating the maximum number of LODs and a LoD_starting_depth field indicating a point where LoD starts. According to embodiments, the max_num_LoD field may indicate a depth size from a leaf level in the geometry tree. Also, the attribute decoder 61004 of the reception device may decode attribute information by generating octree-based LoD(s) only for the corresponding depth(s) in the geometry tree based on the constrained_QTBT_flag field, the max_num_LoD field, and the LoD_starting_depth field. The value of the constrained_QTBT_flag field equal to 0 may be used to indicate that the attribute decoder 61004 of the reception device should use octree-based LoD generation.

num_LoD_minus1 plus 1 may indicate the number of LoDs. Alternatively, it may signaled together with the num_tree_depth_minus1 field to indicate a depth in the geometry tree. In order to indicate the number of depths of the tree, the num_tree_depth_minus1 field may be included in the information related to the LoD-based attribute compression or the geometry slice header.

The LoD_sampling_method field may indicate a sampling method for selecting a point within a neighbor search range (or a configured neighbor) in generating LoDs. LoD_sampling_method equal to 0 may indicate that the first point may be selected from among the points configured (or included) in a neighbor. In an embodiment, the first point means the first point among the points sorted in Morton code order within the neighbor search range. LoD_sampling_method equal to 1 may indicate that the first point and the last point may be alternately selected for each depth. Here, the first point represents the first point among the points sorted in the Morton code order within the neighbor search range of the depth, and the last point represents the last point among the points sorted in the Morton code order within the neighbor search range of the depth. LoD_sampling_method equal to 2 may indicate that a point having a small Euclidean distance with respect to a neighbor center may be selected from among the points within the neighbor search range. In other words, LoD_sampling_method equal to 2 may indicate that a point close to the node center may be selected.

According to embodiments, when the value of the constrained_QTBT_flag field is TRUE (e.g., 1), the information related to LoD-based attribute compression may further include a max_LoD_depth_for_octree_based_LoD_generation field.

When the value of the constrained_QTBT_flag field is 1, the max_LoD_depth_for_octree_based_LoD_generation field may indicate a maximum LoD depth that may be matched with the octree-based LoD generation. According to embodiments, the maximum LoD depth may indicate the depth size from the leaf level of the geometry tree. According to embodiments, the max_LoD_depth_for_octree_based_LoD_generation field may have the same meaning as the LoD_starting_depth field.

According to embodiments, the information related to LoD-based attribute compression may further include a loop that is iterated as many times as the value of the num_LoD_minus1 field. In this case, in an embodiment, i may be initialized to 0, and be incremented by 1 each time the loop is executed. The loop may be iterated until i reaches the value of the num_LoD_minus1 field. This loop may include a cubic_node_flag field, a node_size_x field, a node_size_y field, and a node_size_z field.

cubic_node_flag equal to 1 may indicate that a unit node used for neighbor search in LoD generation is a node having a cube shape (i.e., a regular hexahedron) having the same length on the xyz sides. cubic_node_flag equal to 0 may indicate that the unit node used for neighbor search in LoD generation is a cuboid (or rectangular parallelepiped or non-cubic shape) having different lengths on the xyz sides.

When the value of the cubic_node_flag field is 0, the information related to the LoD-based attribute compression may further include a node_direction field.

The node_direction field may indicate directionality (i.e., a direction of partitioning) of a node having a cuboid shape. According to embodiments, the values of 0 to 5 may indicate nodes z, y, x, yz, xz, and xy directionalities, respectively. For example, when the size of a node on the xyz axes is expressed as $2^{dx}$, $2^{dy}$, and $2^{dz}$, (k, k, 2k), (k, 2k, k), (2k, k, k), (k, 2k, 2k), (2k, k, 2k), and (2k, 2k, k) may be obtained, Here, k denotes the unit size. Alternatively, the size a node on the xyz axes may be signaled using the node_size_x, node_size_y, and node_size_z fields.

The node_size_x, node_size_y, and node_size_z fields may indicate the size of a node on the xyz axes.

According to embodiments, when the value of the constrained_QTBT_flag field is 1, the loop may further include a no_representation_flag field.

When octree-based LoD generation is performed in attribute encoding, the no_representation_flag field may indicate whether a corresponding depth is suitable for scalable representation. Alternatively, the no_representation_flag field may be used to directly inform that the number of points for the geometry is different from the number of points for an attribute at the depth. For example, no_representation_flag field equal to 1 may indicate that the depth is not suitable for scalable representation. no_representation_flag field equal to 0 may indicate that the depth is suitable for scalable representation or that the number of points for the geometry is the same as the number of points for the attribute at the depth. As another example, the no_representation_flag field may indicate that the LoD is a LoD generated at a depth of the geometry tree where the point mismatch between the geometry and the attribute occurs. In this case, the LoD may not be used for attribute compression, and the attribute decoder 61004 of the reception device may not use the LoD for attribute reconstruction based on the information. The no_representation_flag field may have the same meaning as the LoD_skip_flag field. Alternatively, the LoD_skip_flag field may be further included in the information related to the LoD-based attribute compression. Alternatively, the attribute decoder 61004 of the reception device may determine whether the LoD is skipped based on the information included in the loop.

According to embodiments, the information related to the LoD-based attribute compression of FIG. 37 may be included in the if(LodParametersPresent) statement or if(attr_coding_type==0) statement in the APS of FIG. 36. This is merely an embodiment, and the information related to the LoD-based attribute compression may be included at any position in the APS of FIG. 36. FIG. 38 shows an embodiment of a syntax structure of a geometry slice bitstream( ) according to the present disclosure.

The geometry slice bitstream (geometry_slice_bitstream( )) according to the embodiments may include a geometry slice header (geometry_slice_header( )) and geometry slice data (geometry_slice_data( )). It may be referred to as a geometry slice. Also, the attribute slice bitstream may be referred to as an attribute slice.

FIG. 38 shows an exemplary syntax structure of geometry_slice_bitstream( ) according to embodiments.

The geometry slice bitstream (geometry_slice_bitstream( )) according to the embodiments may include a geometry slice header (geometry_slice_header( )) and geometry slice data (geometry_slice_data( )).

FIG. 39 shows an embodiment of a syntax structure of a geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to the embodiments may include a gsh_geometry_parameter_set_id field, a gsh_tile_id field, gsh_slice_id field, a frame_idx field, a gsh_num_points field, and a byte_alignment( ) field.

When the value of the gps_box_present_flag field included in the GPS is TRUE (e.g., 1), and the value of the gps_gsh_box_log2_scale_present_flag field is TRUE (e.g., 1), the geometry slice header (geometry_slice_header( )) according to the embodiments may further include a gsh_box_log2_scale field, a gsh_box_origin_x field, a gsh_box_origin_y field, and a gsh_box_origin_z field.

gsh_geometry_parameter_set_id specifies the value of the gps_geom_parameter_set_id of the active GPS.

The gsh_tile_id field specifies the value of the tile id that is referenced by the GSH.

The gsh_slice_id specifies ID of the slice for reference by other syntax elements.

The frame_idx field indicates log2_max_frame_idx+1 least significant bits of a conceptual frame number counter. Consecutive slices with differing values of frame_idx form parts of different output point cloud frames. Consecutive slices with identical values of frame_idx without an intervening frame boundary marker data unit form parts of the same output point cloud frame.

The gsh_num_points field indicates the maximum number of coded points in a slice. According to embodiments, it is a requirement of bitstream conformance that gsh_num_points is greater than or equal to the number of decoded points in the slice.

The gsh_box_log2_scale field specifies the scaling factor of the bounding box origin for the slice.

The gsh_box_origin_x field specifies the x value of the bounding box origin scaled by the value of the gsh_box_log2_scale field.

The gsh_box_origin_y field specifies the y value of the bounding box origin scaled by the value of the gsh_box_log2_scale field.

The gsh_box_origin_z field specifies the z value of the bounding box origin scaled by the value of the gsh_box_log2_scale field.

Here, the variables slice_origin_x, slice_origin_y, and slice_origin_z may be derived as follows.

When gps_gsh_box_log2_scale_present_flag is equal to 0, originScale is set to gsh_box_log2_scale.

When gps_gsh_box_log2_scale_present_flag is equal to 1, originScale is set to gps_gsh_box_log2_scale.

When gps_box_present_flag is equal to 0, the values of the variables slice_origin_x, slice_origin_y, and slice_origin_z are inferred to be 0.

When gps_box_present_flag is equal to 1, the following equations will be applied to the variables slice_origin_x, slice_origin_y, and slice_origin_z.

$$slice\_origin\_x = gsh\_box\_origin\_x << originScale$$

$$slice\_origin\_y = gsh\_box\_origin\_y << originScale$$

$$slice\_origin\_z = gsh\_box\_origin\_z << originScale$$

When the value of the gps_implicit_geom_partition_flag field is TRUE (i.e., 0), the geometry slice header ((geometry_slice_header( )) may further include a gsh_log2_max_nodesize_x field, a gsh_log2_max_nodesize_y_minus_x field, and a gsh_log2_max_nodesize_z_minus_y field. When the value of the gps_implicit_geom_partition_flag field is FALSE (i.e., 1), the geometry slice header may further include a gsh_log2_max_nodesize field.

The gsh_log2_max_nodesize_x field specifies the bounding box size in the x dimension, i.e., MaxNodesizeXLog2 that is used in the decoding process as follows.

MaxNodeSizeXLog2=gsh_log2_max_nodesize_x

MaxNodeSizeX=1<<MaxNodeSizeXLog2

The gsh_log2_max_nodesize_y_minus_x field specifies the bounding box size in the y dimension, i.e., MaxNodesizeYLog2 that is used in the decoding process as follows.

MaxNodeSizeYLog2=gsh_log2_max_nodesize_y_minus_x+
    MaxNodeSizeXLog2.

MaxNodeSizeY=1<<MaxNodeSizeYLog2.

The gsh_log2_max_nodesize_z_minus_y field specifies the bounding box size in the z dimension, i.e., MaxNodesizeZLog2 that is used in the decoding process as follows.

MaxNodeSizeZLog2=gsh_log2_max_nodesize_z_minus_y+
    MaxNodeSizeYLog2

MaxNodeSizeZ=1<<MaxNodeSizeZLog2

When the value of the gps_implicit_geom_partition_flag field is 1, gsh_log2_max_nodesize is obtained as follows.

gsh_log2_max_nodesize=max{MaxNodeSizeXLog2,
    MaxNodeSizeYLog2,MaxNodeSizeZLog2}

The gsh_log2_max_nodesize field specifies the size of the root geometry octree node when gps_implicit_geom_partition_flag is equal to 0.

Here, the variables MaxNodeSize and MaxGeometryOctreeDepth are derived as follows.

MaxNodeSize=1<<gsh_log2_max_nodesize

MaxGeometryOctreeDepth=gsh_log2_max_nodesize-
    log2_trisoup_node_size

When the value of the geom_scaling_enabled_flag field is TRUE, the geometry slice header (geometry_slice_header( )) according to the embodiments may further include a geom_slice_qp_offset field and a geom_octree_qp_offsets_enabled_flag field.

The geom_slice_qp_offset field specifies an offset to the base geometry quantization parameter geom_base_qp.

The geom_octree_qp_offsets_enabled_flag field specifies whether the geom_octree_qp_ofsets_depth field is present in the geometry slice header. For example, geom_octree_qp_offsets_enabled_flag equal to 1 specifies that the geom_octree_qp_ofsets_depth field is present in the geometry slice header. geom_octree_qp_offsets_enabled_flag equal to 0 specifies that the geom_octree_qp_ofsets_depth field is not present.

The geom_octree_qp_offsets_depth field specifies the depth of the geometry octree.

FIG. 40 shows an embodiment of a syntax structure of geometry slice data (geometry_slice_data( )) according to the present disclosure. The geometry slice data (geometry_slice_data( )) according to the embodiments may carry a geometry bitstream belonging to a corresponding slice.

The geometry_slice_data( ) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth.

In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth][nodeIdx], and geometry_node(depth, nodeIdx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY[depth][nodeIdx], and NodeZ[depth][nodeIdx] indicate the x, y, z coordinates of the idx-th node in decoding order at a given depth. The geometry bitstream of the node of the depth is transmitted through geometry_node(depth, nodeIdx, xN, yN, zN).

The geometry slice data (geometry_slice_data( )) according to the embodiments may further include geometry_trisoup_data( ) when the value of the log2_trisoup_node_size field is greater than 0. That is, when the size of the triangle nodes is greater than 0, a geometry bitstream subjected to trisoup geometry encoding is transmitted through geometry_trisoup_data( ).

FIG. 41 shows an embodiment of a syntax structure of attribute_slice_bitstream( ) according to the present disclosure.

The attribute slice bitstream (attribute_slice_bitstream( )) according to the embodiments may include an attribute slice header (attribute_slice_header( )) and attribute slice data (attribute_slice_data( )).

FIG. 42 shows an embodiment of a syntax structure of an attribute slice header (attribute_slice_header( )) according to the present disclosure.

The attribute slice header (attribute_slice_header( )) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field of the APS is TRUE (e.g., 1), the attribute slice header (attribute_slice_header( )) according to the embodiments may further include a ash_attr_qp_delta_luma field. When the value of the attribute_dimension_minus1 [ash_attr_sps_attr_idx] field is greater than 0, the attribute slice header may further include an ash_attr_qp_delta_chroma field.

The ash_attr_parameter_set_id field specifies the value of the aps_attr_parameter_set_id field of the current active APS.

The ash_attr_sps_attr_idx field specifies an attribute set in the current active SPS.

The ash_attr_geom_slice_id field specifies the value of the gsh_slice_id field of the current geometry slice header.

The ash_attr_qp_delta_luma field specifies a luma delta quantization parameter qp derived from the initial slice qp in the active attribute parameter set.

The ash_attr_qp_delta_chroma field specifies the chroma delta qp derived from the initial slice qp in the active attribute parameter set.

The variables InitialSliceQpY and InitialSliceQpC are derived as follows.

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma The ash_attr_layer_qp_delta_present_flag field specifies whether the ash_attr_layer_qp_delta_luma field and the ash_attr_layer_qp_delta_chroma field are present in the ASH for each layer. For example, when the value of the ash_attr_layer_qp_delta_present_flag field is 1, it indicates that the ash_attr_layer_qp_delta_luma field and the ash_attr_layer_qp_delta_chroma field are present in the ASH. When the value is 0, it indicates that the fields are not present.

When the value of the ash_attr_layer_qp_delta_present_flag field is TRUE, the ASH may further include an ash_attr_num_layer_qp_minus1 field.

ash_attr_num_layer_qp_minus1 plus 1 indicates the number of layers through which the ash_attr_qp_delta_luma field and the ash_attr_qp_delta_chroma field are signaled. When the ash_attr_num_layer_qp field is not signaled, the value of the ash_attr_num_layer_qp field will be 0. According to embodiments, NumLayerQp specifying the number of layers may be obtained by adding 1 to the value of the ash_attr_num_layer_qp_minus1 field (NumLayerQp=ash_attr_num_layer_qp_minus1+1).

According to embodiments, when the value of the ash_attr_layer_qp_delta_present_flag field is TRUE, the geometry slice header may include a loop iterated as many times as the value of NumLayerQp. In this case, in an embodiment, i may be initialized to 0 and incremented by 1 every time the loop is executed, and the loop is iterated until the value of i reaches the value of NumLayerQp. This loop contains an ash_attr_layer_qp_delta_luma[i] field. Also, when the value of the attribute_dimension_minus1[ash_attr_sps_attr_idx] field is greater than 0, the loop may further include an ash_attr_layer_qp_delta_chroma[i] field.

The ash_attr_layer_qp_delta_luma field indicates a luma delta quantization parameter qp from InitialSliceQpY in each layer.

The ash_attr_layer_qp_delta_chroma field indicates a chroma delta quantization parameter qp from InitialSliceQpC in each layer.

The variables SliceQpY[i] and SliceQpC[i] with i=0, . . . , NumLayerQPNumQPLayer-1 are derived as follows.

```
for ( i = 0; i < NumLayerQPNumQPLayer; i++) {
SliceQpY[i] = InitialSliceQpY + ash_attr_layer_qp_delta_luma[i]
SliceQpC[i] = InitialSliceQpC + ash_attr_layer_qp_delta_chroma[i]
}
``` ash_attr_region_qp_delta_present_flag equal to 1 indicates that ash_attr_region_qp_delta, region bounding box origin, and size are present in the current the attribute slice header (attribute_slice_header( )) according to the embodiments. ash_attr_region_qp_delta_present_flag equal to 0 indicates that the ash_attr_region_qp_delta, region bounding box origin, and size are not present in the current attribute slice header.

That is, when the value of the ash_attr_layer_qp_delta_present_flag field is 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field indicates the z offset of the region bounding box relative to slice_origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field indicates delta qp from SliceQpY[i] and SliceQpC[i] of a region specified by the ash_attr_qp_region_box field.

According to embodiments, the variable RegionboxDeltaQp specifying a region box delta quantization parameter is set equal to the value of the ash_attr_region_qp_delta field (RegionboxDeltaQp=ash_attr_region_qp_delta).

The attribute slice header according to embodiments may further include information related to LoD-based attribute compression.

FIG. 43 is a diagram illustrating an embodiment of a syntax structure of an attribute slice header (attribute_slice_header( )) including information related to LoD-based attribute compression according to embodiments.

The information related to LoD-based attribute compression of FIG. 43 may include a constrained_QTBT_flag field, a num_LoD_minus1 field, and a LoD_sampling_method field. The information related to the LoD-based attribute compression may further include a max_LoD_depth_for_octree_based_LoD_generation field according to the value of the constrained_QTBT_flag field. The information related to the LoD-based attribute compression may further include a loop that is iterated as many times as the value of the num_LoD_minus1 field. The loop may include a cubic_node_flag field, a node_size_x field, a node_size_y field, and a node_size_z field. The loop may further include a node_direction field according to the value of the cubic_node_flag field, and may further include a no_representation_flag field according to the value of the constrained_QTBT_flag field.

The fields included in the information related to the LoD-based attribute compression of FIG. 43 have the same meaning as the fields in FIG. 37. Accordingly, for details of the fields, see the detailed description of FIG. 37.

According to embodiments, the information related to the LoD-based attribute compression of FIG. 43 may be included before the if (aps_slice_qp_delta_present_flag) statement in the attribute slice header of FIG. 43. This is merely an embodiment, and the information related to the LoD-based attribute compression may be included at any position in the APS of FIG. 43.

FIG. 44 is a diagram showing an embodiment of a syntax structure of attribute slice data (attribute_slice_data( )) according to the present disclosure. The attribute slice data (attribute_slice_data( )) according to the embodiments may carry an attribute bitstream belonging to the corresponding slice. The attribute slice data according to the embodiments may include an attribute or attribute related data in relation to some or all of the point clouds.

In FIG. 44, the zerorun field specifies the number of 0 prior to predIndex or residual.

The predIndex[i] field specifies a predictor index for decoding the value of the i-th point of the attribute. The value of the predIndex[i] field ranges from 0 to the value of the max_num_predictors field.

The operations of the above-described embodiments may be performed through the elements of the point cloud transmission/reception device/method according to the embodiments described below. Each element according to the embodiments may correspond to hardware, software, a processor and/or a combination thereof. Although this embodiment describes a method for compressing attribute information of point cloud data, the method described herein may be applied to geometry information compression and other compression methods.

FIG. 45 illustrates another example of a point cloud transmission device according to embodiments. The elements of the point cloud transmission device shown in FIG. 45 may be implemented as hardware, software, a processor and/or a combination thereof.

According to embodiments, the point cloud transmission device may include a signaling processor 51002, a geometry encoder 51003, an attribute encoder 51004, and a transmission processor 51005.

The geometry encoder 51003 and the attribute encoder 51004 may perform some or all of the operations described in relation to the point cloud video encoder 10002 of FIG. 1, the encoding 20001 of FIG. 2, the point cloud video encoder of FIG. 4, and the point cloud video encoder of FIG. 12.

In one embodiment, the geometry encoder 51003 generates a geometry tree by partitioning point cloud data composed of points distributed symmetrically or asymmetrically as described above based on OT or OT/QT/BT, and compress the geometry information of the point cloud data based on the generated geometry tree.

For details of generating a geometry tree by partitioning the point cloud data based on OT or OT/QT/BT by the geometry encoder 51003, refer to the description of FIGS. 16 to 30 given above.

The geometry encoder 51003 reconstructs geometry information based on positions changed through the compression, and outputs reconstructed (or decoded) geometry information to the attribute encoder 51004.

The attribute encoder 51004 compresses attribute information based on the positions on which geometry encoding has not been performed and/or the reconstructed geometry information. The attribute encoder 51004 may perform encode the attribute information or perform scalable attribute encoding by combining one or two or more of Embodiments 1 to 3.

The signaling processor 51002 may generate and/or process signaling information necessary for encoding/decoding/rendering of the geometry information and attribute information, and provide the same to the geometry encoder 51003, the attribute encoder 51004, and/or the transmission processor 51005. Alternatively, the signaling processor 51002 may receive the signaling information generated by the geometry encoder 51003, the attribute encoder 51004 and/or the transmission processor 51005. The signaling processor 51002 may provide information (e.g., head orientation information and/or viewport information) fed back from the reception device to the geometry encoder 51003, the attribute encoder 51004, and/or the transmission processor 51005.

In the present disclosure, the signaling information may be signaled and transmitted in units of parameter sets (sequence parameter set (SPS), geometry parameter set (GPS), attribute parameter set (APS), tile parameter set (TPS) (or tile inventory), etc.). Also, it may be signaled and transmitted in coding units of each image, such as slices or tiles.

According to embodiments, the signaling processor 51002 may signal the above-described LoD-based attribute compression-related information to at least the APS or the attribute slice header to provide the same to the geometry encoder 51003, the attribute encoder 51004 and/or the transmission processor 51005.

The method/device according to the embodiments may signal related information to add/perform the operations of the embodiments. The signaling information according to the embodiments may be used by the transmission device and/or the reception device.

The transmission processor 51005 may perform the same or similar operation and/or transmission method as the operation and/or transmission method of the transmission processor 12012 of FIG. 12, and perform the same or similar operation and/or transmission method as the operation and/or transmission method of the transmitter 1003 of FIG. 1. For details, referred to the description of FIG. 1 or FIG. 12. A description thereof will be omitted herein.

The transmission processor 51005 may transmit the geometry bitstream output from the geometry encoder 51003, the attribute bitstream output from the attribute encoder 51004, and the signaling bitstream output from the signaling processor 51002 by multiplexing the bitstreams into one bitstream or by encapsulating the bitstreams in a file or segment. In an embodiment of the present disclosure, the file may be in the ISOBMFF file format.

According to embodiments, the file or segment may be transmitted to the reception device or stored in a digital storage medium (e.g., USB, SD, CD, DVD, Blu-ray, HDD, SSD, etc.). The transmission processor 51005 according to the embodiments is capable of performing wired/wireless communication with the reception device over a network of 4G, 5G, 6G, etc. In addition, the transmission processor 51005 may perform a necessary data processing operation according to the network system (e.g., a 4G, 5G or 6G communication network system). Also, the transmission processor 51005 may transmit the encapsulated data in an on-demand manner.

Figure 46:
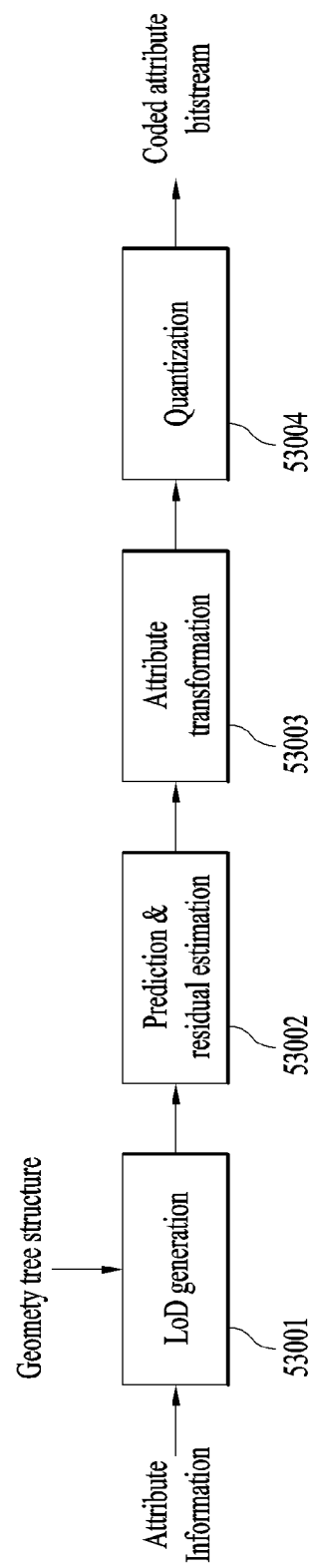
FIG. 46 is an exemplary detailed block diagram illustrating an attribute encoder according to embodiments.

FIG. 46 is an exemplary detailed block diagram of the attribute encoder 51004 according to embodiments. The elements of the attribute encoder shown in FIG. 46 may be implemented as hardware, software, a processor, and/or a combination thereof, etc.

According to embodiments, the attribute encoder 51004 may include a LoD generator 53001, an attribute compressor 53002, an attribute transformer 53003, and a quantizer 53004.

The LoD generator 53001 generates LoDs based on positions on which geometry encoding has not been performed and/or reconstructed geometry information. The LoD generator 53001 generates LoDs by one or a combination of two or more of the above-described Embodiments 1 to 3 described above based on FIGS. 16 to 30.

That is, the LoD generator 53001 generates LoDs based on the geometry tree structure as described above, and performs sub-sampling by defining a node of a corresponding geometry depth as a neighbor (or a neighbor search range) in generating the LoDs. Then, a geometry tree is constructed and the node size information according to the LoD layer is signaled through information related to the LoD-based attribute compression, for example, a num_LoD_minus1 field, a cubic_node_flag field, a node_direction field, a node_size_x field, a node_size_y field, and a node_size_z field. In addition, when the LoD generator 53001 is configured to perform octree-based LoD generation using the geometry tree, related information may be signaled through information related to the LoD-based attribute compression, for example, a constrained_QTBT_flag field and a max_LoD_depth_for_octree_based_LoD_generation field. Also, the LoD sampling method may be delivered through information related to the LoD-based attribute compression, for example, a LoD_sampling_method field. For details of the num_LoD_minus1 field, cubic_node_flag field, node_direction field, node_size_x field, node_size_y field, node_size_z field, constrained_QTBT_flag field, max_LoD_depth_for_octree_based_LoD_generation field, and LoD_sampling_method field included in the information related to the LoD-based attribute compression, referred to the description of FIG. 37.

The attribute compressor 53002 performs attribute prediction based on the LoDs generated by the LoD generator 53001, and generates residual attribute information based on the predicted attribute information. The residual attribute information is transformed into a compression domain by the attribute transformer 53003 and then quantized by the quantizer 53004. Then, the quantized residual attribute information is entropy-coded and output in the form of an attribute bitstream. The residual attribute information has the same meaning as prediction error attribute information.

Figure 47:
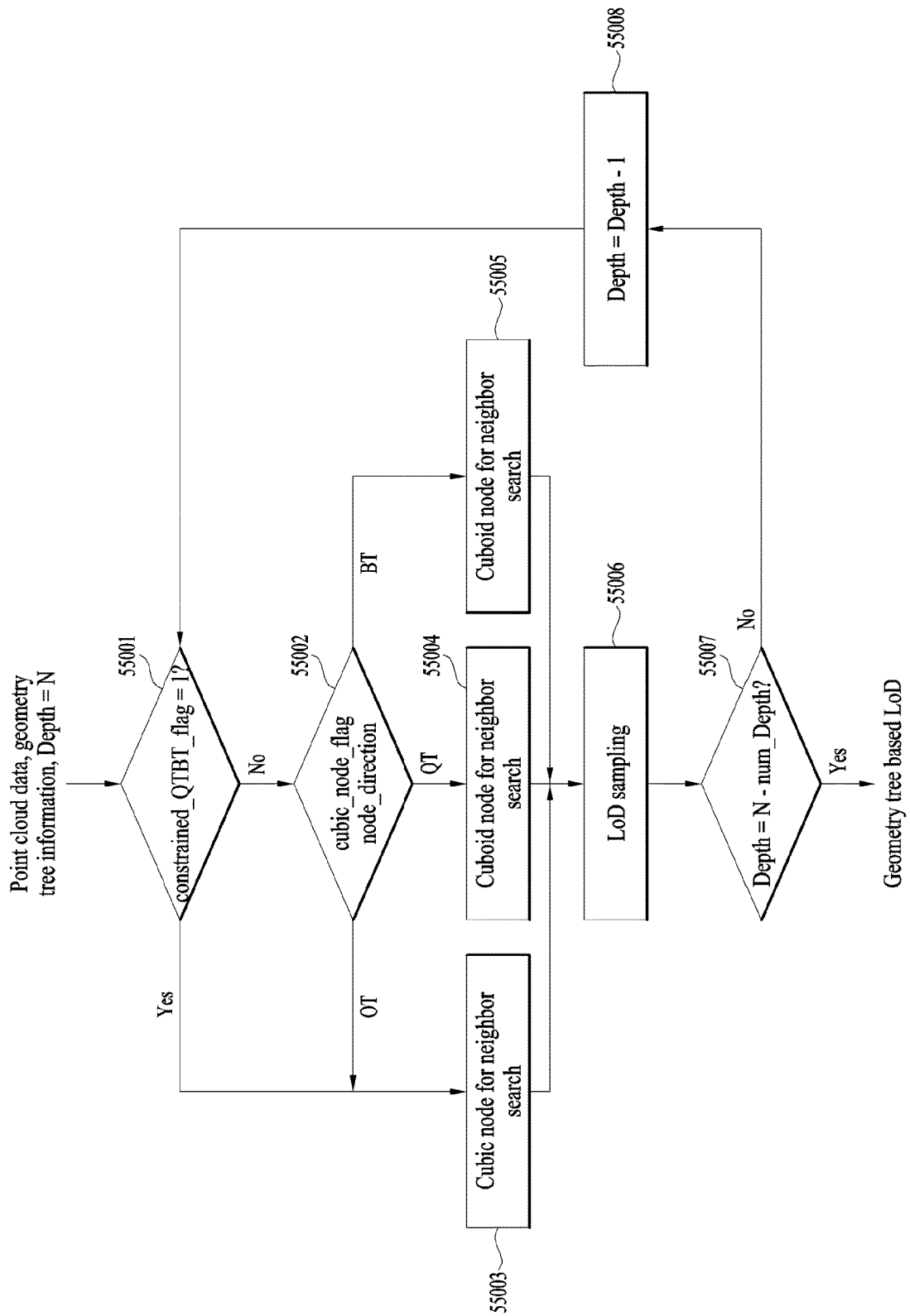
FIG. 47 is a flowchart illustrating an exemplary LoD generation method according to embodiments.

FIG. 47 is a flowchart illustrating an exemplary geometry tree-based LoD generation method according to embodiments.

First, it is assumed that information related to LoD-based attribute compression including information about the OT-based or OT/QT/BT-based geometry tree structure used by the geometry encoder 51003 for compression of the geometry information is provided to the attribute encoder 51004 via the signaling processor 51002. Also, it is assumed that the depth of the geometry tree is N.

In operation 55001, when point cloud data, the information related to the LoD-based attribute compression including the geometry tree information, and the depth information (N) are input, it is determined whether the value of the constrained_QTBT_flag field included in the information related to the LoD-based attribute compression is 1.

When the value of the constrained_QTBT_flag field is 1, the process proceeds to operation 55002. When the value of the constrained_QTBT_flag field is 0, the process proceeds to operation 55003.

When the value of the constrained_QTBT_flag field is 1, it may indicate that there is a constraint in generating the geometry tree structure. Here, the constraint may be a condition for scalable attribute coding, and may indicate that OT-based LoD generation may be used for a specific depth or lower depth. Also, the value of the constrained_QTBT_flag field equal to 1 may be used to indicate that the reception device can use OT-based LoD generation. The value of the constrained_QTBT_flag field equal to 0 may be used to indicate that the reception device should use the geometry tree-based LoD generation.

In operation 55002, cubic nodes generated by OT-based partitioning are configured for neighbor search at a corresponding depth.

In operation 55003, the process proceeds to operation 55004 or operation 55005 depending on the values of the cubic_node_flag field and the node_direction field included in the information related to the LoD-based attribute compression.

cubic_node_flag equal to 1 may indicate that a unit node used for neighbor search in LoD generation is a node having a cube shape having the same length on the xyz sides. cubic_node_flag equal to 0 may indicate that the unit node used for neighbor search in LoD generation is a cuboid shape having different lengths on the xyz sides. The node_direction field may indicate directionality (i.e., a direction of partitioning) of a node having a cuboid shape. Alternatively, the size of a node in the xyz axis directions may be indicated through the node_size_x, node_size_y, and node_size_z fields.

According to embodiments, the values of the node_direction field, 0 to 5, may indicate nodes z, y, x, yz, xz, and xy directionalities, respectively. For example, when the size of a node on the xyz axes is expressed as $2^{dx}$, $2^{dy}$, and $2^{dz}$, (k, k, 2k), (k, 2k, k), (2k, k, k), (k, 2k, 2k), (2k, k, 2k), and (2k, 2k, k) may be obtained, Here, k denotes the unit size.

Accordingly, when the value of the cubic_node_flag field is 1, the process proceeds to operation 55002 for OT-based LoD generation. When the value of the cubic_node_flag field is 0 and the value of the node_direction field is one of 3, 4, and 5, the process proceeds to operation 55004 for QT-based LoD generation. In addition, when the value of the cubic_node_flag field is 0 and the value of the node_direction field is one of 0, 1, and 2, the process proceeds to operation 55005 for BT-based LoD generation.

In operation 55004, cuboid nodes generated by QT-based partitioning are configured for neighbor search at the corresponding depth.

In operation 55005, cuboid nodes generated by BT-based partitioning are configured for neighbor search at the corresponding depth.

In operation 55006, a point belonging to the LoD is selected from cubic nodes or cuboid nodes provided from one of operations 55002, 55004, and 55005 based on the value of the LoD_sampling_method field included in the LoD-based attribute compression-related information.

For example, in operation 55006, when the value of the LoD_sampling_method field is 0, the first point may be selected. When the value is 1, the first and last points may be selected alternately in the LoDs. When the value is 2, a point having a small Euclidean distance with respect to the neighbor center may be selected.

In operation 55007, the current depth is checked. When there is a remaining depth for LoD generation, the depth variable N is reduced by 1 (operation 55008), the process proceeds to operation 55001. When LoD generation is completed for all depths, the LoD generation is terminated.

As such, when the value of the constrained_QTBT_flag field is 0 (or the value of 1 may be used according to the selection of the reception device), the shape of the node according to the depth of the geometry tree is changed to cube or cuboid. Once the node shape (neighbor search) is determined through signaling of information related to LoD-based attribute compression, a point corresponding to LoD is selected for each node. In this operation, a method signaled in the LOD_sampling_method may be used. By performing this process up to the root level or a depth corresponding to N−max_LoD_depth_fr_octree_based_LoD_generation, LoDS may be generated.

FIG. 48 illustrates another example of a point cloud reception device according to embodiments. The elements of the point cloud reception device shown in FIG. 48 may be implemented as hardware, software, a processor and/or a combination thereof.

According to embodiments, the point cloud reception device may include a reception processor 61001, a signaling processor 61002, a geometry decoder 61003, an attribute decoder 61004, and a post-processor 61005.

The reception processor 61001 according to the embodiments may receive one bitstream, or may receive a geometry bitstream, an attribute bitstream, and a signaling bitstream, respectively. When a file and/or segment is received, the reception processor 61001 may decapsulate the received file and/or segment and output a bitstream.

When one bitstream is received (or decapsulated), the reception processor 61001 according to the embodiments may demultiplex a geometry bitstream, an attribute bitstream, and/or a signaling bitstream from one bitstream, and output the demultiplexed signaling bitstream to the signaling processor 61002, output the demultiplexed geometry bitstream to the geometry decoder 61003, and output the demultiplexed attribute bitstream to the attribute decoder 61004.

When a geometry bitstream, an attribute bitstream, and/or a signaling bitstream are received (or decapsulated), respectively, the reception processor 61001 according to the embodiments may transmit the signaling bitstream to the signaling processor 61002, transmit the geometry bitstream to the geometry decoder 61003, and transmit the attribute bitstream to the attribute decoder 61004.

The signaling processor 61002 may parse and process information included in the signaling information, for example, SPS, GPS, APS, TPS, metadata, etc., from the input signaling bitstream and provide the same to the geometry decoder 61003, the attribute decoder 61004, and the post-processor 61005. In another embodiment, the signaling information included in the geometry slice header and/or the attribute slice header may also be parsed by the signaling processor 61002 before decoding of the corresponding slice data.

According to embodiments, the signaling processor 61002 may parse and process at least information related to LoD-based attribute compression signaled in the APS or attribute slice header, and provide the same to the geometry decoder 61003, the attribute decoder 61004, and the post-processor 61005.

According to embodiments, the geometry decoder 61003 may reconstruct the geometry by performing the reverse process of the operation of the geometry encoder 51003 of FIG. 45 for the compressed geometry bitstream based on the signaling information. The geometry information reconstructed (or restored) by the geometry decoder 61003 is provided to the attribute decoder 61004. The attribute decoder 61004 may reconstruct the attributes by performing the reverse process of the operation of the attribute encoder 51004 of FIG. 45 for the compressed attribute bitstream based on the signaling information and the reconstructed geometry information.

According to embodiments, the post-processor 61005 may match the geometry information (i.e., positions) reconstructed and output by the geometry decoder 61003 with the attribute information reconstructed and output by the attribute decoder 61004 to reconstruct and display/render the point cloud data.

Figure 49:
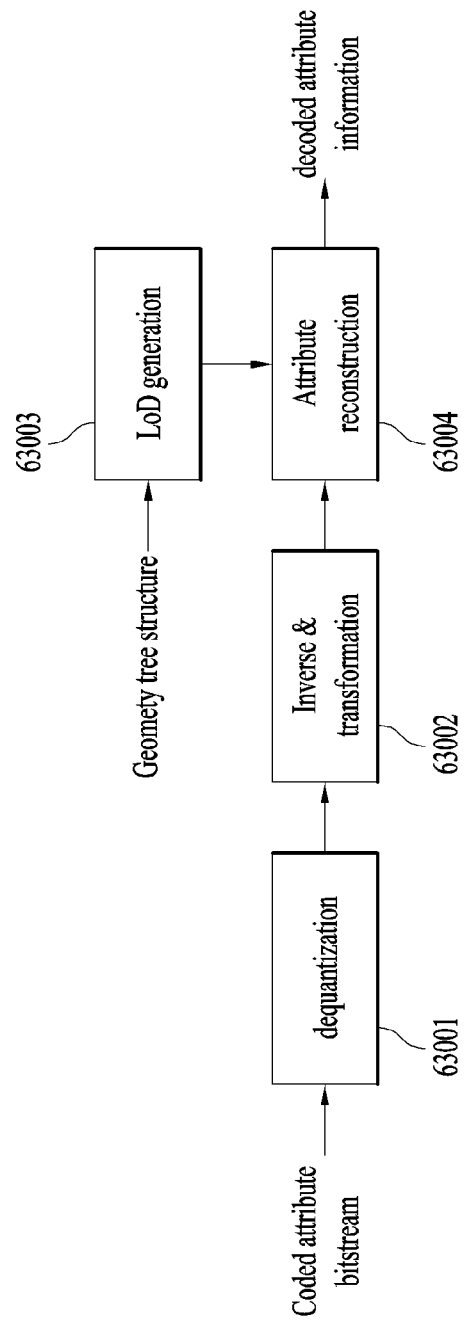
FIG. 49 is an exemplary detailed block diagram illustrating an attribute decoder according to embodiments.

FIG. 49 is an exemplary detailed block diagram illustrating the attribute decoder 61004 according to embodiments. The elements of the attribute decoder shown in FIG. 49 may be implemented as hardware, software, a processor and/or a combination thereof.

According to embodiments, the attribute decoder 61004 may include a dequantizer 63001, an inverse transformer 63002, a LoD generator 63003, and an attribute reconstructor 63004.

According to embodiments, the attribute decoder 61004 reconstructs attribute information by performing the reverse process of the operation of the attribute encoder 51004 of the transmission device. In other words, the dequantizer 63001 may entropy-decode on the residual attribute information included in the attribute bitstream, and then dequantize the same. Then, the dequantized residual attribute information is processed by the inverse transformer 63002 through the reverse process of the operation of the attribute transformer 53003, and then output to the attribute reconstructor 63004.

The attribute reconstructor 63004 performs attribute prediction based on the LoDs generated by the LoD generator 63003, and reconstructs the attribute information based on the predicted attribute information and the residual attribute information output from the inverse transformer 63002.

The LoD generator 63003 generates LoDs in the same or similar manner to the LoD generation method for the LoD generator 53001 of the transmission device. For example, the LoD generator 63003 may generate LoDs based on the geometry tree structure described with reference to FIGS. 16 to 30.

According to embodiments, the LoD generator 63003 may use different types of LoD generation based on the value of the constrained_QTBT_flag field. For example, when the value of the constrained_QTBT_flag field is 1, the LoD generator 63003 may perform OT-based LoD generation or OT/QT/BT-based LoD generation. The degree of depth allowing scalable representation may be determined through the max_LoD_depth_for_octree_based_LoD_generation field. For example, when the value of the constrained_QTBT_flag field is 0, the LoD generator 63003 may perform only LoD generation based on the geometry tree generated by a combination of OT/QT/BT, and an construct a geometry tree. The node size information according to the LoD layer may be determined based on the num_LoD_minus1, cubic_node_flag, node_direction, node_size_x, node_size_y, and node_size_z fields. According to embodiments, whether the LoD can be used in the scalable representation (that is, whether the geometry layer matches the attribute layer) may be determined based on the no_representation_flag field. For example, the LoD may be used in the scalable representation only when the value of the no_representation_flag field is 0.

As such, when geometry compression is performed by the transmission device by generating a geometry tree based on OT/QT/BT, the attribute information may also be compressed by generating LoDs based on OT/QT/BT. Thereby, the number of points for the geometry may be matched with the number of points for the attribute.

Figure 50:
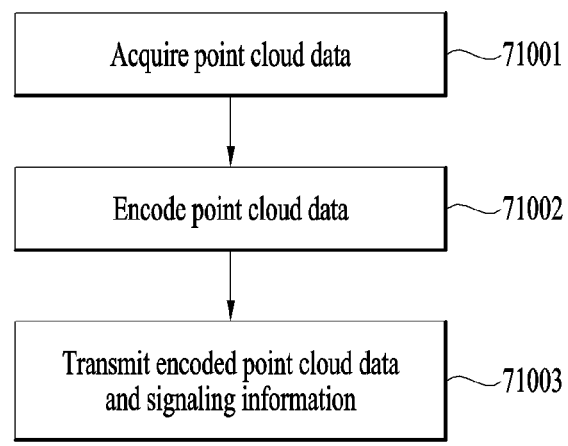
FIG. 50 is a flowchart illustrating a method of transmitting point cloud data according to embodiments.

FIG. 50 is a flowchart illustrating a method of transmitting point cloud data according to embodiments.

The method of transmitting point cloud data according to the embodiments may include acquiring point cloud data (71001), encoding the point cloud data (71002), and transmitting the encoded point cloud data and signaling information (71003). In this case, a bitstream containing the encoded point cloud data and the signaling information may be encapsulated into a file and transmitted.

In operation 71001 of acquiring the point cloud data, a part or all of the operations of the point cloud video acquisition unit 10001 of FIG. 1 may be performed, or a part or all of the operations of the data input unit 12000 of FIG. 12 may be performed.

In the operation 71002 of encoding the point cloud data, some or all of the operations of the point cloud video encoder 10002 of FIG. 1, the encoding 20001 of FIG. 2, the point cloud video encoder of FIG. 4, the point cloud encoding of FIG. 12, the point cloud encoding of FIG. 14, the point cloud encoding of FIG. 15, and the point cloud video encoder of FIG. 18 may be performed.

Operation 71002 of encoding the point cloud data 71002 according to the embodiments may include encoding geometry data (or referred to as geometry information) of the point cloud data and encoding attribute data (or referred to as attribute information) of the point cloud data.

In the operation of encoding the geometry information, the acquired point cloud data is partitioned based on OT or OT/QT/BT to compress the geometry information. For details of generating a geometry tree by partitioning the point cloud data based on OT or OT/QT/BT in the operation of encoding the geometry information, refer to the description of FIGS. 16 to 30. The description thereof will be omitted herein. In the operation of encoding the geometry information, the geometry information is reconstructed based on positions changed through the compression, and the reconstructed (or decoded) geometry information is output to the operation of encoding the attribute information. In the operation of encoding the attribute information, the attribute information is compressed based on the reconstructed geometry information and/or positions on which geometry encoding has not been performed. In the operation of encoding the attribute information, encoding of the attribute information or scalable attribute encoding may be performed by one of or a combination of two or more of Embodiments 1 to 3 described above. The encoding of the attribute information according to the embodiments may be performed according to the flowchart of FIG. 47.

In the present disclosure, the signaling information may be SPS, GPS, APS, TPS, metadata, or the like, and the geometry slice header and/or the attribute slice header may also be referred to as signaling information. Information related to LoD-based attribute compression required for compression of geometry and compression of the attribute information may be signaled at least in the APS or attribute slice header. The information related to LoD-based attribute compression has been described in detail above, and thus a description thereof will be omitted.

Figure 51:
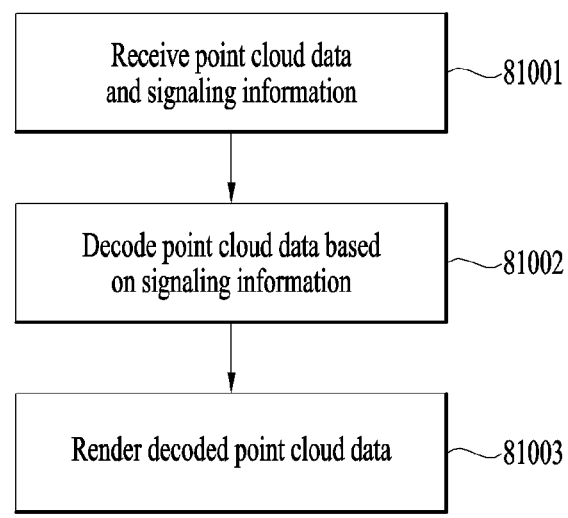
FIG. 51 is a flowchart illustrating a method of receiving point cloud data according to embodiments.

FIG. 51 is a flowchart illustrating a method of receiving point cloud data according to embodiments.

The method of receiving point cloud data according to the embodiments may include receiving encoded point cloud data and signaling information (81001), decoding the point cloud data based on the signaling information (81002), and rendering the decoded point cloud data (81003).

Operation 81001 of receiving the point cloud data and signaling information according to the embodiments may be performed by the receiver 10005 of FIG. 1, the transmission 20002 or decoding 20003 of FIG. 2, or the receiver 13000 or the reception processor 13001 of FIG. 13.

Operation 81002 of decoding the point cloud data based on the signaling information may include decoding geometry information and decoding attribute information based on the decoded/reconstructed geometry and signaling information. The signaling information may be SPS, GPS, APS, TPS, metadata, or the like, and a geometry slice header and/or an attribute slice header may also be referred to as signaling information. At least the APS or the attribute slice header may include information related to LoD-based attribute compression. The information related to LoD-based attribute compression has been described in detail above, and thus a description thereof will be omitted.

In the operation of decoding the geometry information according to the embodiments, some or all of the operations of the point cloud video decoder 10006 of FIG. 1, the decoding 20003 of FIG. 2, the point cloud video decoder of FIG. 11, the point cloud video decoder of FIG. 13, and geometry decoder of FIG. 48 may be performed.

In the operation of decoding the attribute information according to the embodiments, some or all of the operations of the point cloud video decoder 10006 of FIG. 1, the decoding 20003 of FIG. 2, the point cloud video decoder of FIG. 11, the point cloud video decoder of FIG. 13, and the attribute decoder of FIG. 48 may be performed.

In the rendering operation 81003 according to the embodiments, the point cloud data reconstructed based on the decoded geometry information and the decoded attribute information may be rendered according to various rendering methods. For example, points of the point cloud content may be rendered as a vertex having a certain thickness, a cube having a specific minimum size centered on the position of the vertex, or a circle centered on the position of the vertex. All or a part of the regions of the rendered point cloud content may be provided to the user through a display (e.g., a VR/AR display, a general display, etc.). Operation 81003 of rendering the point cloud data may be performed by the renderer 10007 of FIG. 1, the rendering 20004 of FIG. 2, or the renderer 13011 of FIG. 13.

The geometry tree-based LoD generation method described in the present disclosure is a method for dividing point cloud data and may be used for attribute coding. In particular, when QTBT-based geometry coding is performed in scalable coding applications, attribute information may be matched with corresponding points/nodes in a one-to-one correspondence manner according to the depth of the geometry tree. Thereby, scalable representation may be enabled for all depths or some matching depths.

The present disclosure proposes an LOD generation method for increasing compression efficiency when point cloud data has an asymmetric distribution. According to the operations of the embodiments described in the present disclosure, scalable attribute coding may be performed on the asymmetrically distributed point cloud data. More specifically, LOD may be generated in consideration of asymmetric cuboid nodes, and attribute coding may be performed based on change in node according to the layer in consideration of QTBT-based geometry compression. Further, the transmission/reception method/device according to the embodiments may perform OT-based scalable attribute compression. As a result, the efficiency of compression of the point cloud data may be increased.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion. In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that variously changes or modifications may be made to the embodiments within the scope of the embodiments. Thus, it is intended that the embodiments cover the modifications and variations of this disclosure provided they come within the scope of the appended claims and their equivalents.

The invention claimed is:

1. A method of transmitting point cloud data by a device, the method comprising:
   encoding geometry information including positions of points of the point cloud data by applying an octree;
   encoding attribute information including attribute values of the points of the point cloud data based on the octree; and
   transmitting the encoded geometry information, the encoded attribute information, and signaling information,
   wherein the encoding of the attribute information comprises:
   generating Levels of Detail (LoDs) based on the octree; and
   compressing the attribute information based on the LoDs,
   wherein the octree is formed of depths,
   wherein a depth of the depths includes one or more occupied nodes,
   wherein at least one of the one or more occupied nodes includes two or more occupied child nodes,
   wherein one of the two or more occupied child nodes is selected to generate a LoD, wherein the selection is performed on each of the at least one occupied node having two or more occupied child nodes to generate the LoD corresponding to the depth, and wherein an occupied child node selected for each of the at least one occupied node is a first node or a last node of two or more occupied child nodes based on whether the LoD is even or odd.

2. The method of claim 1, wherein the two or more occupied child nodes having a same parent node are arranged based on a Morton code order.

3. A device for transmitting point cloud data, the device comprising:
- a processor for encoding the point cloud data,
  wherein the processor comprises:
    - a geometry encoder for encoding geometry information including positions of points of the point cloud data by applying an octree, and
    - an attribute encoder for encoding attribute information including attribute values of the points of the point cloud data based on the octree; and
- a transmitter for transmitting the encoded geometry information, the encoded attribute information, and signaling information, wherein the attribute encoder comprises:
a LoD generator for generating Levels of Detail (LoDs) based on the octree, and
a compressor for compressing the attribute information based on the LoDs,
wherein the octree is formed of depths,
wherein a depth of the depths includes one or more occupied nodes,
wherein at least one of the one or more occupied nodes includes two or more occupied child nodes,
wherein one of the two or more occupied child nodes is selected to generate a LoD,
wherein the selection is performed on each of the at least one occupied node having two or more occupied child nodes to generate the LoD corresponding to the depth, and
wherein an occupied child node selected for each of the at least one occupied node is a first node or a last node of two or more occupied child nodes based on whether the LoD is even or odd.

4. The device of claim 3, wherein the two or more occupied child nodes having a same parent node are arranged based on a Morton code order.

5. A method of receiving point cloud data by a device, the method comprising:
- receiving geometry information, attribute information, and signaling information;
- decoding the geometry information based on the signaling information and an octree;
- decoding the attribute information based on the signaling information and the octree; and
- rendering the point cloud data reconstructed based on the decoded geometry information and the decoded attribute information, wherein the decoded geometry information includes positions of points of the reconstructed point cloud data,
wherein the decoded attribute information includes attribute values of the points of the reconstructed point cloud data, wherein the decoding of the attribute information comprises:
generating Levels of Detail (LoDs) based on the octree; and
decoding the attribute information based on the LoDs,
wherein the octree is formed of depths,
wherein a depth of the depths includes one or more occupied nodes,
wherein at least one of the one or more occupied nodes includes two or more occupied child nodes,
wherein one of the two or more occupied child nodes is selected to generate a LoD,
wherein the selection is performed on each of the at least one occupied node having two or more occupied child nodes to generate the LoD corresponding to the depth, and
wherein an occupied child node selected for each of the at least one occupied node is a first node or a last node of two or more occupied child nodes based on whether the LoD is even or odd.

6. The method of claim 5, wherein the two or more occupied child nodes having a same parent node are arranged based on a Morton code order.

7. A device for receiving point cloud data, the device comprising:
- a receiver configured to receive geometry information, attribute information, and signaling information;
- a geometry decoder configured to decode the geometry information based on the signaling information and an octree;
- an attribute decoder configured to decode the attribute information based on the signaling information and the octree; and
- a renderer configured to render the point cloud data reconstructed based on the decoded geometry information and the decoded attribute information, wherein the decoded geometry information includes positions of points of the reconstructed point cloud data,
wherein the decoded attribute information includes attribute values of the points of the reconstructed point cloud data,
wherein the attribute decoder comprises:
a LOD generator configured to generate Levels of Detail (LoDs) based on the octree; and
a decoder configured to decode the attribute information based on the LoDs,
wherein the octree is formed of depths,
wherein a depth of the depths includes one or more occupied nodes,
wherein at least one of the one or more occupied nodes includes two or more occupied child nodes,
wherein one of the two or more occupied child nodes is selected to generate a LoD,
wherein the selection is performed on each of the at least one occupied node having two or more occupied child nodes to generate the LoD corresponding to the depth, and
wherein an occupied child node selected for each of the at least one occupied node is a first node or a last node of two or more occupied child nodes based on whether the LoD is even or odd.

8. The device of claim 7, wherein the two or more occupied child nodes having a same parent node are arranged based on a Morton code order.

* * * * *